United States Patent
Isoyama et al.

(10) Patent No.: US 6,248,984 B1
(45) Date of Patent: Jun. 19, 2001

(54) METHOD AND APPARATUS FOR JOINING METAL PIECES

(75) Inventors: Shigeru Isoyama; Takeshi Hirabayashi; Hideyuki Nikaido; Toshiaki Amagasa; Nozomu Tamura; Takahiro Yamasaki; Masashi Osada; Hirosuke Yamada; Toshisada Takechi; Norio Takashima; Junzo Nitta; Shuji Amanuma, all of Chiba; Kanji Hayashi, Hiroshima; Akio Kuroda, Hiroshima; Yoshiki Mito, Hiroshima; Kunio Miyamoto, Hiroshima; Kazuo Morimoto, Hiroshima; Ikuo Wakamoto, Hiroshima; Kazuya Tsurusaki, Hiroshima; Hideo Sakamoto, Amagasaki; Michio Hashimoto, Amagasaki; Hiroyuki Nakano, Amagasaki; Toshinobu Eguchi, Amagasaki; Fumihiro Maeda, Amagasaki, all of (JP)

(73) Assignee: Kawasaki Steel Corporation

( * ) Notice: Subject to any disclaimer, the term of this patent is extended or adjusted under 35 U.S.C. 154(b) by 0 days.

(21) Appl. No.: 09/351,372

(22) Filed: Jul. 12, 1999

Related U.S. Application Data

(62) Division of application No. 08/513,789, filed as application No. PCT/JP94/02113 on Dec. 15, 1994, now Pat. No. 5,951,903.

(30) Foreign Application Priority Data

Dec. 16, 1993 (JP) .................................................. 5/316751
Dec. 24, 1993 (JP) .................................................. 5/328733
Jun. 17, 1994 (JP) .................................................. 6/135740

(51) Int. Cl.$^7$ ................................................. H05B 6/06
(52) U.S. Cl. .......................... 219/603; 219/662; 219/663
(58) Field of Search .................................. 219/603, 602, 219/608, 611, 614, 617, 659, 671, 670, 656, 663, 664, 661, 662; 228/151, 158, 235.2, 265; 72/202, 203

(56) References Cited

U.S. PATENT DOCUMENTS

| | | | |
|---|---|---|---|
| 4,751,360 | * 6/1988 | Ross | 219/671 |
| 4,979,182 | * 12/1990 | Lohoefer | 219/662 |
| 5,014,420 | * 5/1991 | Howard et al. | 219/603 |
| 5,396,050 | * 3/1995 | Ebihara et al. | 219/603 |

FOREIGN PATENT DOCUMENTS 0 495 989 * 7/1992 (EP) .
0 495 993 * 7/1992 (EP) .

OTHER PUBLICATIONS

Patent Abstracts of Japan Publication No. 05069024, Publication Date: Mar. 23, 1993.
European Search Report.

* cited by examiner

Primary Examiner—Philip H. Leung
(74) Attorney, Agent, or Firm—Orum & Roth

(57) ABSTRACT

According to the invention, the rear end of a preceding metal piece and a front end of a succeeding metal piece are heated, pressed and joined prior to the finishing hot rolling. An alternating magnetic field running through the metal pieces in the thickness direction thereof is generated in an end region on opposed faces of the respective metal pieces to perform heating. Another alternating magnetic field whose direction is reverse with respect to that of the former alternating magnetic field is partially generated in the end region on the opposed faces of the metal pieces and in either a region where the metal pieces exist or a region outside width ends of the metal pieces. This assures a uniform heating of the end region on the opposed faces of the metal pieces over their full width to reliably join the both metal pieces to each other.

2 Claims, 70 Drawing Sheets

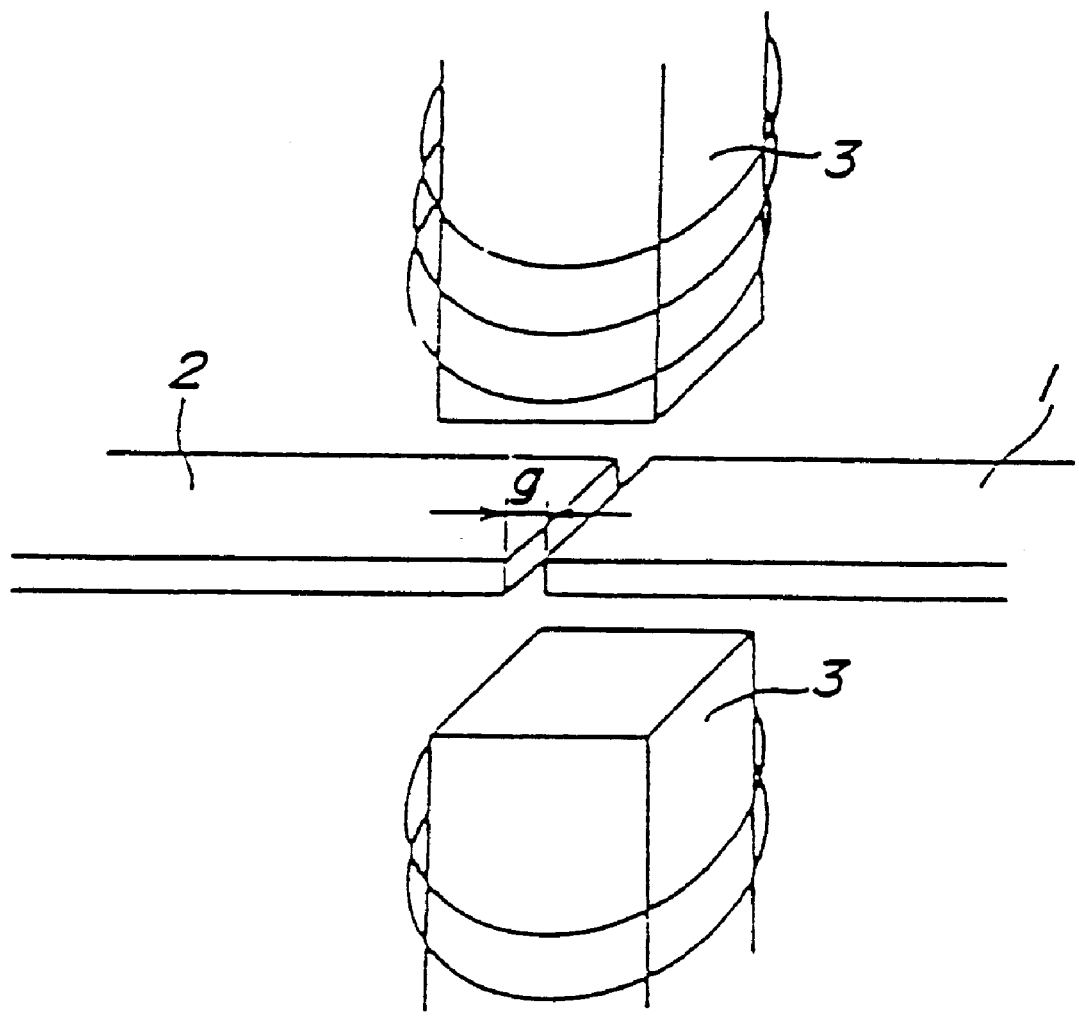
FIG_2

FIG_3
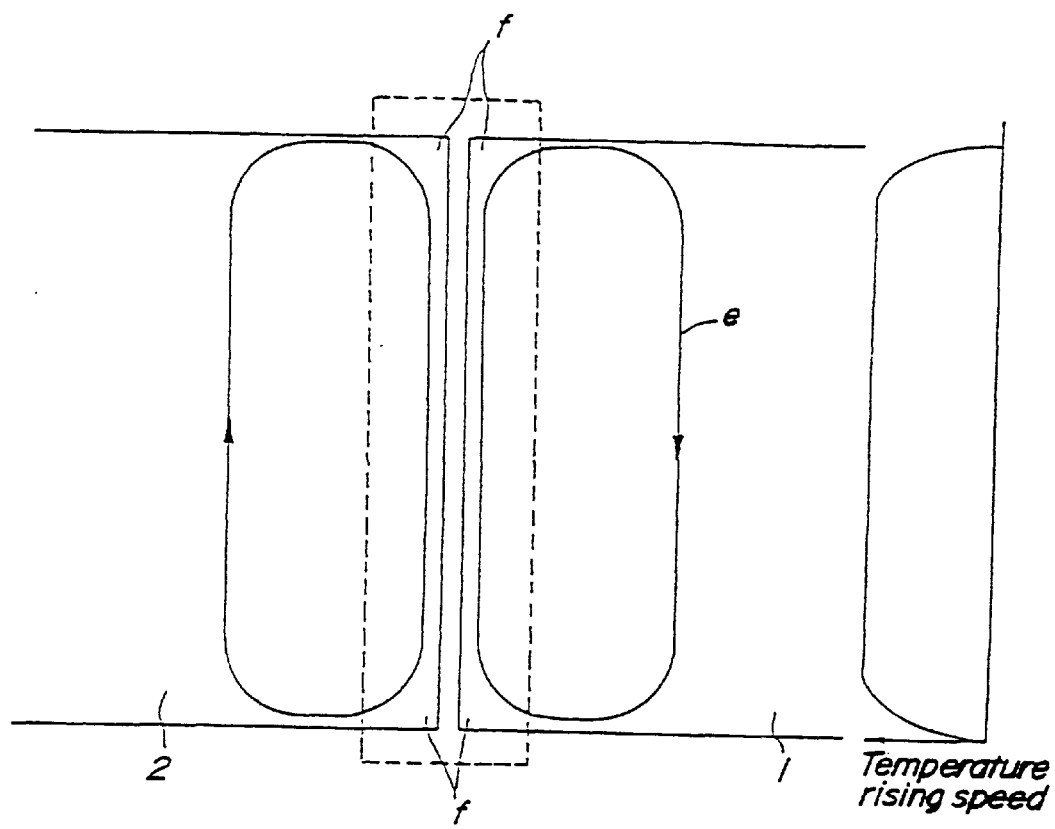
FIG_4
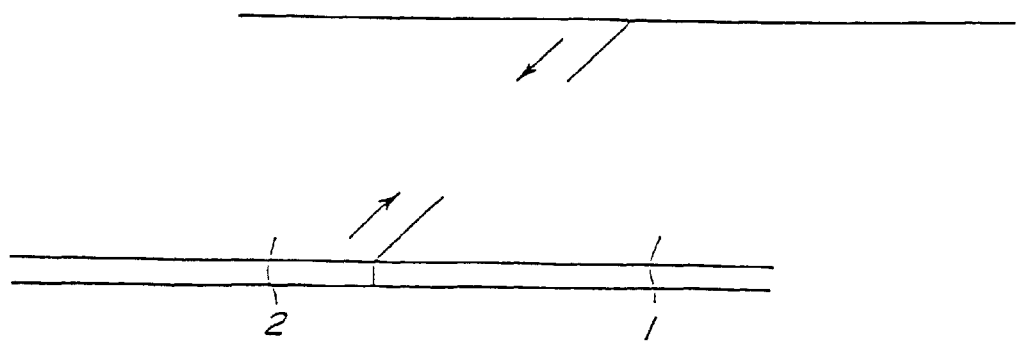

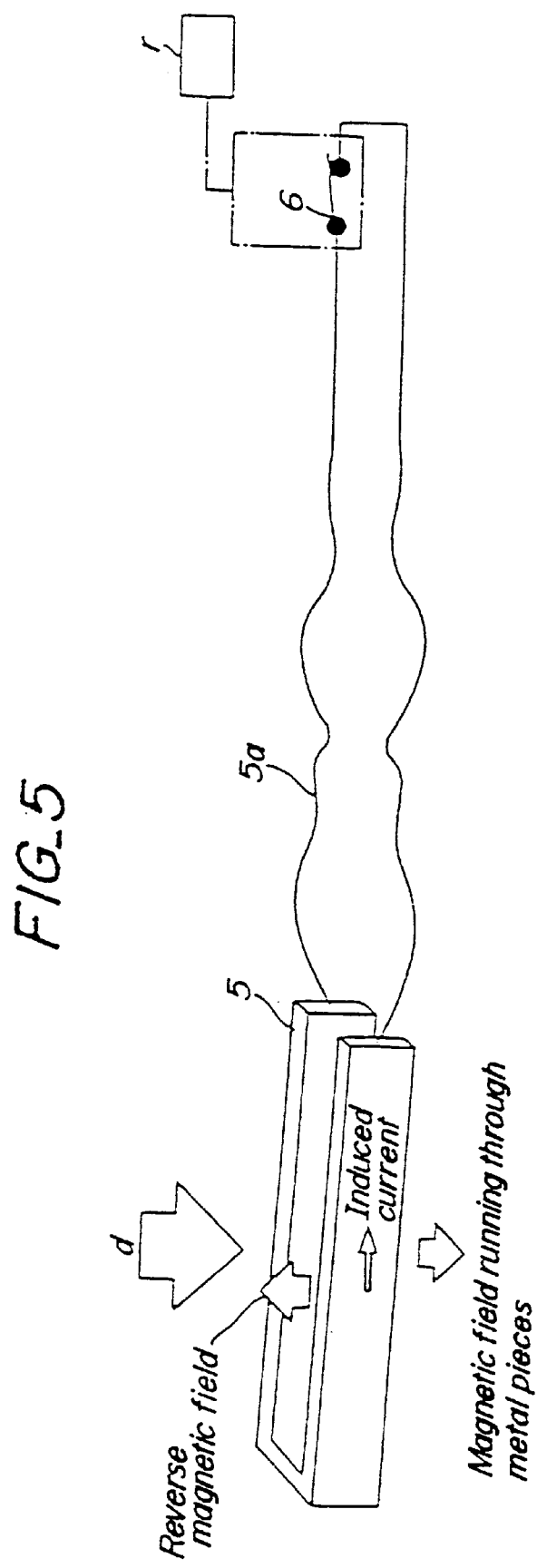

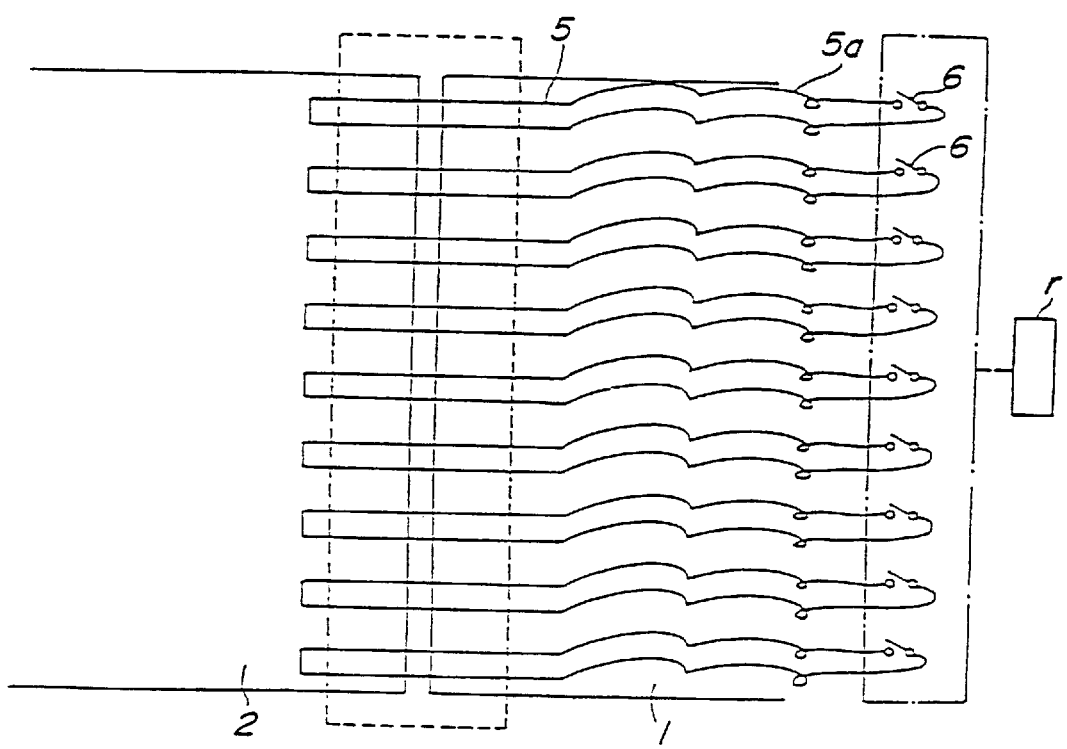
FIG_6

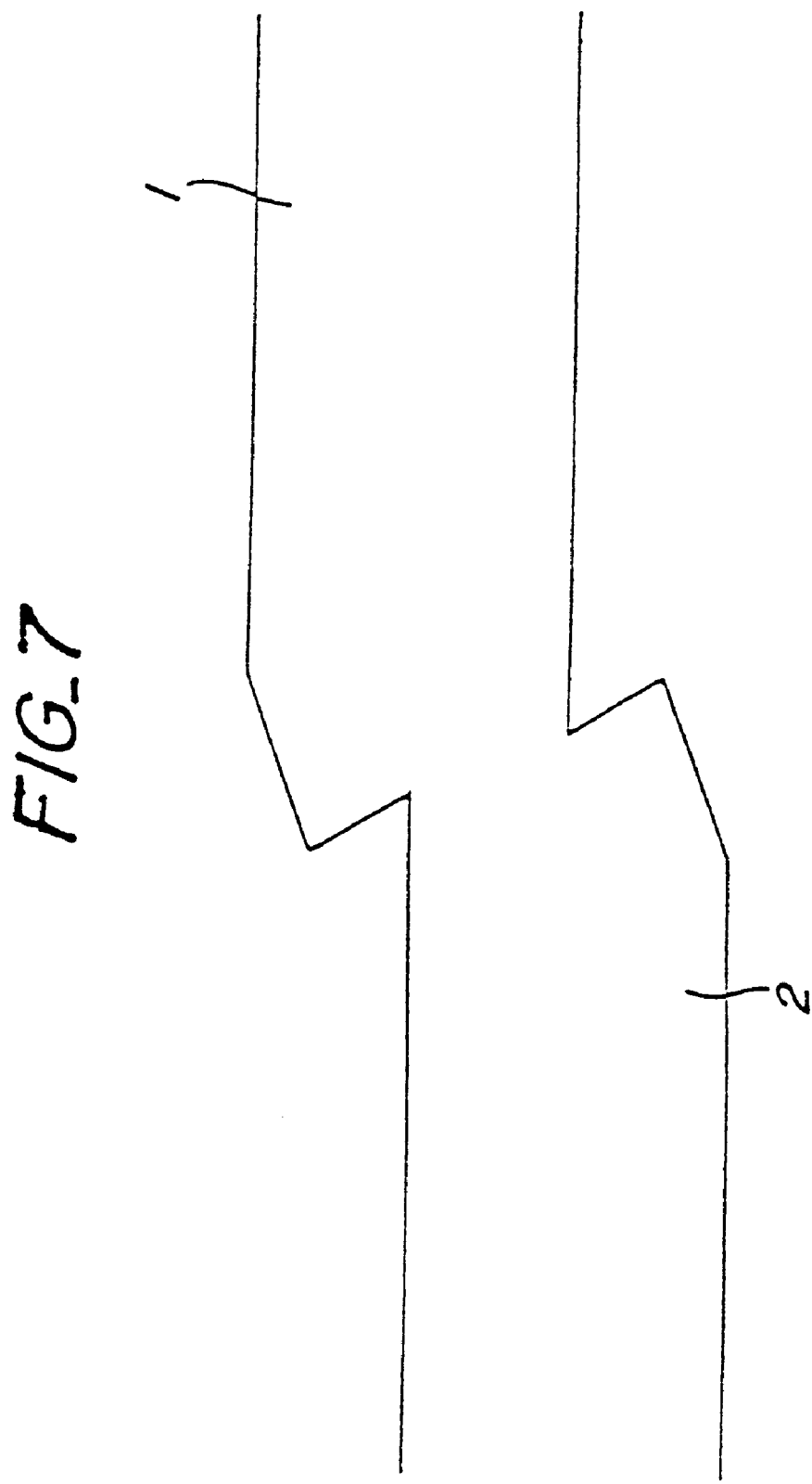
FIG_7

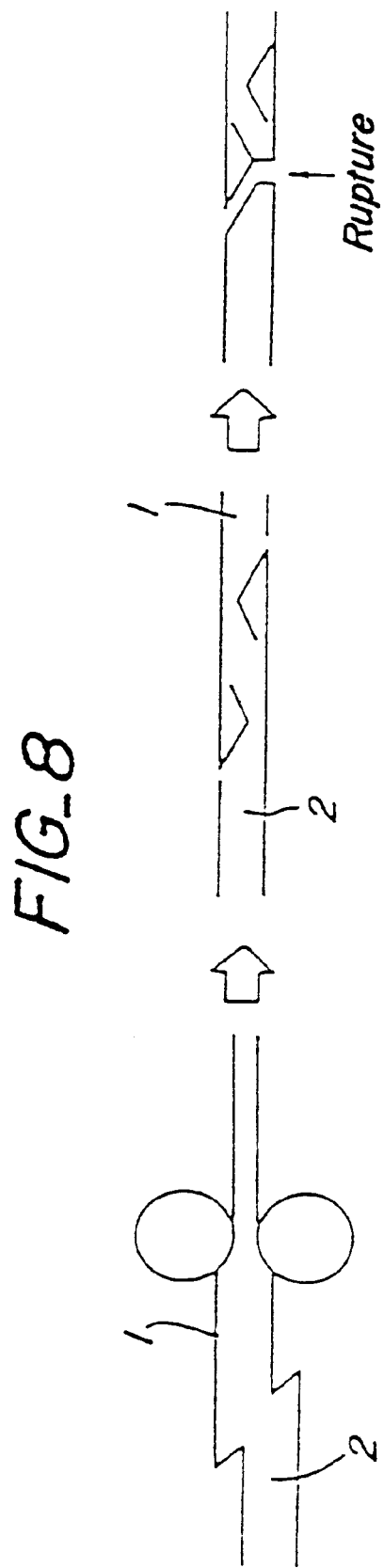

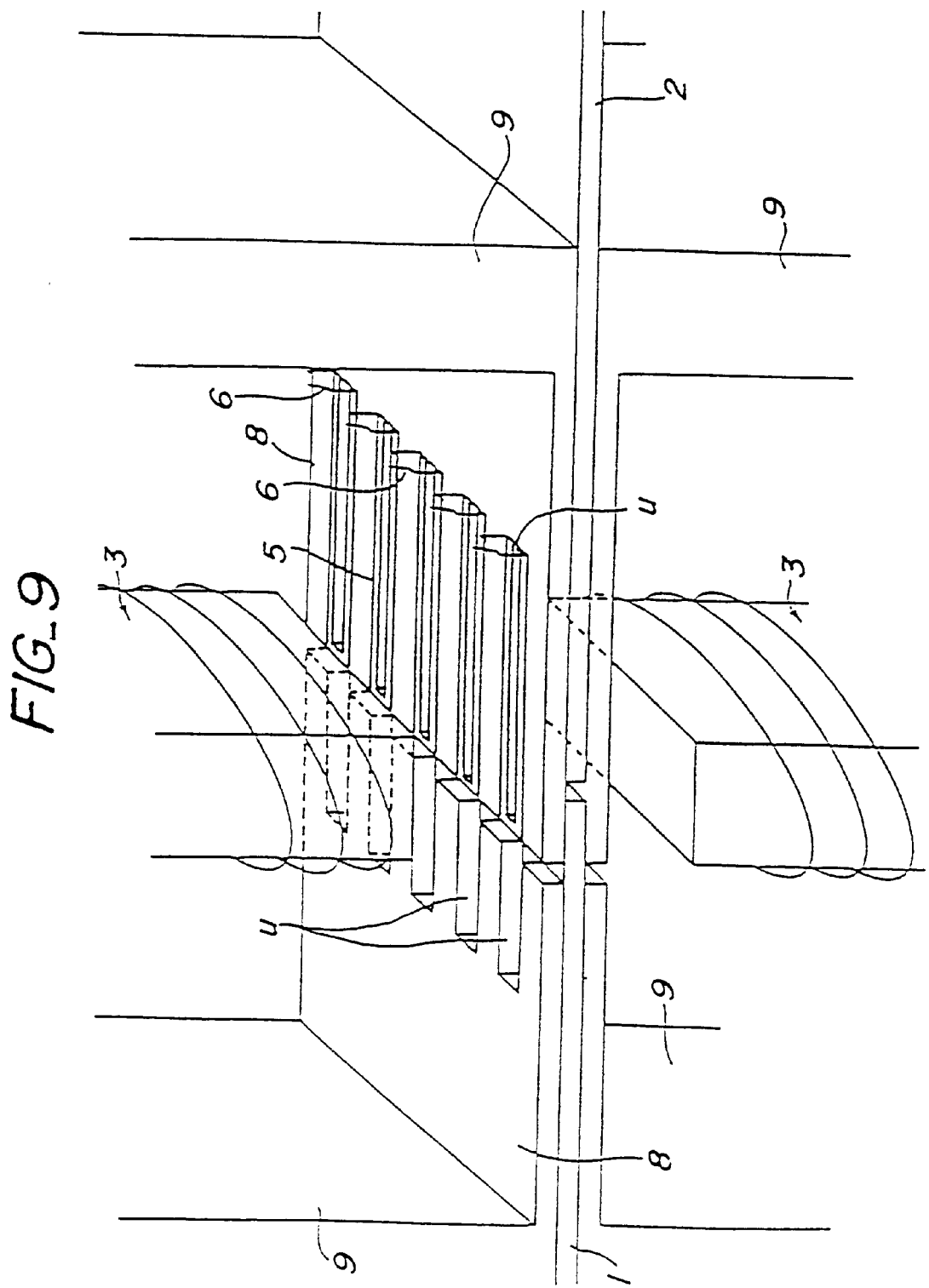

FIG_11

FIG_12

FIG_13

FIG_15

FIG_17

FIG_19

FIG_20

FIG_21

FIG_22

FIG_26a
FIG_26b
FIG_26c
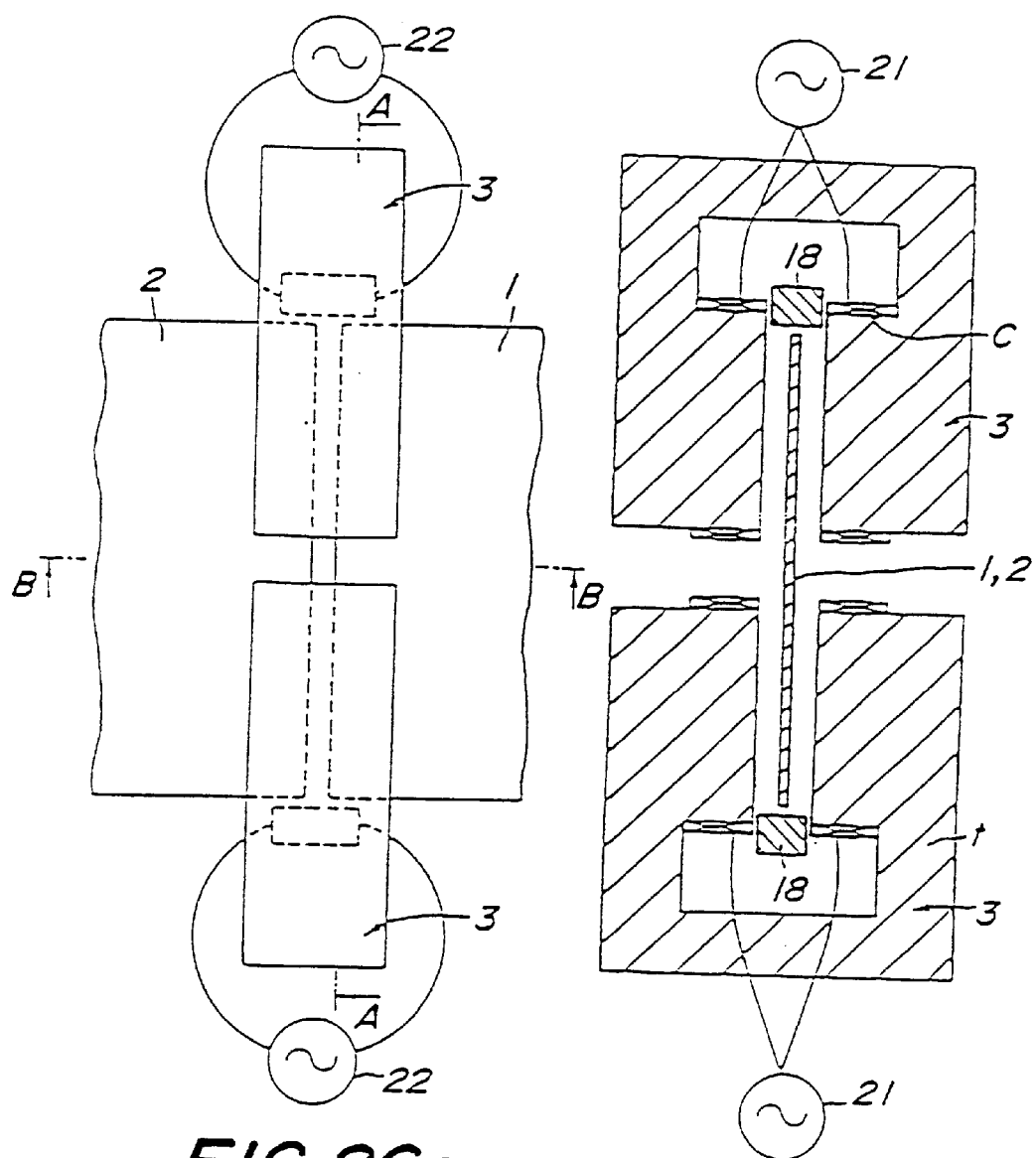

B - B section

A - A section

A-A section

B-B section

FIG_38a
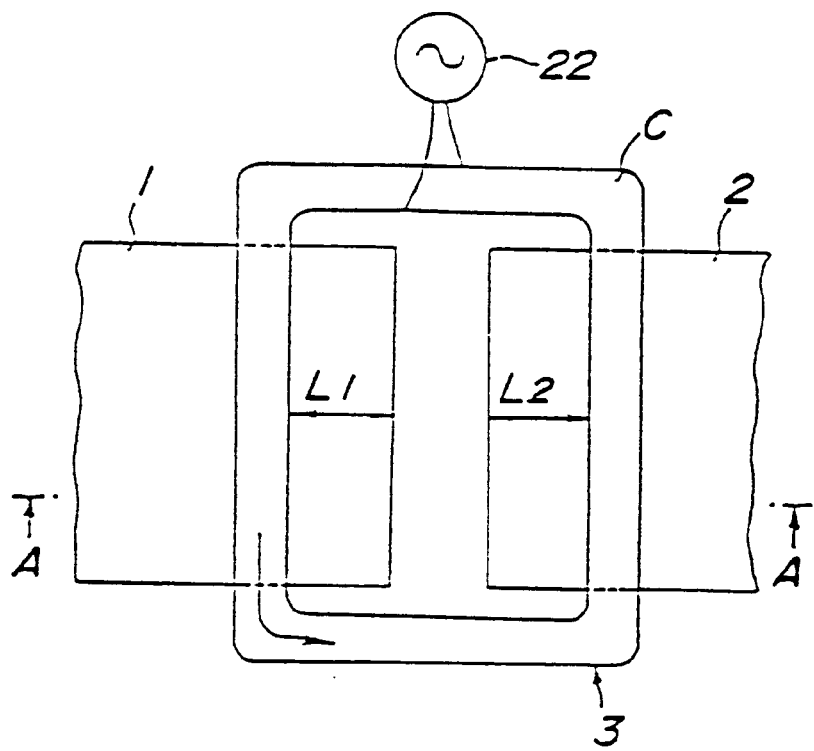
FIG_38b
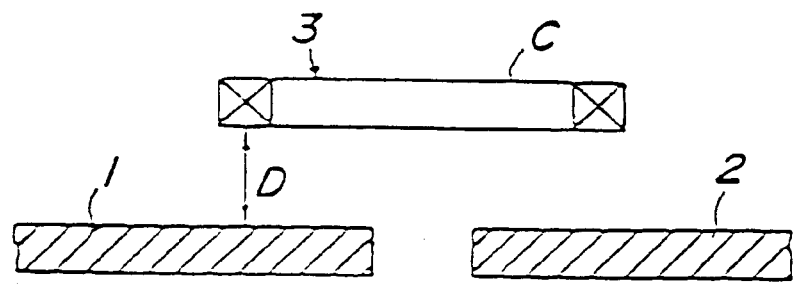
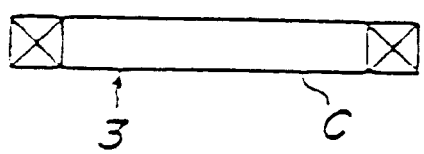
A-A section

FIG_39
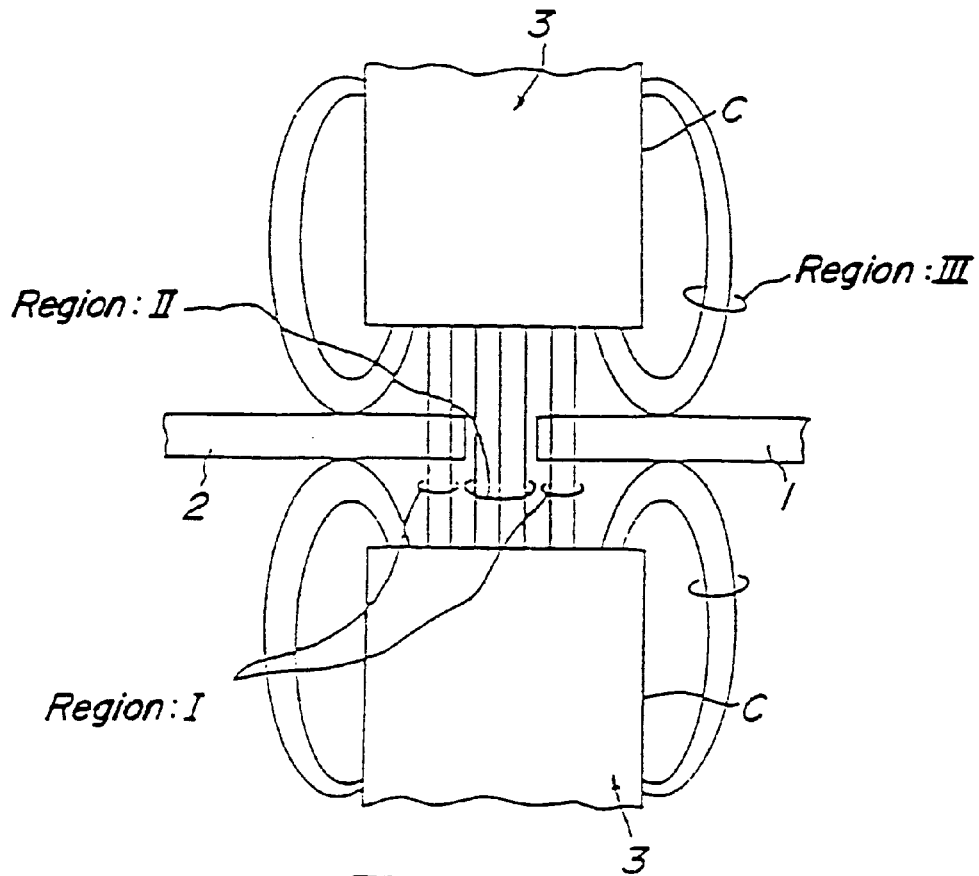
FIG_40
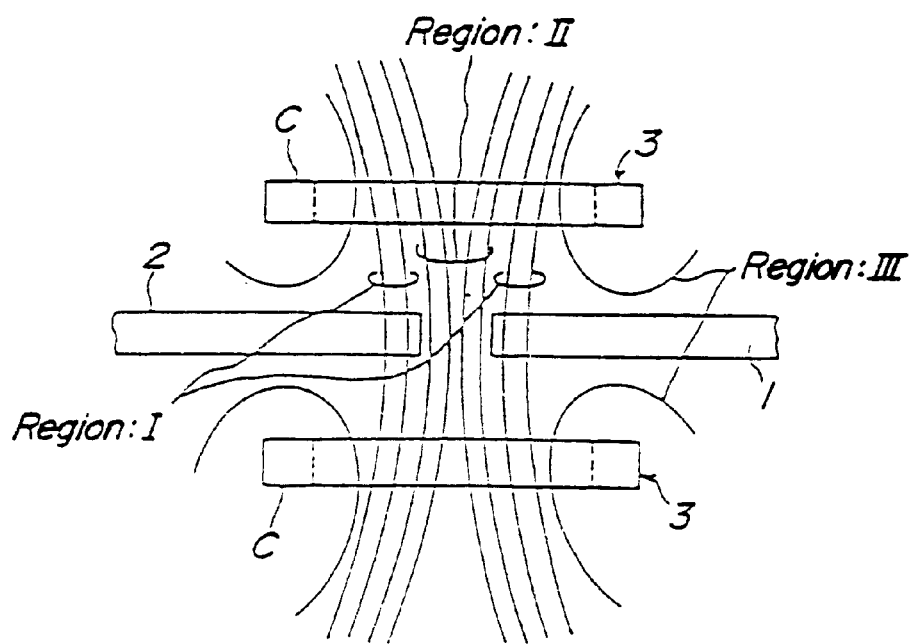

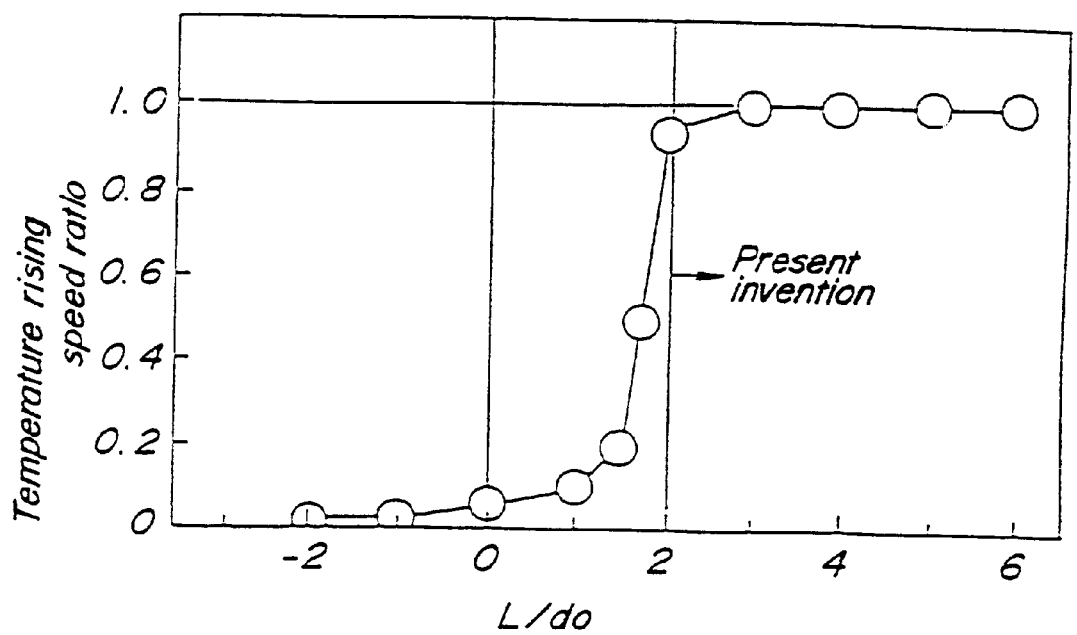
FIG_41

FIG_44
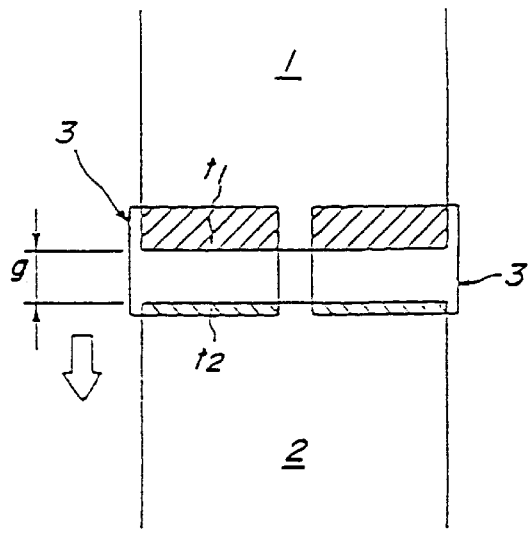
FIG_45
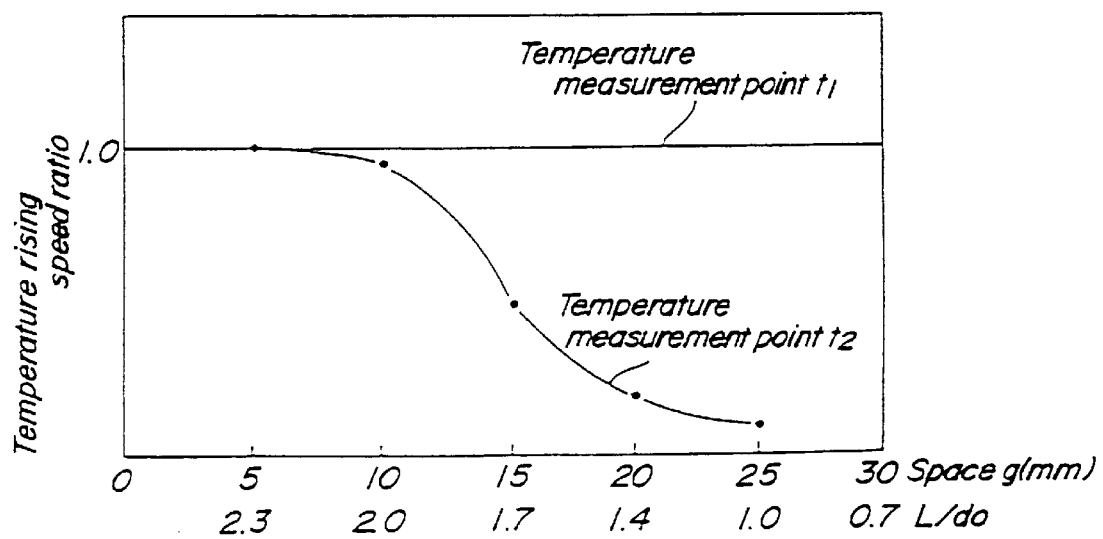

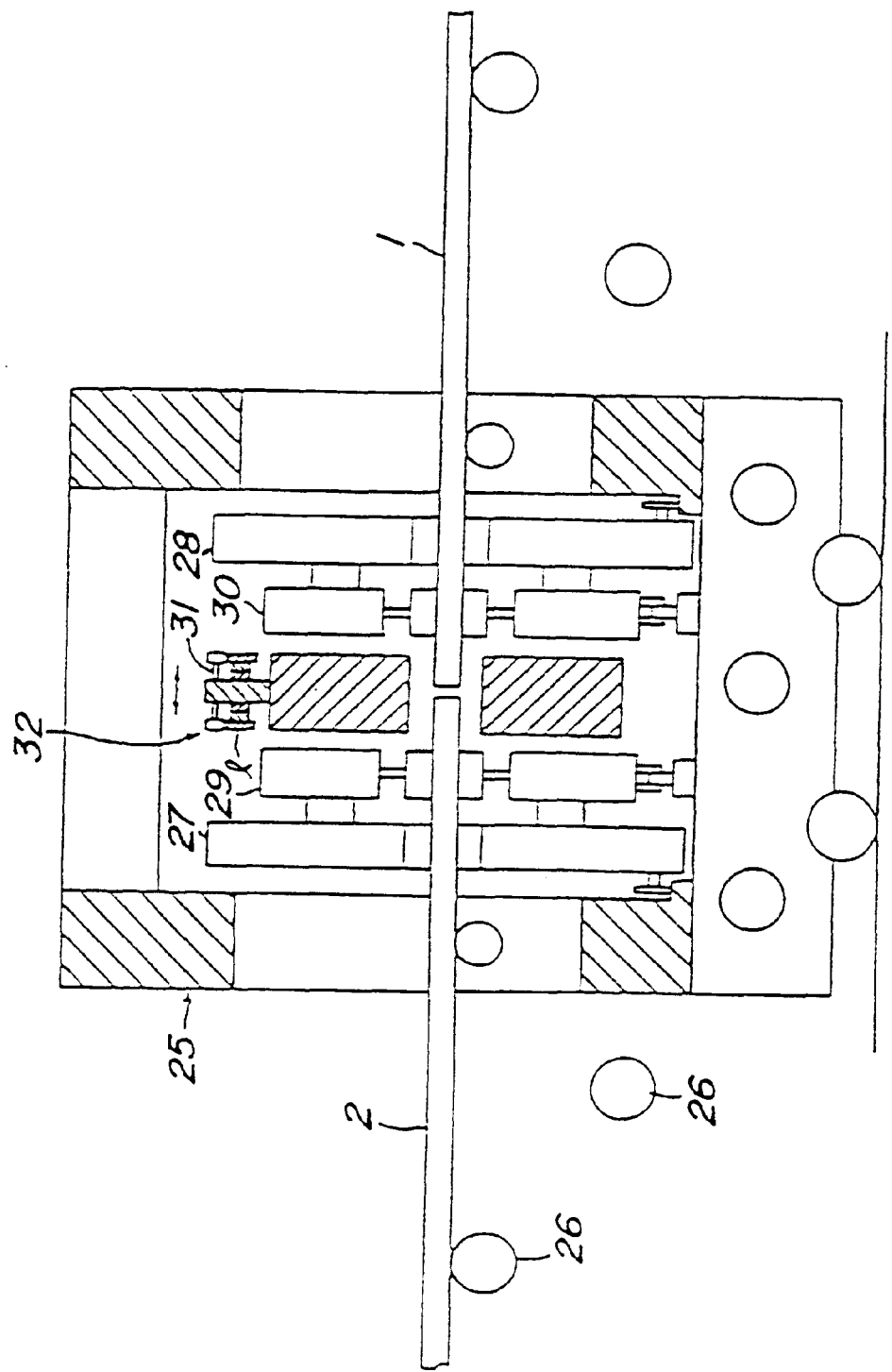

FIG_47
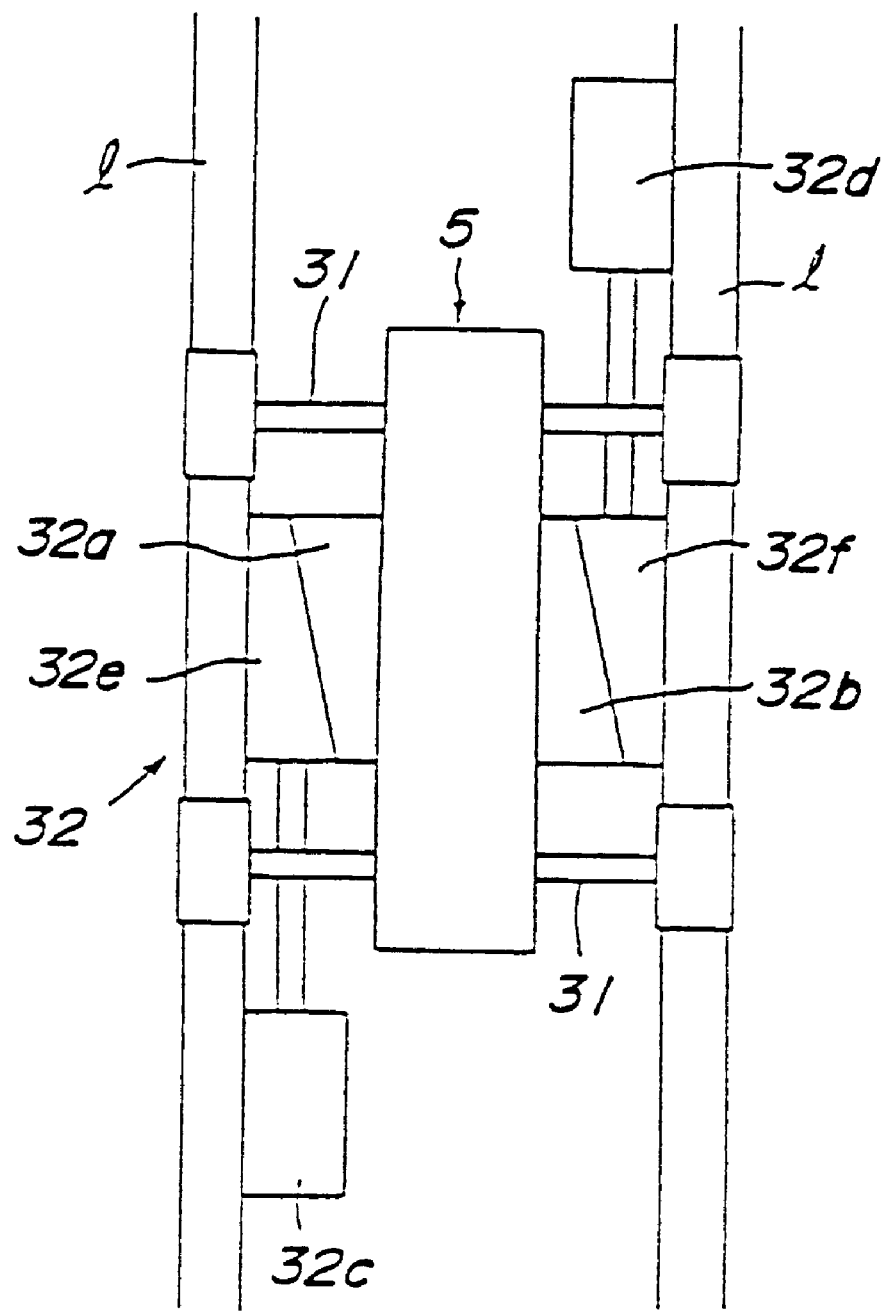

FIG_48
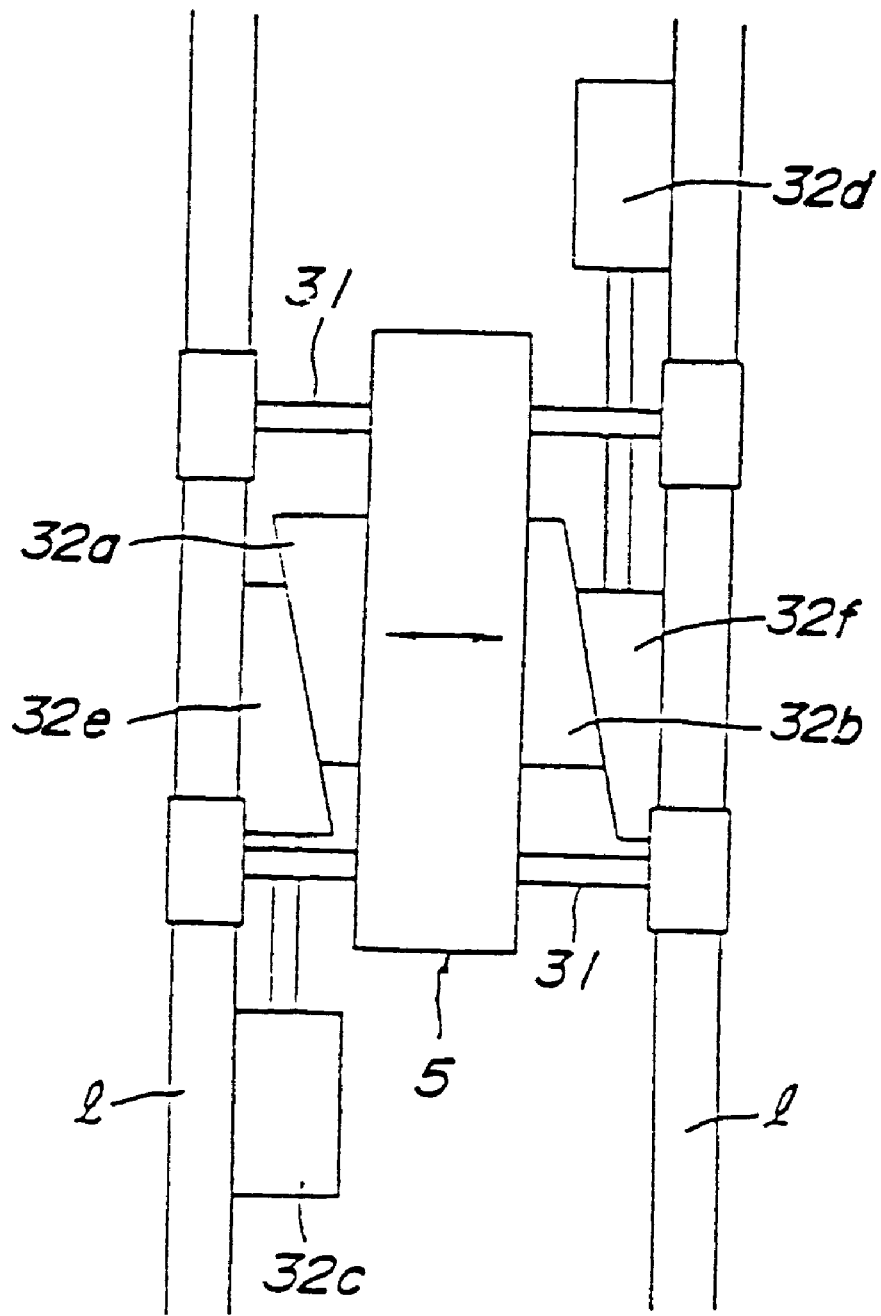

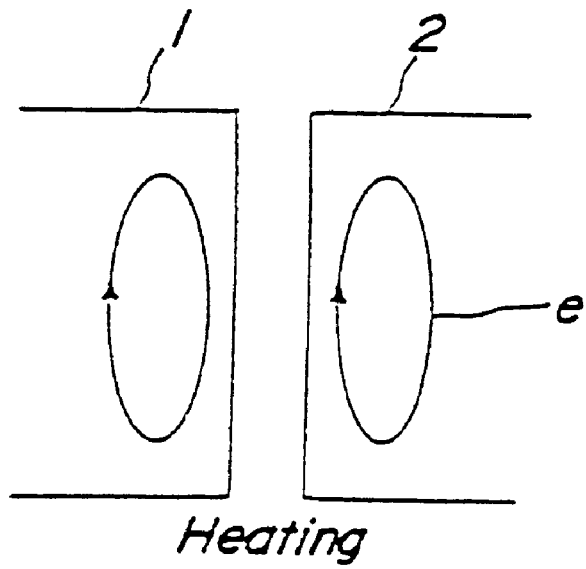
FIG_49a
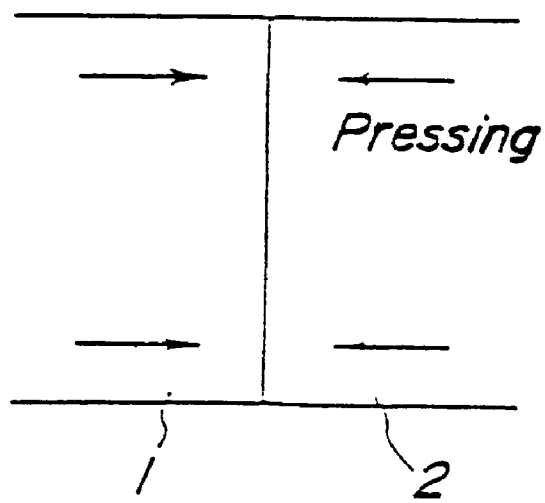
FIG_49b

FIG_50
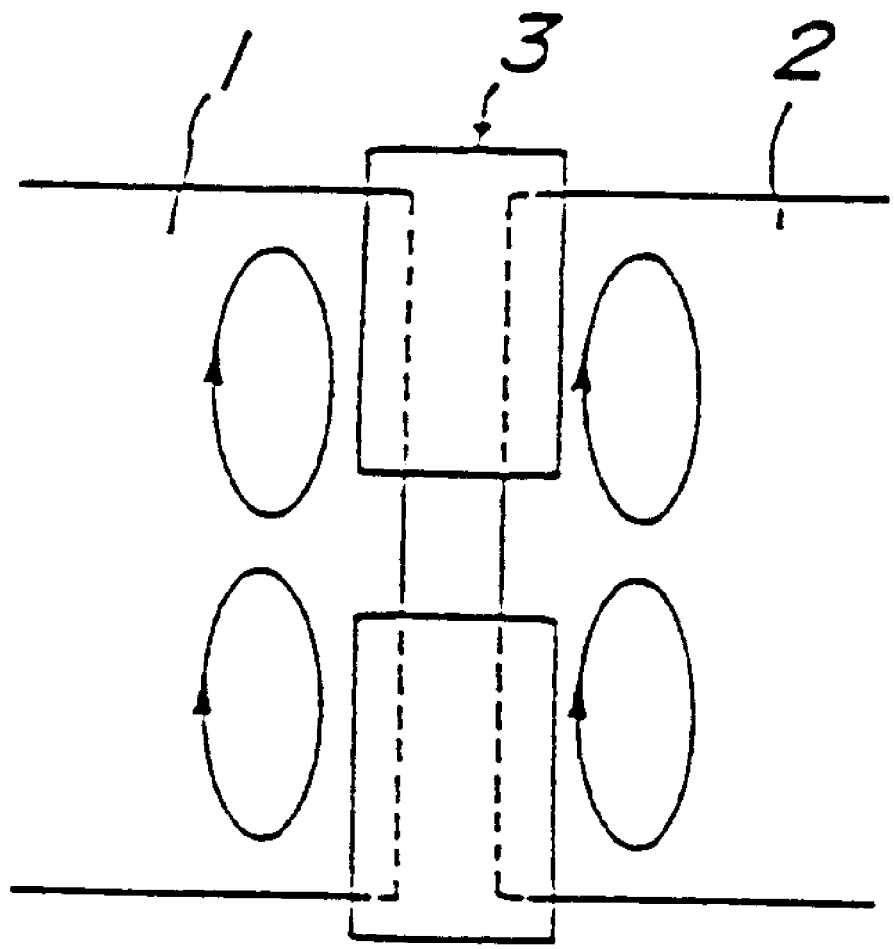

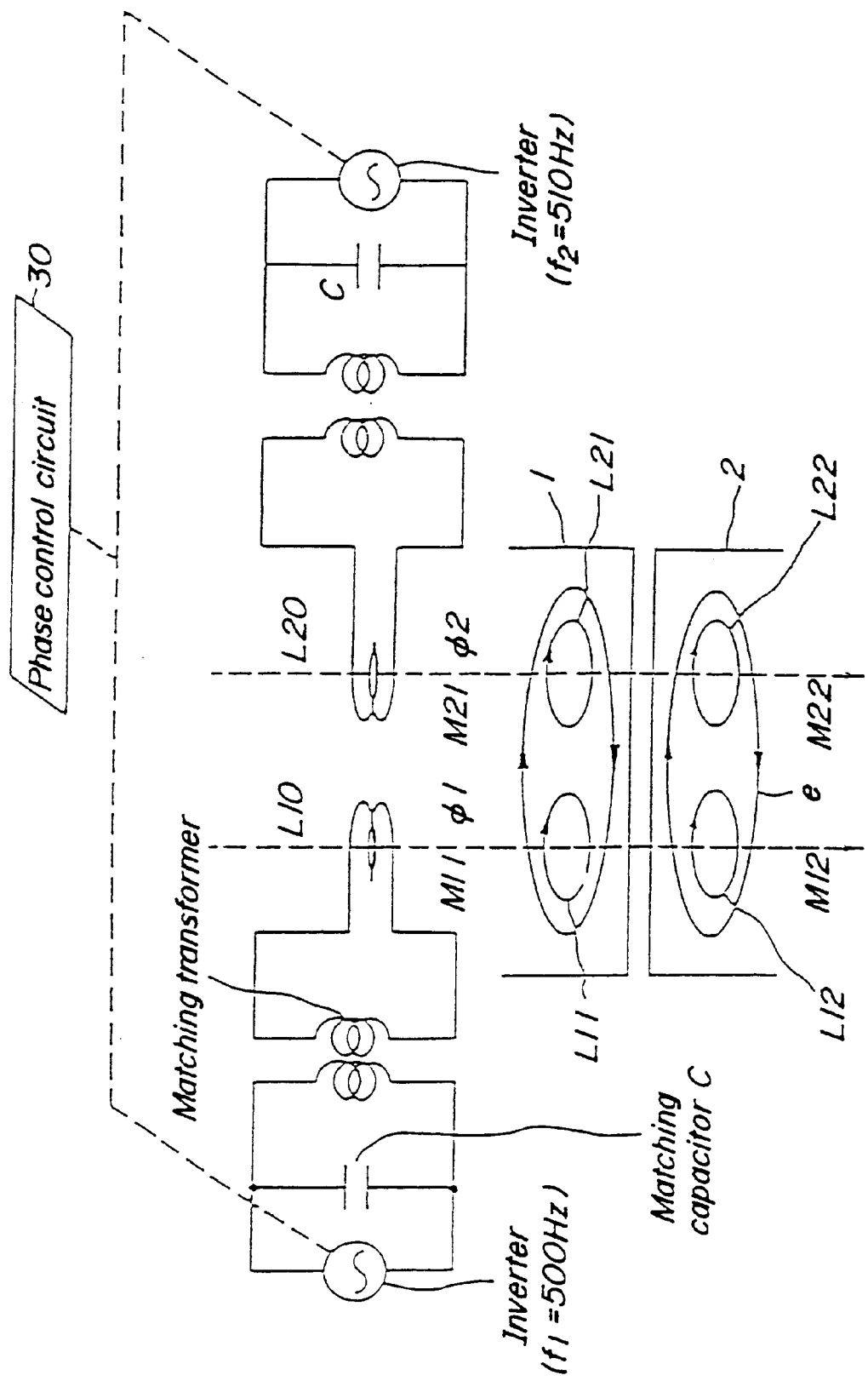
FIG_51a

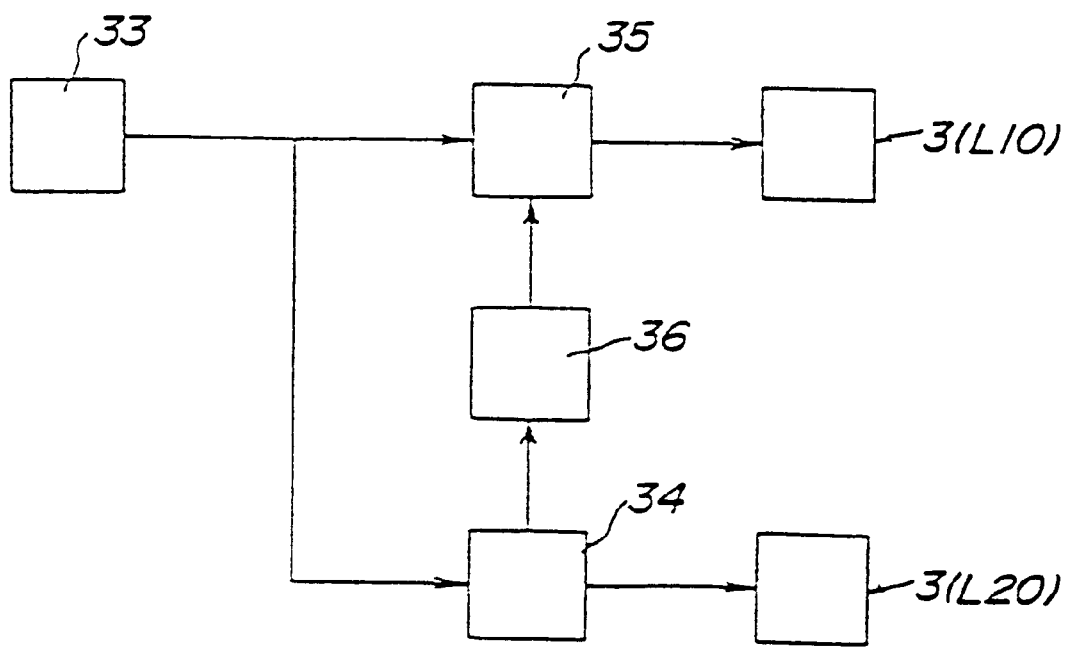
FIG_52

FIG_54
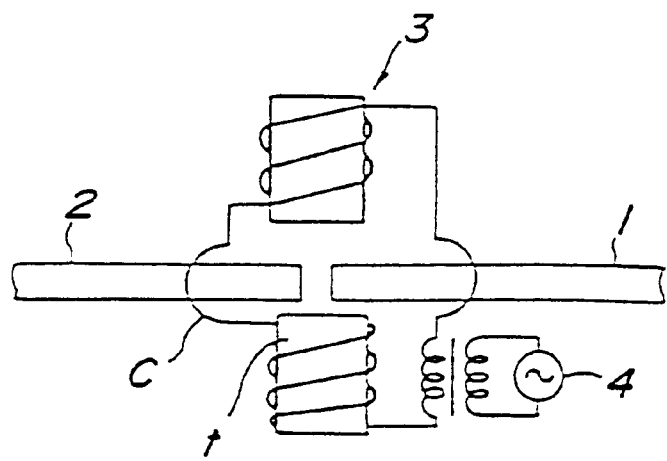
FIG_55
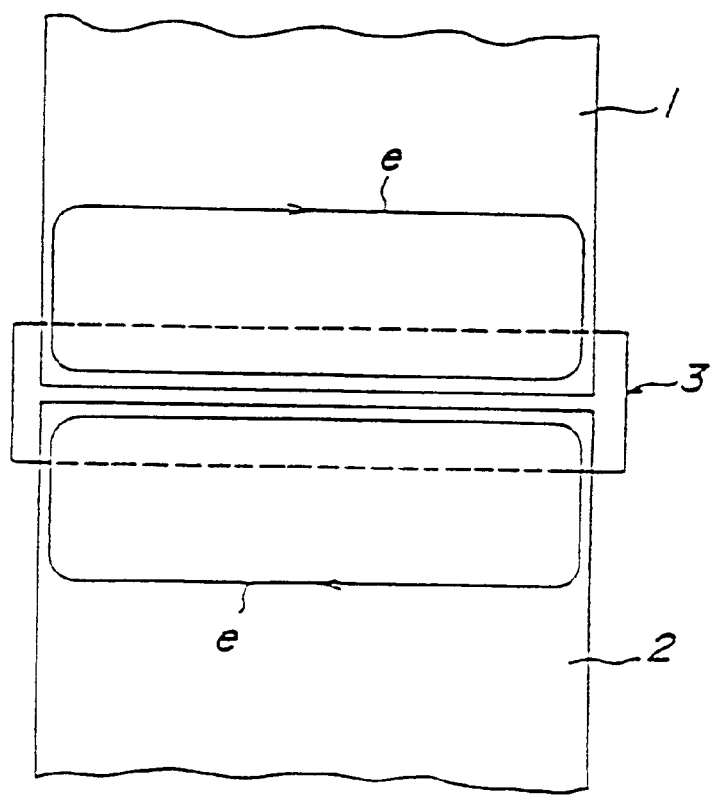

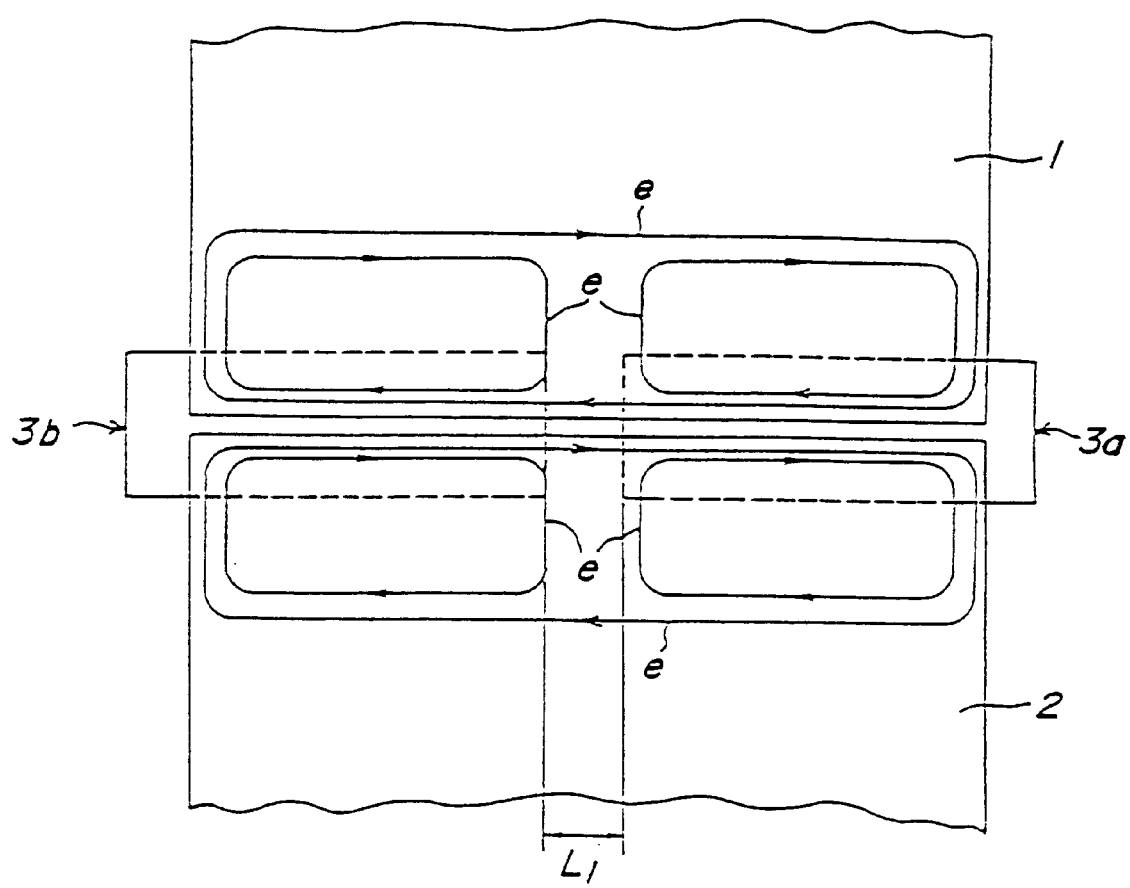
FIG_56

FIG_61

FIG_62

FIG_65

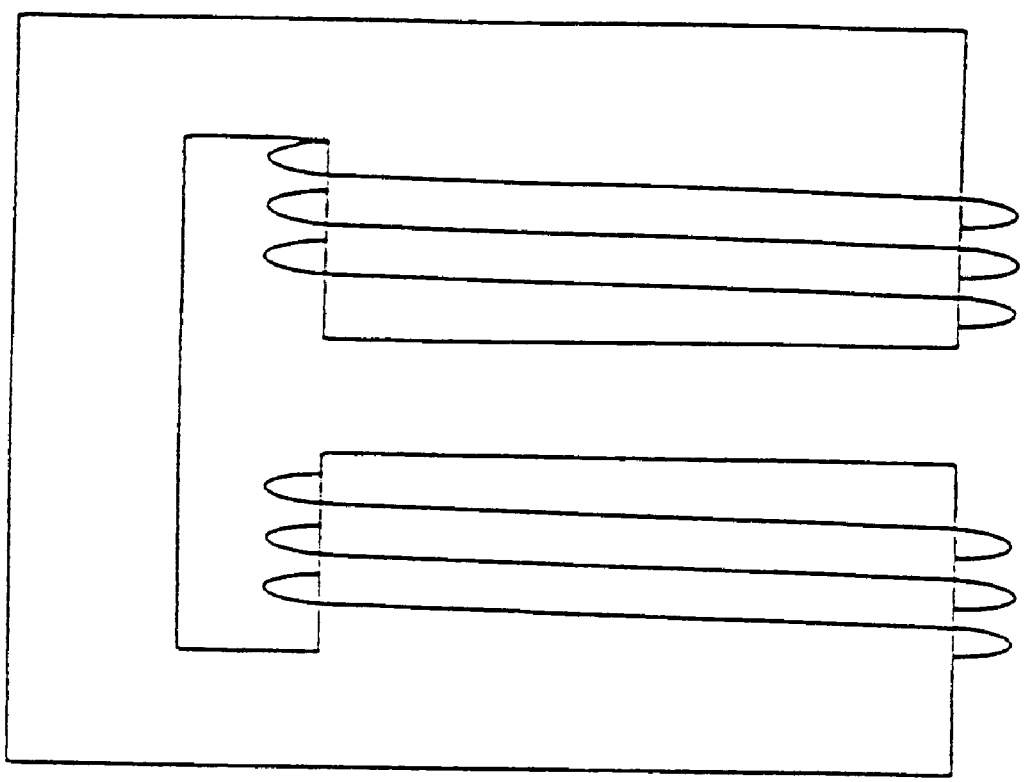
FIG_69

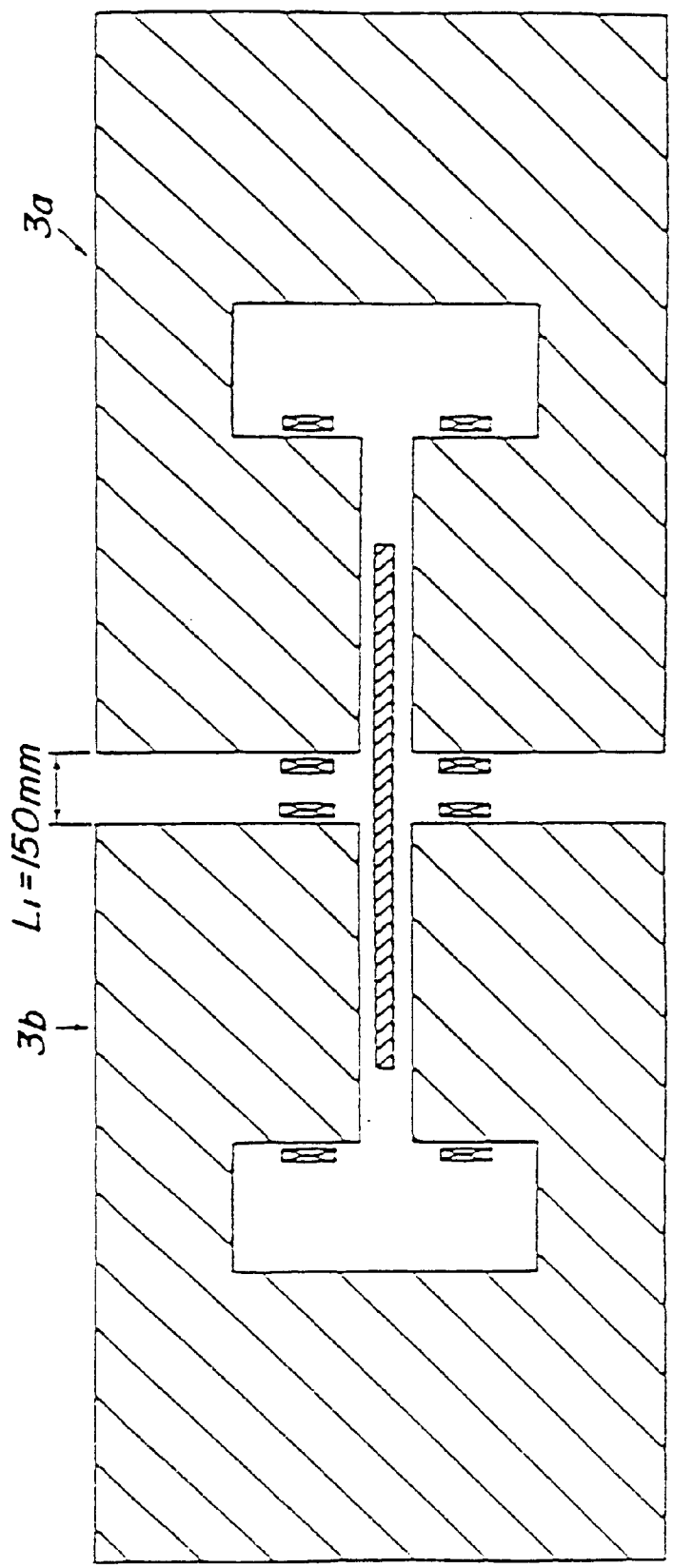
FIG_70

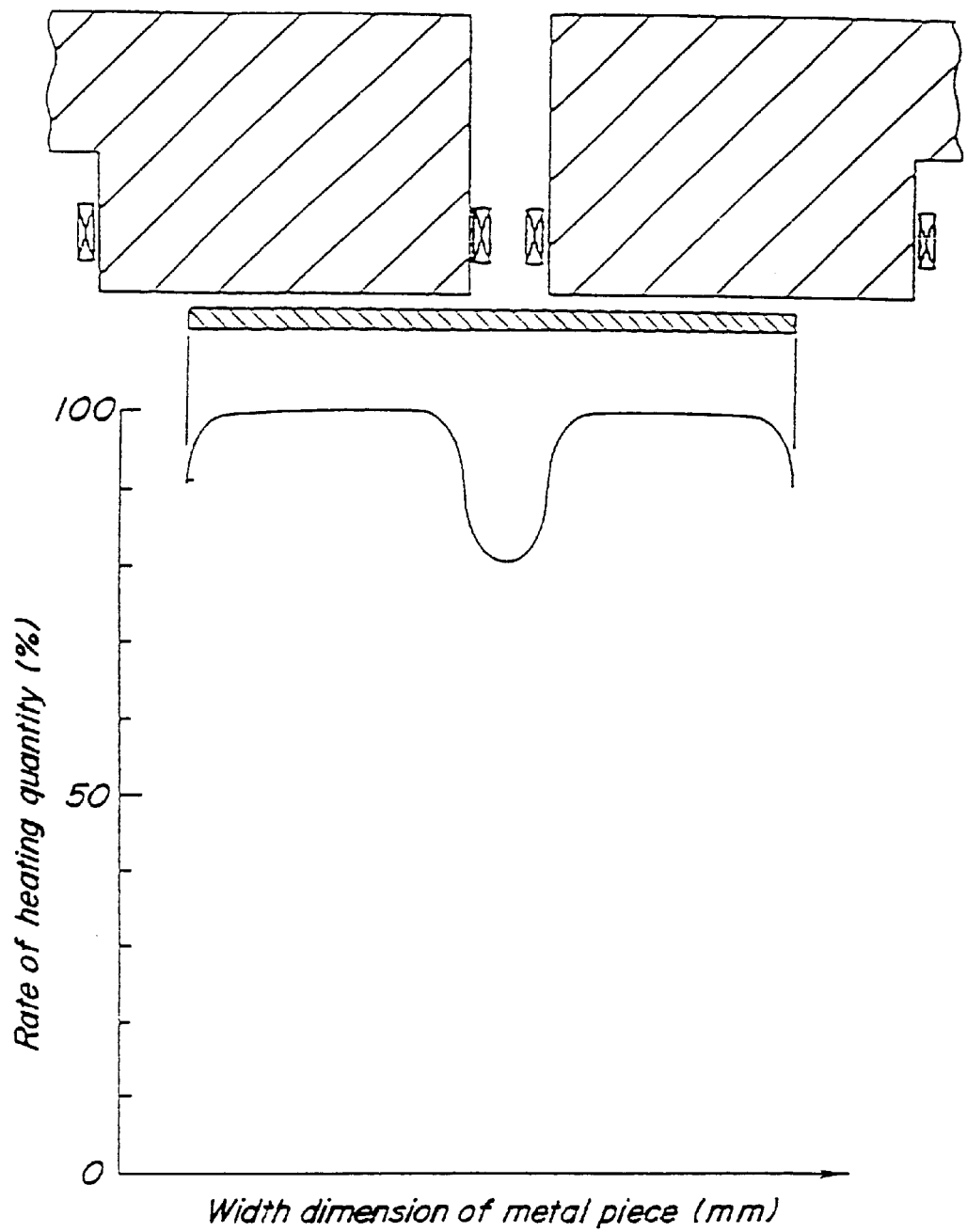
FIG_71

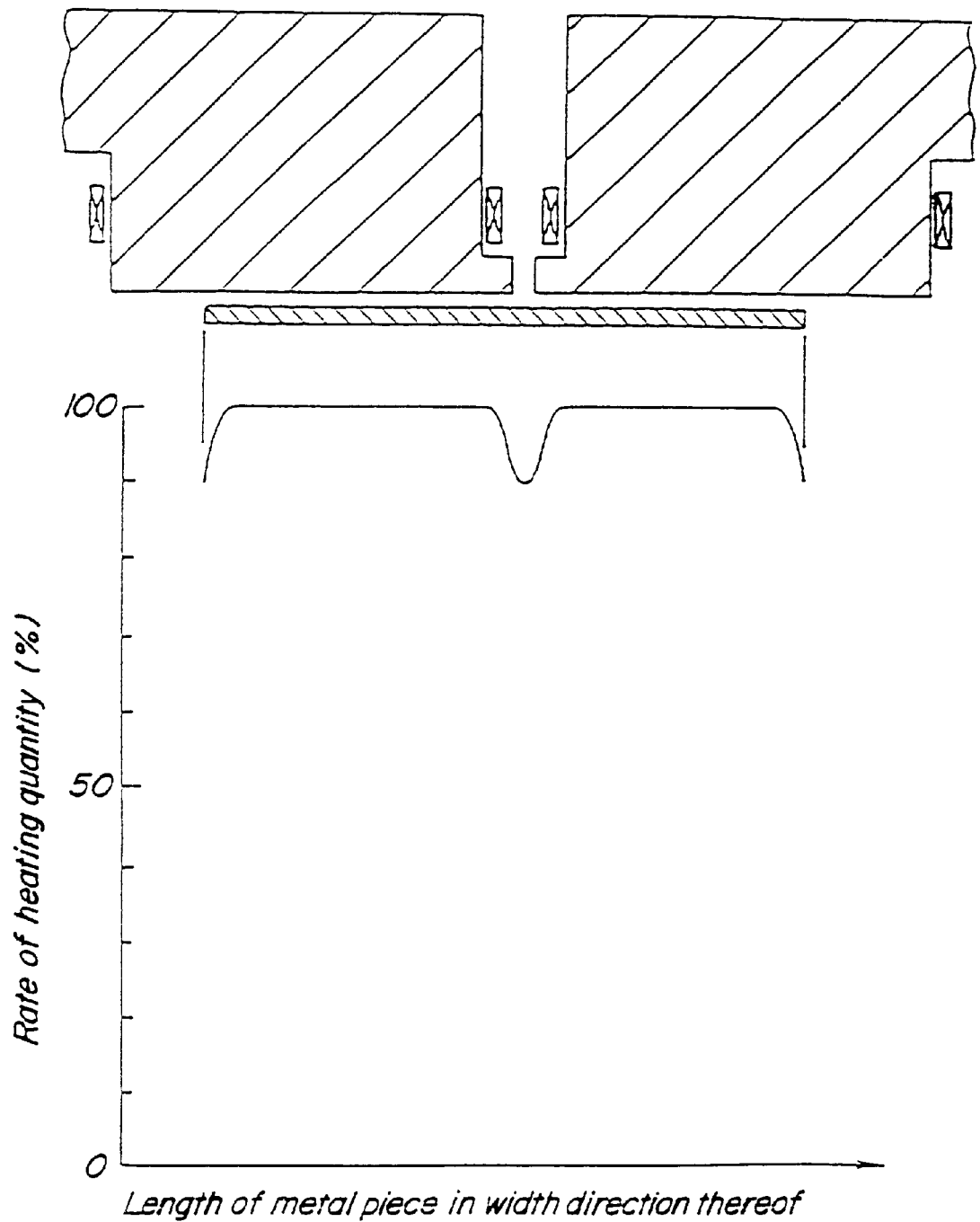
FIG_72

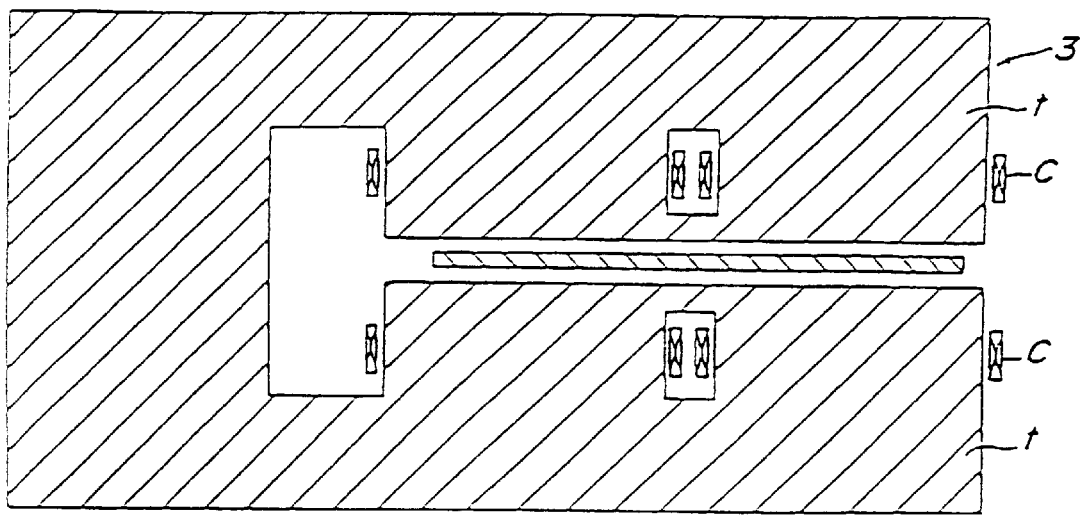
FIG_73

METHOD AND APPARATUS FOR JOINING METAL PIECES

This is a divisional of application U.S. Ser. No. 08/513,789 filed on Dec. 29, 1995 now U.S. Pat. No. 5,951,903 which is a 371 of PCT/JP94/02113 filed Dec. 15, 1994 which is a 371 of PCT

TECHNICAL FIELD

The present invention relates to a metal piece joining method useful for continuous hot rolling, by which a preceding metal piece and a succeeding metal piece are heated and joined with each other at their ends to continuously carry out hot finishing rolling, and also to a joining apparatus which is directly used for carrying out the method.

BACKGROUND ART

Conventionally, in a hot rolling line for metal pieces (for example, steel, aluminum or copper), since the metal pieces have been extracted one by one from a heating furnace, there occurred various problems particularly in the finishing rolling process, as follows.

1) A biting failure at the front end of a metal piece.
2) A defective stamping at the rear end of a metal piece (a phenomenon that a corner at the rear end of a thin metal piece is bent).
3) A traveling problem of the front end of a metal piece occurring on a run-out table.
4) A defective dimension at the front and rear ends of metal pieces.

As means for solving the above-mentioned problems, there has been proposed a so-called endless rolling in which metal pieces to be rolled are joined at their rear and front ends before the finishing rolling, and continuously supplied to the fomoshinh rolling line to carry out the hot rolling.

As prior documents in this regard, a number of propositions can be found, for example, in Japanese Patent Laid-open Publication Nos. 60-244401, 61-144203, 62-234679, 4-89109, 4-89115 and 4-89110.

When carrying out the endless rolling of metal pieces, the following process has been generally performed. That is, firstly, on the entry side of a rolling equipment, a small gap is provided between a preceding metal piece and a succeeding metal piece at the ends thereof and these metal pieces are opposed substantially in parallel with each other. Further, a portion in the vicinity of the end of each metal piece is clamped and supported by clamps, and the end regions on the opposed faces of the metal pieces, which are portions to be joined, are heated by a heating means. The both metal pieces are then pressed against each other to be joined. In the joining method for metal pieces using such a process, various disadvantages which will be described below have still remained and an improvement in this regard has been desired.

1) In the joining form of this type, there is provided an inductor having a pair of magnetic poles vertically sandwiching the portions to be joined in the metal pieces. With the inductor, an alternating magnetic field running through the metal pieces in the thickness direction thereof is applied, and a surface layer at the portions to be joined, or on the opposed surfaces in particular is intensively heated by the induced current generated at this time. The induced current is, however, hard to flow at corners of the front and rear ends of the metal pieces, and the heating temperature at the portions to be joined thus gradually lowers toward the wide ends. Thus, there is such a disadvantage that the portions to be joined cannot be joined over the full width thereof when pressing the metal pieces against each other.

In this case, the wide ends having a low temperature function as a resistance when pressing the metal pieces against each other, if the temperature at the portions to be joined does not reach a target heating temperature, so that a pressing apparatus having a capacity above a necessary level must be installed. Also, since a sufficient joining strength cannot be secured, the joined portions are gradually separated as the rolling proceeds and the metal plate are ruptured so that a serious accident may occur. In order to solve such a problem, it is most effective to continue the heating until the temperature at the corners of the steel pieces reaches a target value. However, since the temperature in regions other than the corners (i.e., central regions in the plate width direction) reaches a melting temperature and the metal pieces are melted down in these regions, excellent joined portions cannot be obtained. In addition, such a heating may deteriorate the surface quality of the plate at the portions after rolling which correspond to the joining portions or other portions close thereto, and the input electrical power has to be increased as well.

2) In the induction heating method using the inductor, since a variation rate of magnetic fluxes (a variation rate of the number of magnetic fluxes) is proportional to the current to be induced, the variation rate becomes large as the number of magnetic fluxes running through the metal pieces is large at the peak of the alternating current which flows in a coil of the inductor, thus increasing the scale of the current. Further, since a vertical component in the magnetic flux generated by the inductor for the surface of the magnetic pieces advantageously contributes to the generation of the induced current, the induced current can be increased as the magnetic flux running through the magnetic pieces becomes vertical.

However, in the metal piece heating and joining to which the induction heating method is applied, if the positional relationship between the inductor and the ends of the respective metal pieces (the position of the inductor in the longitudinal direction of the metal pieces in particular) is inadequate, the number of magnetic fluxes running through the metal pieces is insufficient and the vertical component of the magnetic flux is also disadvantageously reduced. Further, for example, in a conventional method disclosed in Japanese Patent Laid-open Publication No. 62-234679 mentioned above, this kind of disadvantage is not considered therein, and the satisfactory heating speed cannot be obtained depending on the positional relationship between the inductor and each metal piece, involving a prolongation of the heating time. Also, since the preceding metal piece and the succeeding metal piece are not uniformly and equally heated, an excellent joining cannot be realized.

3) When heating the metal pieces, if the preceding metal piece and the succeeding metal piece are different in the initial temperature or in the plate thickness, or if the metal pieces having different melting points are heated, an appropriate heating cannot be performed in accordance with each metal piece, and a sufficient strength cannot be given to the joined metal pieces. In such a case, the plates may be ruptured from their joined portions during rolling, resulting in a serious accident.

4) There is proposed a joining method employing a so-called non-contact heating in which the preceding and succeeding metal pieces are heated with a space therebetween and the up-setting is then performed for joining (Japanese Patent Laid-open Publication No. 60-244401). According to this method, although the uniform magnetic flux must be given to the metal pieces over the full width thereof, the uniform magnetic flux is restrictedly given to the width of not more than 1000 mm mainly from a viewpoint of design in the power supply of the inductor. In the case of a larger width, for example, a width of 1900 mm, a pair of inductors are required (the limit in the capacity of one inductor is 2000 through 3000 kW, and practical use of an inductor which has a capacity of not less than 4000 kW and can deal with the width of 1900 mm is difficult). It is therefore difficult to give a uniform magnetic flux running through the metal piece over the full width thereof.

5) For heating the preceding and succeeding metal pieces in a relatively short time for joining, there is an induction heating rolling method, as a heating means, in which air-core type coil is used to induction-heat the rear end of the preceding metal piece and the front end of the succeeding metal piece and the both ends of these metal pieces are then pressed against each other for joining (Japanese Patent Laid-open Publication No. 60-244401). In this method, however, since the metal pieces to be joined are inserted into the coil and heated, this method cannot be applied to a metal piece whose dimension is larger than the inner dimension of the coil. On the other hand, in the case where both metal pieces have a small width, such a problem does not occur though a part of the magnetic fluxes does not contribute to heat the metal pieces, thereby deteriorating the heating efficiency for the input power. Further, in connection with the above item 4), in the case where the metal pieces are heated using a plurality of inductors, since the magnetic flux is not generated from a portion corresponding to a part between inductors adjacent to each other, the magnetic flux running through the metal piece is locally decreased and the temperature rise at this portion is insufficient. It is therefore important to make a space between the adjacent inductors as small as possible, but the space between the adjacent inductors cannot be reduced at a stage of securing facilities. Thus, the temperature distribution of the metal pieces in the width direction thereof inevitably becomes uneven.

6) Although a preferred temperature at the opposed faces (the end faces) of the metal pieces can be usually within a range of approximately 1350 to 1400° C., in the case where the metal pieces joined at such a temperature are rolled by a finishing rolling mill composed of a plurality of stands which functions after joining with a draft percentage increased by 10 times or more, all kinds of steel cannot be rolled without causing rupture at the joining portions until the completion of rolling.

In the endless rolling of the metal pieces, since the timing of the processing for joining the metal pieces must match with that of the rolling process, it is general to provide a movable joining apparatus placed on the entry side of a group of finishing rolling mills so that it can follow the movement of the steel pieces, or to provide an apparatus such as a looper having a timing buffer function between the joining apparatus and the rolling facilities. This involves an extension of the line or provision of new apparatuses, thereby disadvantageously increasing the facility cost. However, in regard of this problem, a proposition disclosed, e.g., in Japanese Patent Laid-open Publication No. 4-89120 has been given and the problem has been already improved.

The present invention intends to achieve the following objects.

1) On the entry side of the hot finishing rolling facilities, the preceding metal piece and the succeeding metal piece are uniformly heated over the full width thereof and, when pressing the metal pieces against each other, the joining is carried out until a sufficient strength can be obtained (until such a strength that the plates are not ruptured during rolling can be secured), thereby performing a stable rolling operation.

2) The both metal pieces are heated in an appropriate range of temperature and joined with a sufficient strength being given thereto irrespective of temperature or thickness of the metal pieces to be joined or kinds of the plates.

3) Even if a plurality of inductors for generating magnetic fluxes are used, a stable heating and joining are realized by making uniform phases of currents to be supplied to the respective inductors.

4) The metal pieces are heated and joined with a good efficiency in a short time irrespective of difference in sizes of the metal pieces and widths of the same in particular.

5) Irrespective of the kinds of the metal pieces to be joined, an excellent joining is realized by giving such an advantageous heating condition that problems such as rupture of the plates do not occur in the succeeding finishing rolling process.

DISCLOSURE OF THE INVENTION

The above-mentioned objects which are tasks to be solved by the invention can be attained by adopting the following measures.

1) A method for joining metal pieces wherein a rear end of a preceding metal piece and a front end of a succeeding metal piece are heated and the metal pieces are pressed against each other for joining before hot finishing rolling, characterized in that the rear end of the preceding metal piece and the front end of the succeeding metal piece are opposed with a space therebetween, and an alternating magnetic field running through the metal pieces in the thickness direction thereof is generated at end regions of the opposed faces of the respective metal pieces to perform heating; and another alternating magnetic field reverse with respect to the former alternating magnetic field is partially generated in the end regions of the opposed faces of the metal pieces and in either a region where the metal pieces exist or a region outside width ends of the metal pieces (the outside of the width ends of the metal pieces), thereby adjusting a temperature distribution in the end regions of the opposed faces of the metal pieces in the width direction thereof.

2) A method for joining metal pieces wherein a rear end of a preceding metal piece and a front end of a succeeding metal piece are heated and the metal pieces are pressed against each other for joining before hot finishing rolling, characterized in that the rear end of the preceding metal piece and the front end of the succeeding metal piece are opposed with a space therebetween and an alternating magnetic field running through the metal pieces in the thickness direction thereof is generated at end regions of the opposed faces of the respective metal pieces to perform heating, wherein another alternating magnetic field reverse with respect to the former alternating magnetic field is partially generated in either a region where the metal pieces exist or a region outside width ends of the metal pieces, by arranging reverse magnetic field generation portions of a plurality of reverse magnetic field generation circuits each having the reverse magnetic field generating portion and a switch connected to the reverse magnetic field generating portion in the end regions of the opposed faces of the metal pieces in the width direction thereof and controlling so as to open and/or close the switch of each reverse magnetic field generation portion, thereby adjusting a temperature distribution in the end regions of the opposed faces of the metal pieces in the width direction thereof.

3) The region for generating the reverse alternating magnetic field preferably comprises at least one of a region in which a temperature rapidly reaches a target heating temperature in the width direction of the metal pieces as compared with other regions, and a region outside a central region of the metal piece in the width direction thereof or the width ends of the metal piece.

4) A method for joining metal pieces wherein a rear end of a preceding metal piece and a front end of a succeeding metal piece are heated and the metal pieces are pressed against each other for joining before hot finishing rolling, characterized in that the rear end of the preceding metal piece and the front end of the succeeding metal piece are opposed with an interval of space therebetween, and an alternating magnetic field running through the metal pieces in the thickness direction thereof is generated at end regions of the opposed faces of the respective metal pieces to perform heating, wherein conductive members are provided to the both width ends of at least one of the rear end of the preceding metal piece and the front end of the succeeding metal piece with a space between the conductive member and the metal piece, thereby improving the heating efficiency in the width ends of the metal piece by this member.

5) The members set forth in 4) are preferably arranged over both the preceding metal piece and the succeeding metal piece.

6) A method for joining metal pieces wherein a rear end of a preceding metal piece and a front end of a succeeding metal piece are heated and the metal pieces are pressed against each other for joining before hot finishing rolling, characterized in that the rear end of the preceding metal piece and the front end of the succeeding metal piece are opposed with a space therebetween, and an alternating magnetic field running through the metal pieces in the thickness direction thereof is generated at end regions of the opposed faces of the respective metal pieces to perform heating, wherein the both width ends of at least one of the rear end of the preceding metal piece and the front end of the succeeding metal piece are brought into contact with conductive members, thereby improving the heating efficiency in the width ends of the metal piece by these members.

7) A method for joining metal pieces wherein a rear end of a preceding metal piece and a front end of a succeeding metal piece are heated and the metal pieces are pressed against each other for joining before hot finishing rolling, characterized in that the rear end of the preceding metal piece and the front end of the succeeding metal piece are opposed with a space therebetween, and an alternating magnetic field running through the metal pieces in the thickness direction thereof is generated in an end region on the opposed faces of the respective metal pieces by an inductor to perform heating, wherein members consisting of magnetic substance whose depth is two to 10 times as large as an osmotic depth $d_0$ of induced current which can be expressed by the following equation are provided in a gap between each of the metal piece and the inductor and in a region which is not more than 10 times as large as the osmotic depth $d_0$ and inside the width end of the metal piece, thereby enhancing the density of the magnetic flux of the alternating magnetic field to improve the heating efficiency in the width ends of the metal piece by these members.

$$d_0=\{\rho\times10^7/(\mu\times f)\}^{1/2}/2\pi,$$

where $d_0$: osmotic depth of the induced current (m)

f: frequency of the alternating magnetic field (Hz)

$\rho$: electric resistivity ($\Omega$*m)

$\mu$: relative magnetic permeability

8) A method for joining metal pieces wherein a rear end of a preceding metal piece and a front end of a succeeding metal piece are heated and the metal pieces are pressed against each other for joining before hot finishing rolling, characterized in that the rear end of the preceding metal piece and the front end of the succeeding metal piece are opposed with a space therebetween, and an alternating magnetic field running through the metal pieces in the thickness direction thereof is generated in an end region on the opposed faces of the respective metal pieces by an inductor to perform heating, wherein an overlap width L (m) of each metal piece and a magnetic pole of the inductor in the longitudinal direction of each metal piece is so adjusted as to satisfy the following expression.

$$L\geq 2*d_0,$$

where $d_0$: osmotic depth of the induced current (m)

$$(d_0=\{\rho\times10^7/(\mu\times f)\}^{1/2}/2\pi)$$

where f: frequency of the alternating magnetic field (Hz)

$\rho$: electric resistivity ($\Omega$*m)

$\mu$: relative magnetic permeability

9) A method for joining metal pieces wherein a rear end of a preceding metal piece and a front end of a succeeding metal piece are heated and the metal pieces are pressed against each other for joining before hot finishing rolling, characterized in that the rear end of the preceding metal piece and the front end of the succeeding metal piece are opposed with a space therebetween, and an alternating magnetic field running through the metal pieces in the thickness direction thereof is generated in an end region on the opposed faces of the respective metal pieces by an inductor to perform heating, wherein a relative position of a magnetic pole of the inductor and each metal piece in the longitudinal direction is changed to adjust a penetration quantity of the magnetic fluxes of the alternating magnetic field for each magnetic piece.

10) A method for joining metal pieces wherein a rear end of a preceding metal piece and a front end of a succeeding metal piece are heated and the metal pieces are pressed against each other for joining before hot finishing rolling, characterized in that the rear end of the preceding metal piece and the front end of the succeeding metal piece are opposed with a space therebetween, and an alternating magnetic field running through the metal pieces in the thickness direction thereof is generated in an end region on the opposed faces of the respective metal pieces by a plurality of inductors arranged in the width direction of the metal pieces to heat the respective metal pieces, wherein a synchronous control of the phase is performed in such a manner that the current having the same phase flows in a coil of each inductor.

11) A method for joining metal pieces wherein a rear end of a preceding metal piece and a front end of a succeeding metal piece are heated and the metal pieces are pressed against each other for joining before hot finishing rolling, characterized in that the rear end of the preceding metal piece and the front end of the succeeding metal piece are opposed with a space therebetween, and an alternating magnetic field running through the metal pieces in the thickness direction thereof is generated in an end region on the opposed faces of the respective metal pieces by a plurality of inductors arranged in the width direction of the metal pieces to heat the respective metal pieces, wherein the space between magnetic poles of the inductors adjacent to each other is set to not more than five times as large as an osmotic depth do of the induced current represented by the following expression.

$$d_0 = \{\rho \times 10^7/(\mu \times f)\}^{1/2}/2\pi,$$

where $d_0$: osmotic depth of the induced current (m)

f: frequency of the alternating magnetic field (Hz)

$\rho$: electric resistivity ($\Omega$*m)

$\mu$: relative magnetic permeability

12) A method for joining metal pieces wherein a rear end of a preceding metal piece and a front end of a succeeding metal piece are heated and the metal pieces are pressed against each other for joining before hot finishing rolling, characterized in that a temperature T (° C.) in a heating region of the preceding metal piece and the succeeding metal piece is adjusted to be within a range of the following expression.

$$T_S \leq T \leq (T_S + T_L)/2,$$

where $T_S$: solidus line temperature of the metal piece (° C.)

$T_L$: liquidus line temperature of the metal piece (° C.)

13) A method for joining metal pieces wherein a rear end of a preceding metal piece and a front end of a succeeding metal piece are heated and the metal pieces are pressed against each other for joining before hot finishing rolling, characterized in that a temperature T (° C.) in a heating region of the preceding metal piece and the succeeding metal piece is adjusted to be within a range of the following expression.

if $T_C \leq T_S$, $$(T_C + T_S)/2 \leq T \leq (T_S + T_L)/2,$$

and if $T_C > T_S$ $$T_S \leq T \leq (T_S + T_L)/2$$

where $T_S$: solidus line temperature of the metal piece (° C.)

$T_L$: liquidus line temperature of the metal piece (° C.)

$T_C$: melt temperature of an iron oxide scale (° C.)

14) An apparatus for joining metal pieces comprising an inductor having at least a pair of magnetic poles sandwiching the metal pieces in the thickness direction thereof with a gap therebetween, characterized in that a reverse magnetic field generation portion of a circuit for generating an alternating magnetic field whose direction is reversed from that of an alternating magnetic field generated by the inductor is provided between the magnetic poles of the inductor.

15) An apparatus for joining metal pieces comprising: an inductor having at least a pair of magnetic poles sandwiching the metal pieces in the thickness direction with a gap therebetween; and a clamp for vertically clamping a preceding metal piece and a succeeding metal piece between the magnetic poles of the inductor for fixing and holding the metal pieces, characterized in that the clamp protrudes from a region where the metal pieces are fixed and held toward the ends of the metal pieces and has a plurality of notch portions made by notching the clamp in the comb-like form at an interval of space in the width direction of the metal pieces, and a reverse magnetic field generation portion of a reverse magnetic field generation circuit for generating an alternating magnetic field whose direction is reversed from that of an alternating magnetic field generated by the inductor is provided to each of the notch portions.

16) A plurality of reverse magnetic generation portions are preferably provided along the width direction of the inductor. Further, each of the reverse magnetic generation portions is preferably composed of a coil of one wind or of a plurality of winds or a U-shaped conductive member and further has a member consisting of magnetic substance.

17) The reverse magnetic filed generation circuit has a switch for opening/closing the circuit and preferably has a variable resistor.

18) An apparatus for joining metal pieces comprising an inductor having at least a pair of magnetic poles sandwiching the metal pieces in the thickness direction thereof with a gap therebetween, characterized by comprising a reverse magnetic field generation circuit having: a reverse magnetic field generation portion for generating an alternating magnetic field whose direction is reversed from that of an alternating magnetic field generated by the inductor; a switch; a lead wire for connecting the switch and the reverse magnetic field generation portion to each other; and an open/close controller for opening and/or closing the switch.

19) An apparatus for joining metal pieces comprising an inductor having at least a pair of magnetic poles sandwiching the metal pieces in the thickness direction thereof with a gap therebetween, characterized by comprising a member consisting of magnetic substance which is provided between the magnetic poles and increases a density of magnetic flux of an alternating magnetic field generated by the inductor at width ends of the metal pieces.

20) An apparatus for joining metal pieces comprising an inductor having at least a pair of magnetic poles sandwiching the metal pieces in the thickness direction thereof with a gap therebetween, characterized by comprising a conductive member which is provided between the magnetic poles and outside width ends of the metal pieces in the width direction with a gap or provided contacting with the width ends.

21) An apparatus for joining metal pieces comprising an inductor having at least a pair of magnetic poles sandwiching the metal pieces in the thickness direction thereof with a gap therebetween, characterized by comprising a moving mechanism being capable of moving the inductor in the longitudinal direction of the metal pieces.

22) An apparatus for joining metal pieces comprising at least two sets of inductors each having a pair of magnetic poles sandwiching the metal pieces in the thickness direction thereof, characterized in that a power supply inverter is provided to each of the inductors and each power supply inverter is connected to a phase control circuit.

23) An apparatus for joining metal pieces comprising at least two sets of inductors each having a pair of magnetic poles sandwiching the metal pieces in the thickness direction thereof, characterized by comprising projections provided on adjacent surfaces of the magnetic poles of the inductors in such a manner that the projections are brought into contact with each other or decrease an interval of space therebetween.

BRIEF DESCRIPTION OF THE DRAWINGS

FIG. 2 is an explanatory view showing the point of heating according to a prior art;

FIG. 3 is an explanatory view showing the state of heating metal pieces;

FIG. 4 is an explanatory view showing the state where cracks are generated in a joined portion of metal pieces;

FIG. 5 is a view typically showing a structure of a circuit;

FIG. 6 is a view showing a structure of an apparatus preferable for carrying out the present invention;

FIG. 7 is a view showing the state of joining metal pieces;

FIG. 8 is an explanatory view showing the state where joined metal pieces are ruptured;

FIG. 9 is a view showing a structure of an apparatus according to the present invention;

FIGS. 26(a), (b) and (c) are explanatory views showing cases where metal pieces are heated and joined in accordance with the present invention;

FIGS. 38(a) and (b) are views showing a structural example of an inductor;

FIG. 39 is a view showing the state of distribution of magnetic fluxes;

FIG. 40 is a view showing the state of distribution of magnetic fluxes;

FIG. 41 is a graph showing the relationship between $L/d_0$ and the temperature rising speed; in which metal pieces are heated and joined by arranging members consisting of magnetic substance;

FIG. 44 is an explanatory view showing a case where a penetration quantity of magnetic fluxes is adjusted;

FIG. 45 is view showing the relationship between the temperature rising speed ratio and $L/d_0$ (space g);

FIG. 46 is a view showing a structure of a moving mechanism of an inductor;

FIG. 47 is a view showing a structure of a moving mechanism of an inductor;

FIG. 48 is a view showing a structure of a moving mechanism of an inductor;

FIGS. 49(a) and (b) are explanatory views showing the points of heating and joining metal pieces;

FIG. 50 is a view showing the state in which an inductor is arranged;

FIG. 52 is a block diagram showing a control system of inductors according to the present invention;

FIG. 69 is a view showing a state in which an inductor is arranged;

FIG. 70 is a view typically showing inductors;

FIG. 71 is a graph showing the relationship between the width dimension of a metal piece and the rate of heating quantity;

FIG. 72 is a graph showing the relationship between the length in a width direction of a metal piece and the rate of heating quantity; and FIG. 73 is a view showing an example of an inductor which is preferable for embodying the present invention.

BEST MODE FOR CARRYING OUT THE INVENTION

In case of heating metal pieces to be joined by generating an alternating magnetic field running through the metal pieces in a thickness direction thereof, the present invention partially generates another alternating magnetic field reversed from the above alternating magnetic field in either of a region where the metal pieces exist or another region outside the width ends of the metal pieces to adjust the temperature distribution in the plate width direction. The present invention will now be described in detail hereinafter with reference to the drawings.

Figure 1:
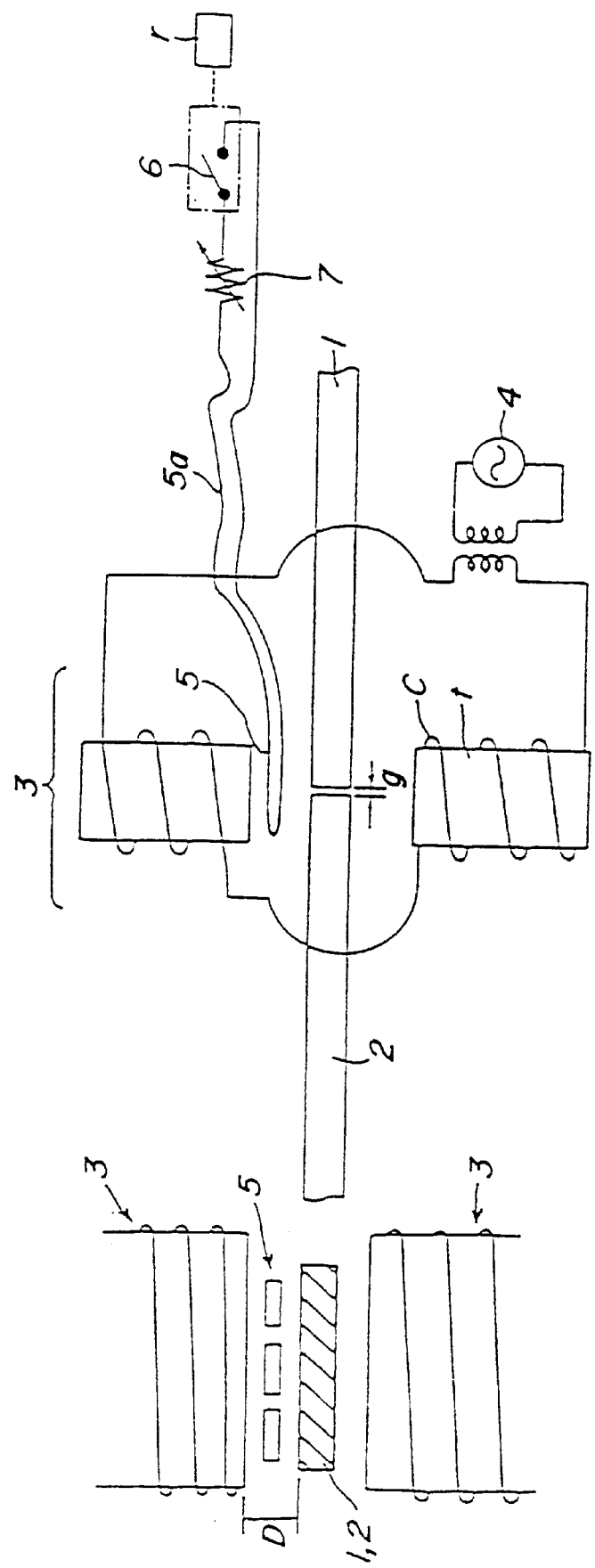
FIG. 1 is an explanatory view showing the point of heating according to the present invention.

FIG. 1 shows a structure of a joining apparatus preferable for adjusting the temperature distribution at ends of metal pieces in the width direction thereof in case of heating and joining the metal pieces. In the drawing, reference numeral 1 denotes a metal piece (referred to as a preceding metal piece hereinbelow) precedently carried; 2, a metal piece (referred to as a succeeding metal piece hereinbelow) carried after the preceding metal piece 1; 3, at least a pair of inductors for heating composed of a coil c and a core t and sandwiching the preceding metal piece 1 and the succeeding metal piece 2 in the thickness direction thereof with a gap D (although the gap D is a space, any electrical insulator may be provided thereto) therebetween. An alternating magnetic field running through the metal pieces in the thickness direction thereof is generated by the inductors 3 to heat the end region of the opposed faces until the temperature in this region reaches a predetermined value.

Further, reference numeral 4 designates a power supply of the inductors 3; and 5, a reverse magnetic field generation portion of a reverse magnetic field generation circuit (an electric circuit). A lead wire 5a is connected to the both ends of the loop type reverse magnetic field generation portion 5 to form a closed circuit including these ends, and an alternating magnetic field reversed from the alternating magnetic field produced by the inductors 3 is generated by flowing an induced current when heating by the inductors 3 or by positively flowing a current (from any other power supply, for example). In addition, reference numeral 6 represents a switch having an open/close controller r; and 7, a variable resistor.

As shown in FIG. 2, the preceding metal piece 1 and the succeeding metal piece 2 are opposedly provided with a gap g therebetween, which is a gap of approximately a few to tens mm and may be an interval of space, or any other electrical insulator may be provided to this gap. When the alternating magnetic field running in the plate thickness direction is generated by the inductors 3, a current e as shown in FIG. 3 is induced by the alternating magnetic field in the end region of the opposed faces of the metal pieces which will be joined to each other, and this portion is heated in a extremely short time by the heat produced at this time.

Since the current e is difficult to flow at corners f of the metal pieces 1 and 2, the degree of temperature rise is small at the corners f. If the heating and temperature rise are tried until the temperature at which the joining is possible, the central region in the plate width direction is likely to be melted down. On the other hand, even if the joining of the metal pieces only in the central region thereof is tried, cracks such as shown in FIG. 4 may be developed during rolling because of insufficiency of the joining strength in the width end region, and there is such a disadvantage that the rolling cannot be continued.

In the present invention, since portions to be joined are heated by the inductors 3 and the alternating magnetic field reversed from the alternating magnetic field d produced by the inductors 3 is generated by such a reverse magnetic field generation circuit as shown in FIG. 5 (by flowing the induced current in the circuit by main magnetic fluxes of the inductors 3 or positively flowing such a current that the reverse magnetic field is generated) in a region where the temperature largely varies (a region which is located in the width direction of the metal pieces and where the temperature reaches a target heating temperature faster than in any other regions) and in a central region in the plate width direction where the temperature greatly raises in particular to weaken the strength of the magnetic field in the portions to be joined, an excessive heating in these portions can be suppressed.

Although the heating time is prolonged to some extent because the heating is carried out with such a reverse magnetic field being generated, the corners of the metal pieces at which the temperature rise is difficult can be heated until the temperature reaches a predetermined range without a fear of melt down in the central region in the plate width direction. As a result, the temperature distribution in the width direction becomes substantially uniform, thereby ensuring the satisfactory joining strength.

In a concrete structure of an apparatus for adjusting the temperature, as shown in FIG. 6, a plurality of reverse magnetic field generation portions 5 are previously arranged in parallel with the plate width direction of the metal pieces 1 and 2, and switches 6 to be connected to the reverse magnetic field generation portions 5 which are located in a region where suppression of the temperature rise is desired when heating are closed to generate a reverse magnetic field.

Further, if the quantity of current flowing in the reverse magnetic field generation circuit is varied by adjusting a variable resistor 7 as shown in FIG. 1, for example, the scale of the reverse magnetic field is adjusted, thereby further accurately adjusting the temperature. In the case where a plurality of reverse magnetic field generation circuits are provided, it is effective to provide a variable resistor 7 for each circuit for adjusting an impedance of each circuit. It is also possible to additionally provide a coil, a capacitor or others, and at least one of these members may be used to adjust the impedance of each reverse magnetic field generation circuit. If a desired impedance is given to each reverse magnetic field generation circuit by a variable resistor 7, for example, a desired strength of the reverse magnetic field can be obtained. Also, phases of the respective circuits are unified, thereby relatively freely adjusting the temperature of the metal pieces in the width direction thereof.

In the state of arrangement as shown in FIG. 6, in the case where the reverse magnetic field generation portions 5 are arranged outside the plate width ends of the metal pieces and the reverse magnetic generation circuits are closed to flow the induced current therethrough, magnetic fluxes outside the width ends of the magnetic pieces can be converged at the corners f of the magnetic pieces, and it is hence extremely advantageous to enhance the heating efficiency at the corners f.

When heating the metal pieces, the metal pieces may be pressed against each other (the pressing may be carried out while heating or after heating). In such a case, the preceding metal piece 1 and the succeeding metal piece may be joined being shifted from each other (this state is referred to as dislocation). When the dislocated portion is caught in a roller, an end of one metal piece is bent toward an end of the other metal piece. The dislocated portion deeply encroaches upon a sound portion which will be a product as the number of rolling passes increases as shown in FIG. 8, whereby a thin portion is locally formed. On the other hand, the plate is ruptured due to a variation in a tensile force between stands during rolling, and the rolling may not be continued.

In the present invention, therefore, a dislocation preventing plate 8 having notches u whose tips are opened along the width direction of the metal pieces 1 and 2 is provided as shown in FIG. 9 to join the metal pieces 1 and 2.

In FIG. 9, by connecting the dislocation preventing plate 8 to each clamp 9 having a positioning function for the metal pieces 1 and 2, vertical dislocation of the metal pieces 1 and 2 which can be caused during pressing can be suppressed, so as to minimize the dislocation.

The dislocation preventing plate 8 can avoid the temperature rise of itself during heating the metal pieces 1 and 2 and has the notches u for securing the strength as a pressure plate. When the reverse magnetic field generation portion 5 is engaged with each notch u and the reverse magnetic field is appropriately generated by each reverse magnetic field generation circuit including the reverse magnetic field generation portion, the entire area of the portions of the metal pieces which will be joined can be substantially uniformly heated.

Figure 10:
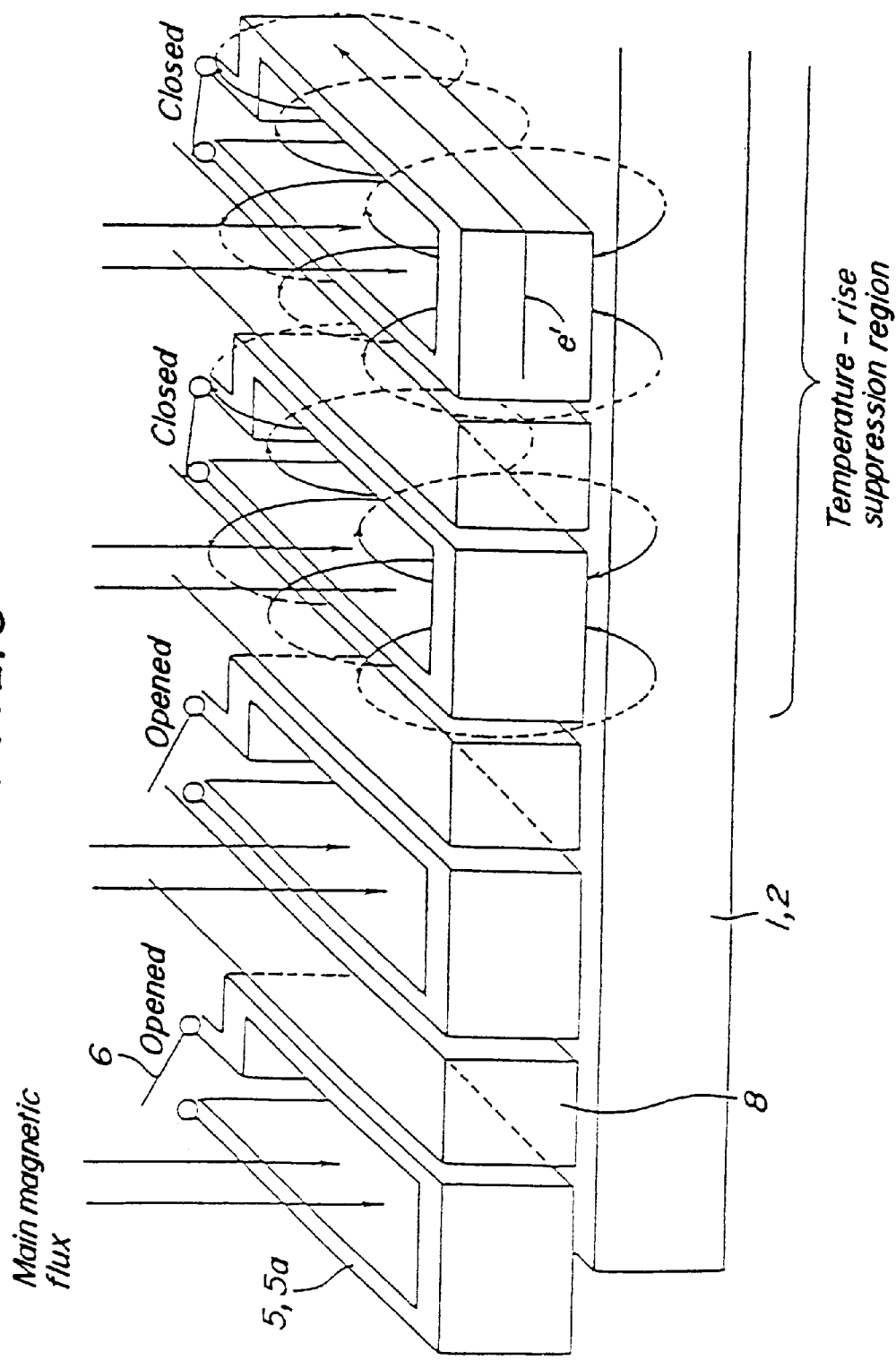
FIG. 10 is a view showing a primary part of the apparatus according to the present invention.

FIG. 10 shows a primary part in a state where the reverse magnetic field generation portions 5 are provided on the dislocation preventing plate 8. As shown in FIG. 10, when loops are formed by closing the switches 6 provided at positions where the suppression of heating is desired, a current e' flows in each reverse magnetic field generation portion 5 and each lead wire 5a in such a direction that the magnetic flux (reverse magnetic flux) which is directed to cancel out the main magnetic flux is generated by the action of electromagnetic induction. In this case, the main magnetic flux is weakened by the reverse magnetic flux to suppress the temperature rise of the metal pieces at portions where the switches 6 are closed.

Figure 11:
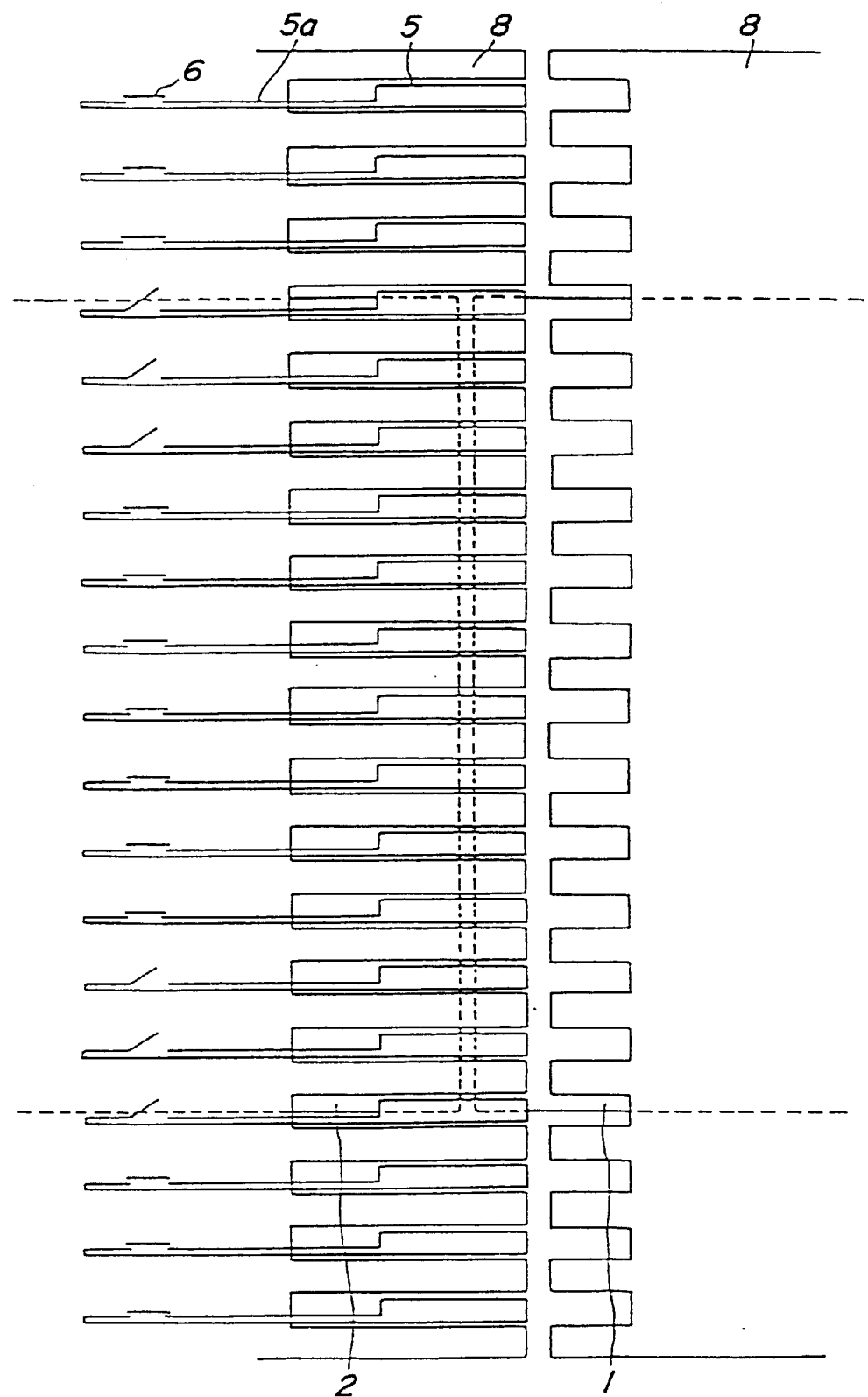
FIG. 11 is an explanatory view showing the point of joining metal pieces according to the present invention.
Figure 12:
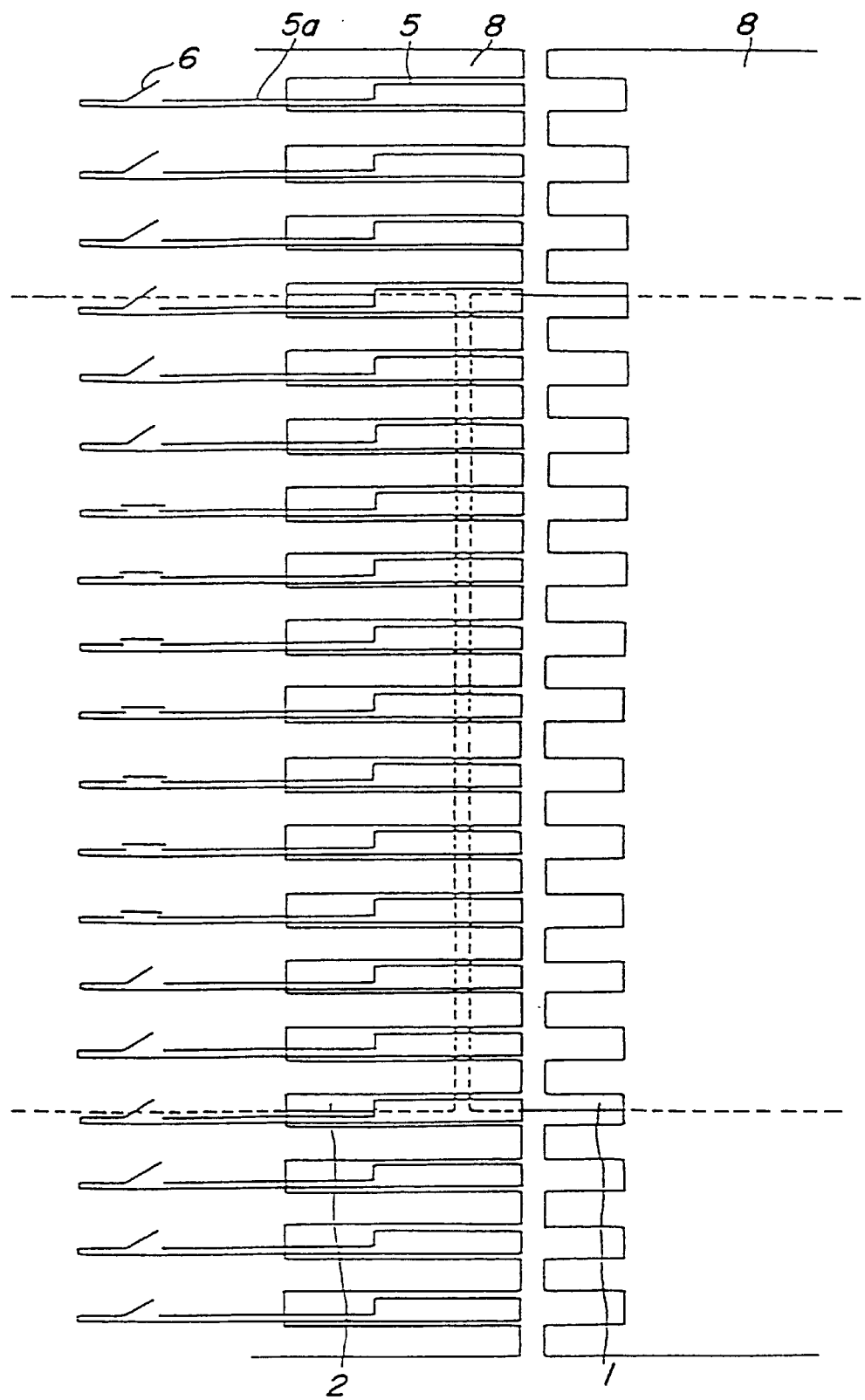
FIG. 12 is an explanatory view showing the point of joining metal pieces according to the present invention.

FIG. 11 shows a structural example of such an apparatus that the degree of temperature rise in the central region of the metal pieces 1 and 2 in the width direction thereof is decreased and the magnetic flux outside the width ends of the metal pieces is converged at the corners f. Further, FIG. 12 shows a structural example of an apparatus which can decrease the degree of temperature rise only in the central region of the metal pieces 1 and 2 in the width direction thereof.

As the dislocation preventing plate, SUS304 and others can be adopted, though any other material having a strength at a high temperature such as titanium, tungsten and others may be used.

Figure 13:
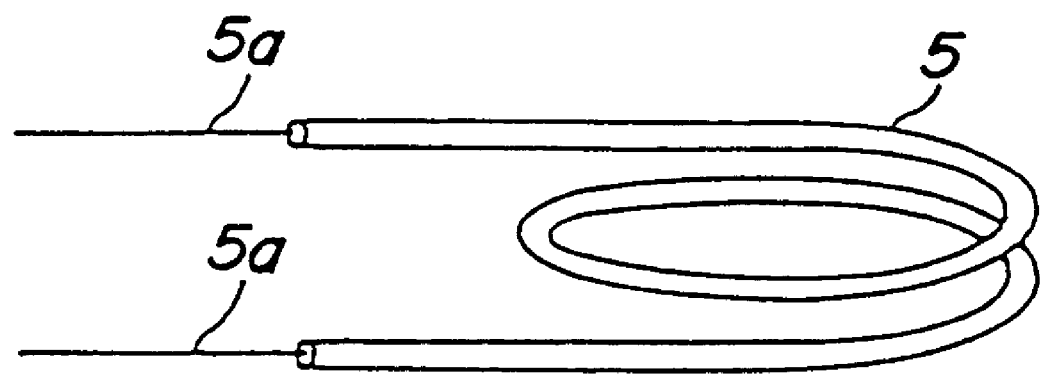
FIG. 13 is a view showing an example of a conductive members.

In this invention, although the U-shaped conductive member (such as Cu) is exemplified as the reverse magnetic field generation portion 5 of the reverse magnetic field generation circuit, a coil type member such as that shown in FIG. 13 can be adopted. In this case, the effect is enhanced as the number of winds increases, though the winds are not restricted to any particular number.

Figure 14:
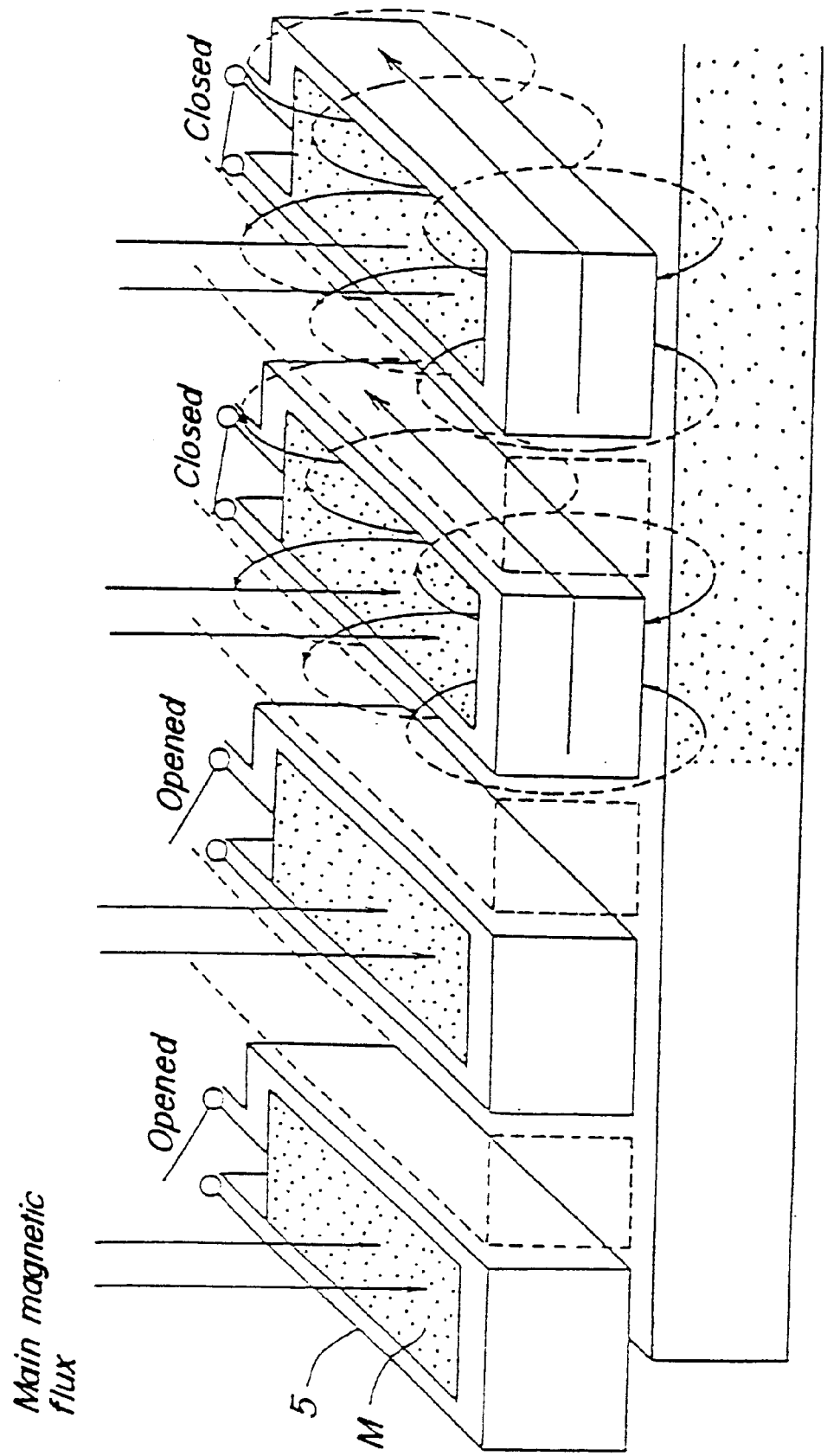
FIG. 14 is a view showing an example of a member consisting of magnetic substance.
Figure 15:
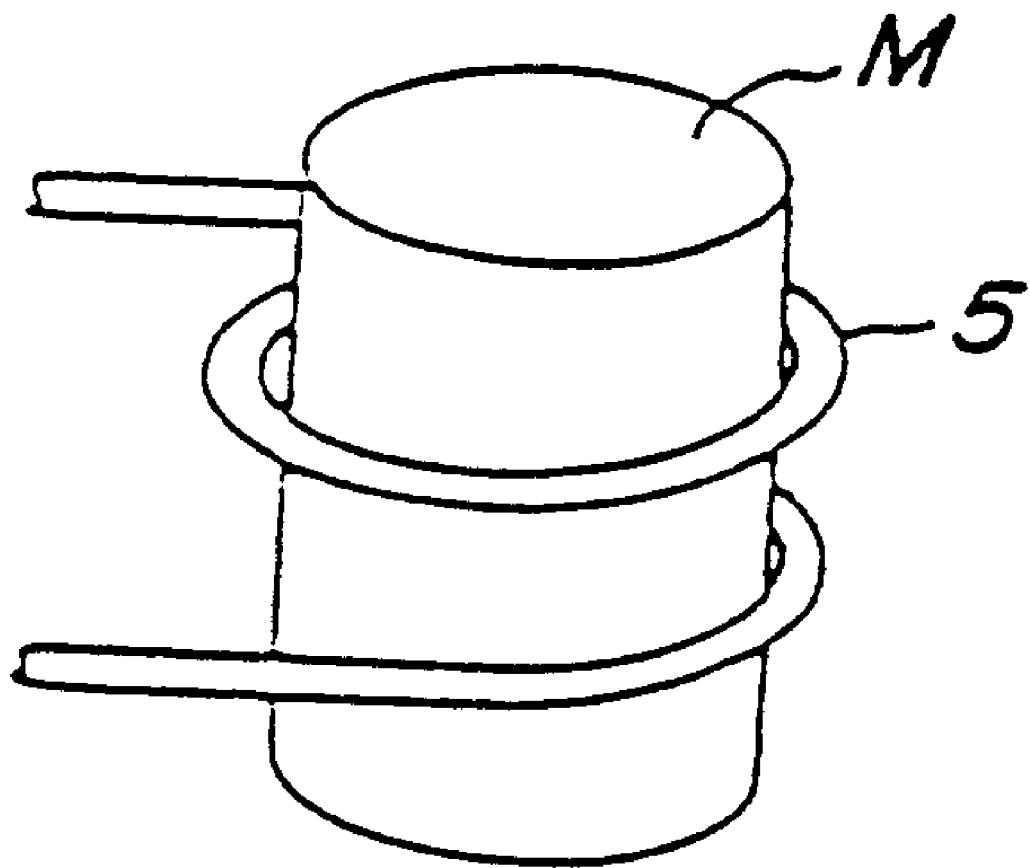
FIG. 15 is a view showing an example of a member consisting of magnetic substance.

In order to increase a value of the current flowing in each reverse magnetic field generation circuit without additionally providing unnecessary units, in this invention, as shown in FIGS. 14 or 15, a member M consisting of magnetic substance (a silicon steel plate or others) may be provided within each reverse magnetic field generation portion 5.

Figure 16:
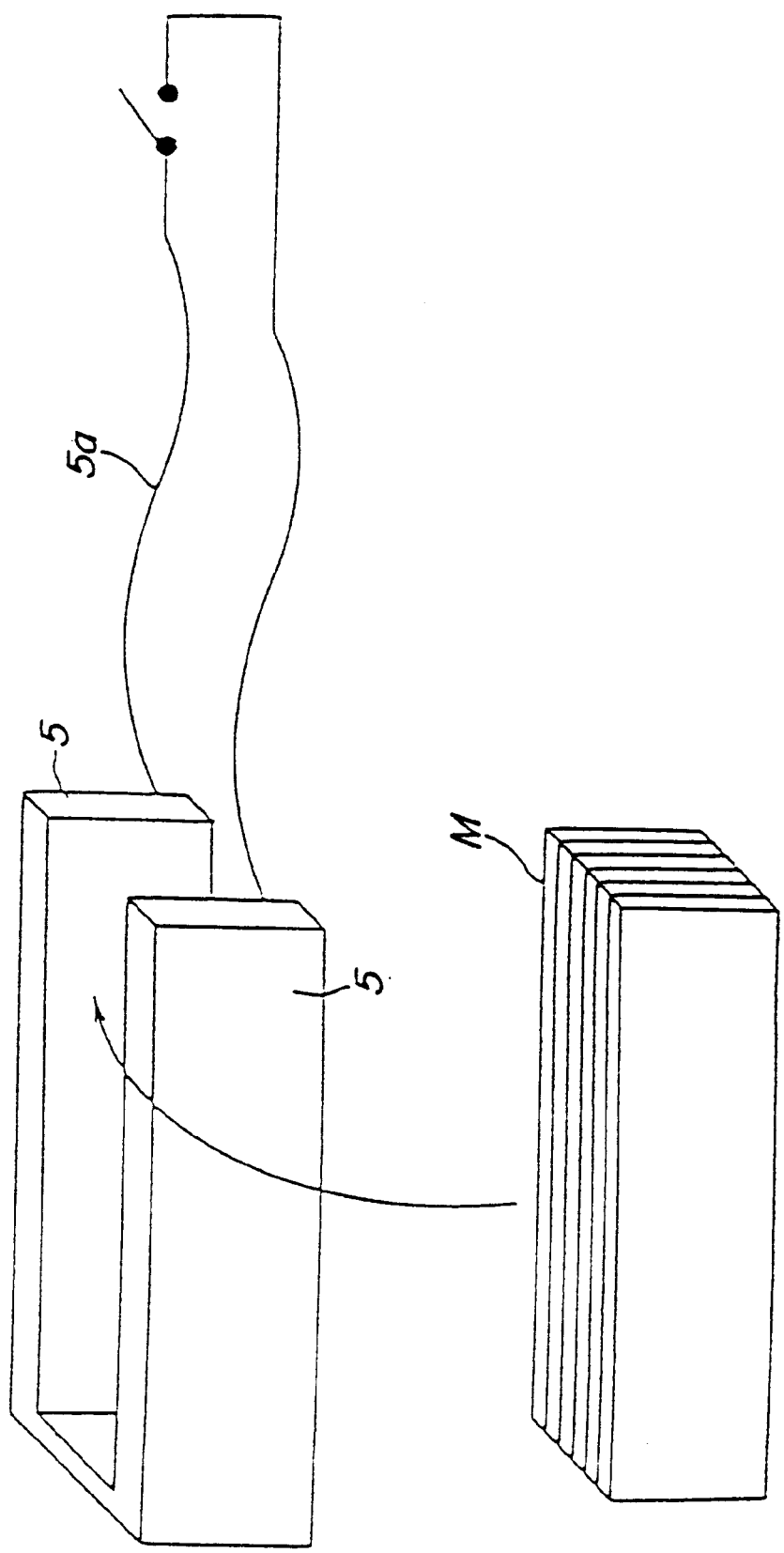
FIG. 16 is a view showing an example of a member consisting of magnetic substance.
Figure 17:
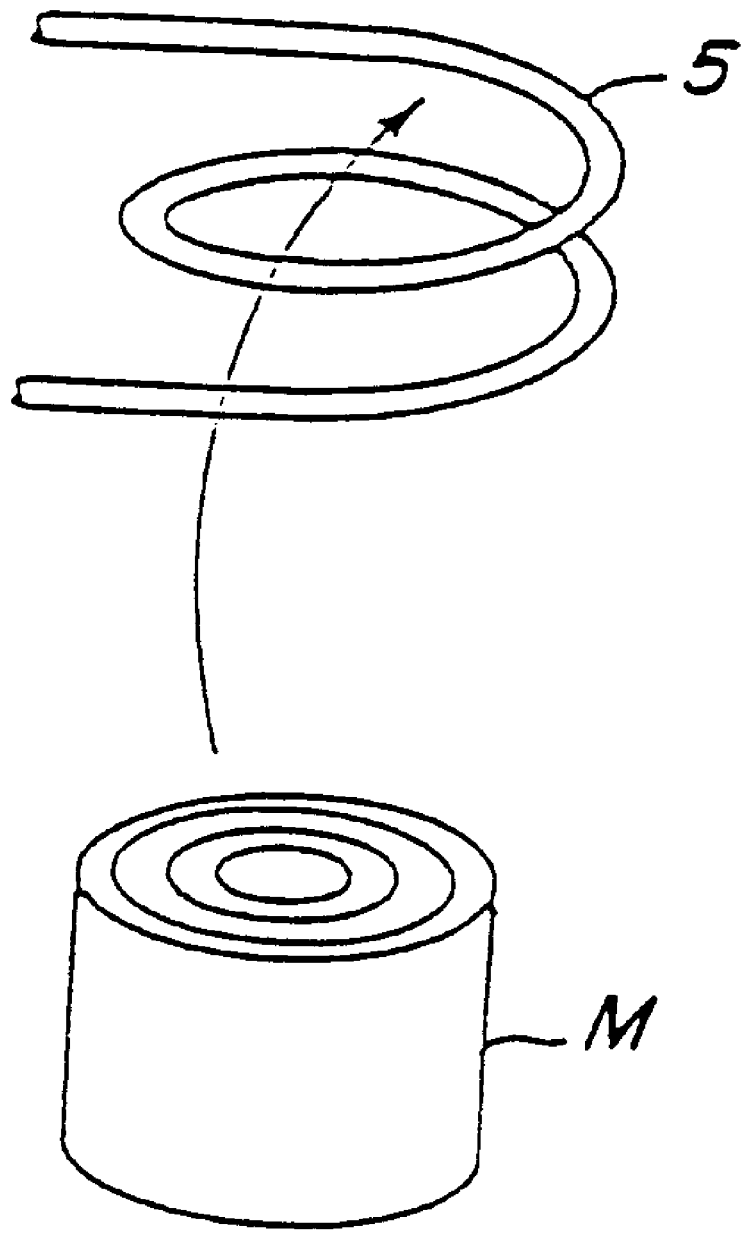
FIG. 17 is a view showing an example of a member consisting of magnetic substance.

Further, in order to prevent the member M from being heated, it is preferable to obtain a structure in which a plurality of members M are superimposed one above the other through insulating films as shown in FIGS. 16 and 17.

Note that such a plate type superimposed body (magnetic substance) as shown in FIG. 16 may be provided in each reverse magnetic field generation circuit having a coil type reverse magnetic field generation portion 5 shown in FIG. 17, instead of a cylindrical superimposed body (magnetic substance).

Figure 18:
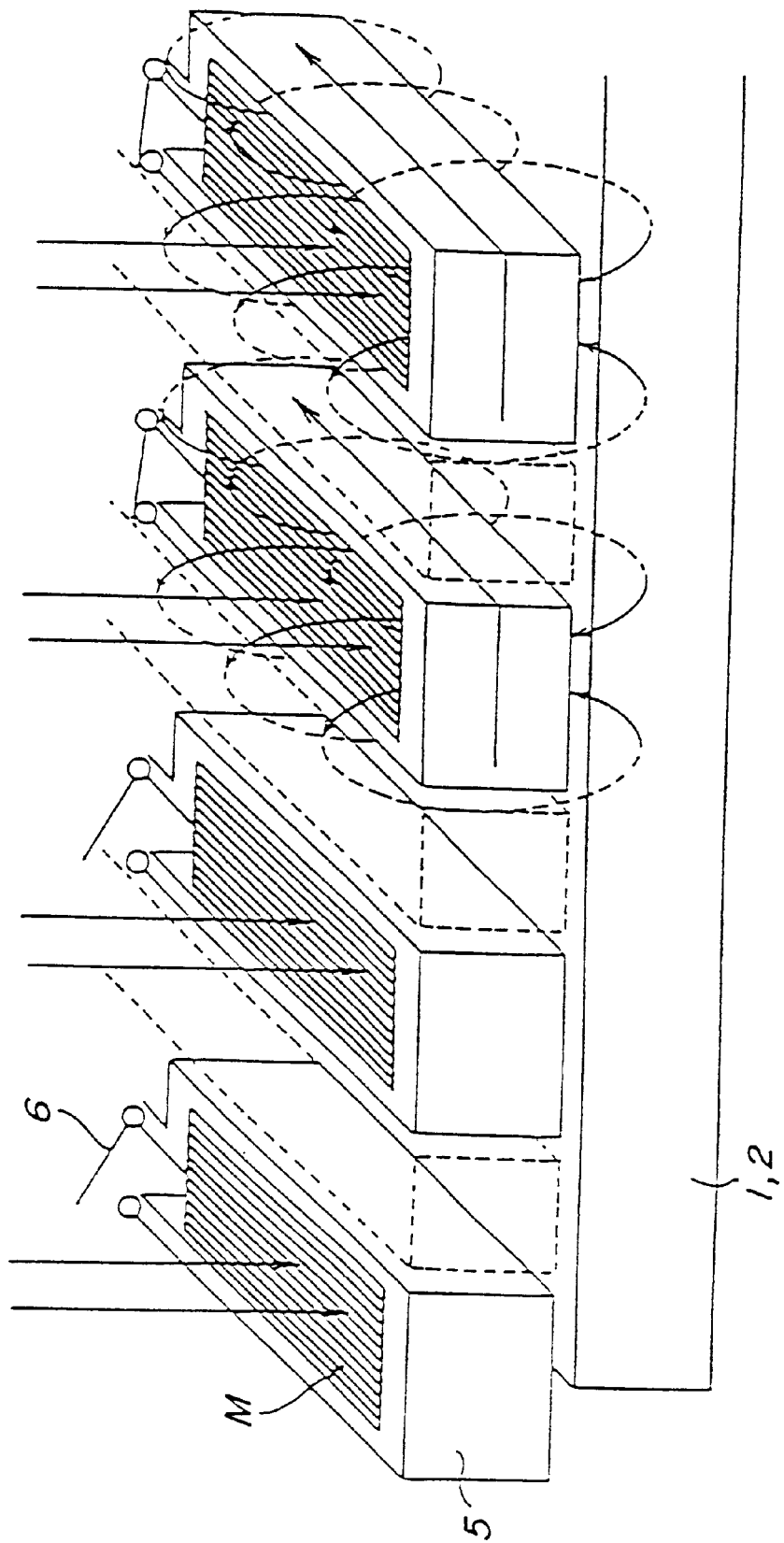
FIG. 18 is a view showing a reverse magnetic field generation portion of a circuit.
Figure 19:
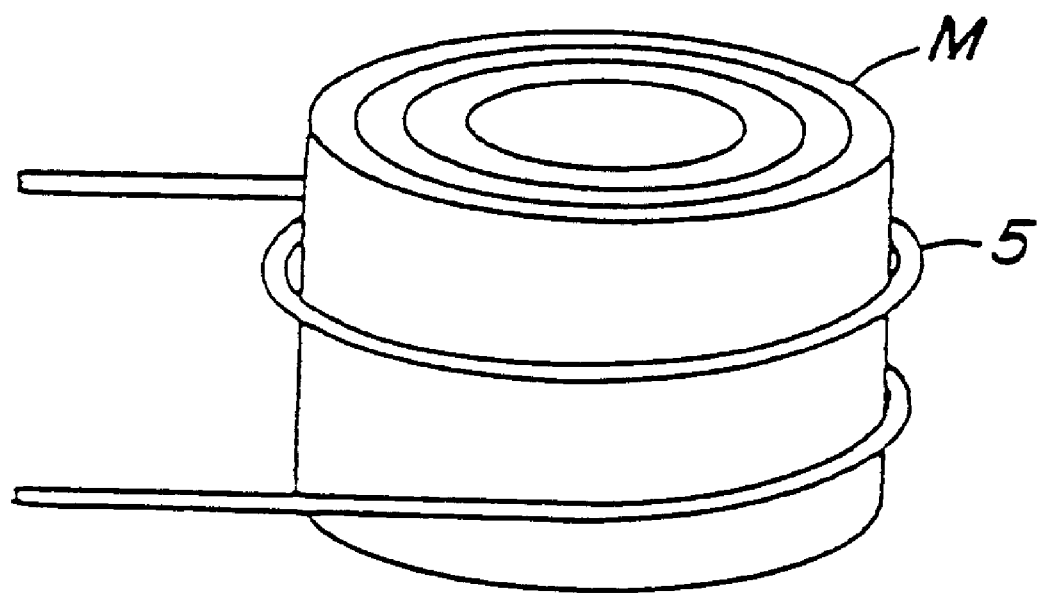
FIG. 19 is a view showing a reverse magnetic field generation portion of a circuit.

FIGS. 18 and 19 show examples in which the members M consisting of magnetic substance are assembled in the reverse magnetic field generation portions 5 of the reverse magnetic field generation circuits.

Figure 20:
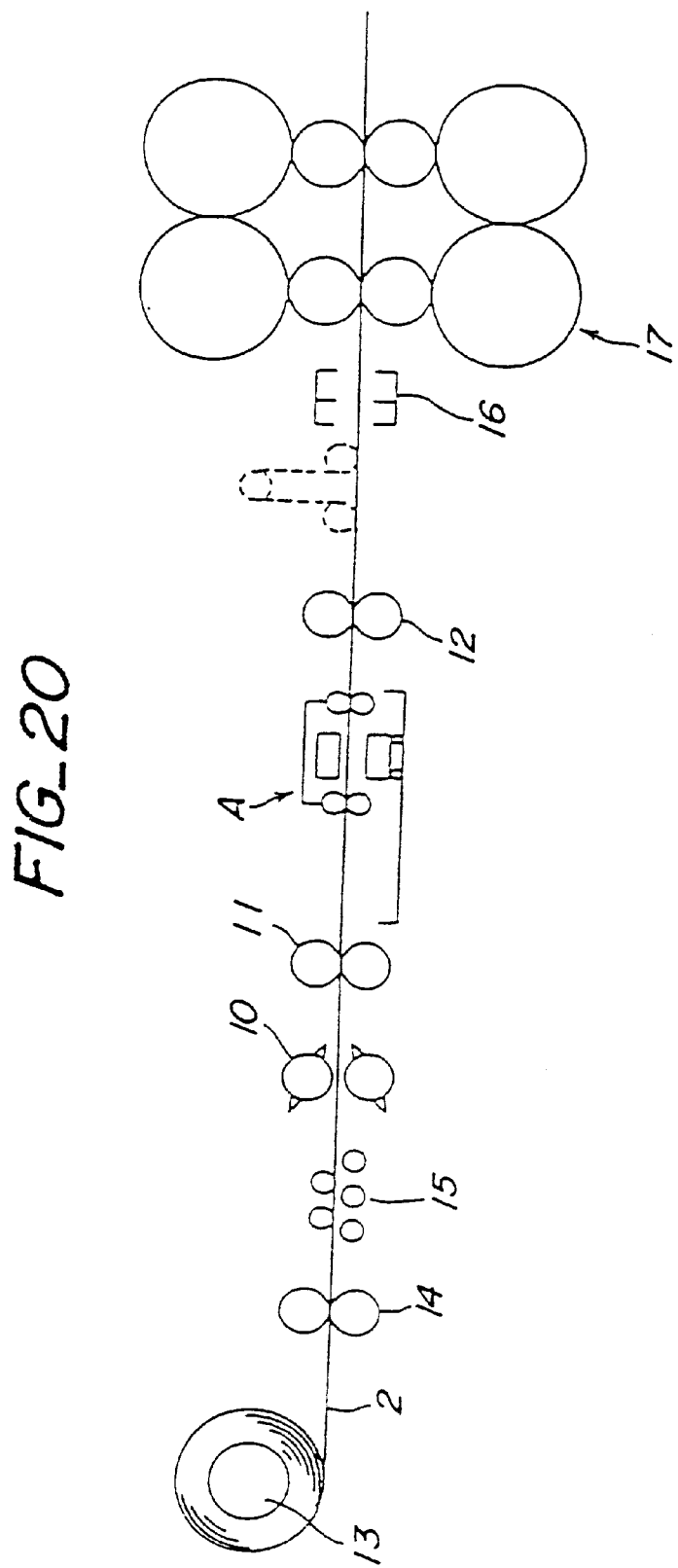
FIG. 20 is a view showing a structure of an equipment for performing continuous hot rolling to metal pieces.

FIG. 20 shows an equipment for performing continuous hot rolling to the metal pieces, and a joining apparatus A preferable for embodying this invention is provided, for example, between pinch rolls 11 and 12 on the delivery side of a cutting apparatus (a shear or others) 10.

In FIG. 20, reference numeral 13 denotes a rewinder for rewinding a metal piece wound in a coil form; 14, a pinch roll; 15, a leveler; 16, a scale breaker; and 17, a group of finishing rolling mills. If the joining apparatus A is of a fixed type in this equipment, a looper is provided on the entry side of the scale breaker 16.

Each reverse magnetic field generation circuit constituted by the reverse magnetic field generation portion 5 may be maintained closed (the switch 6 is closed) by the open/close controller r from an initial stage when heating the metal pieces, or may be closed during heating. The usage of the circuit is not restricted to a specific procedure.

Although the above has been described in connection with the case where the degree of temperature rise is suppressed especially in the region where the temperature is locally increased when heating the metal pieces, the temperature in this region can be precedently increased by generating in the circuit the alternating magnetic field whose direction is same with that of the alternating magnetic field produced by the inductors 3 (in this case, the current is positively supplied to the circuit).

Figure 21:
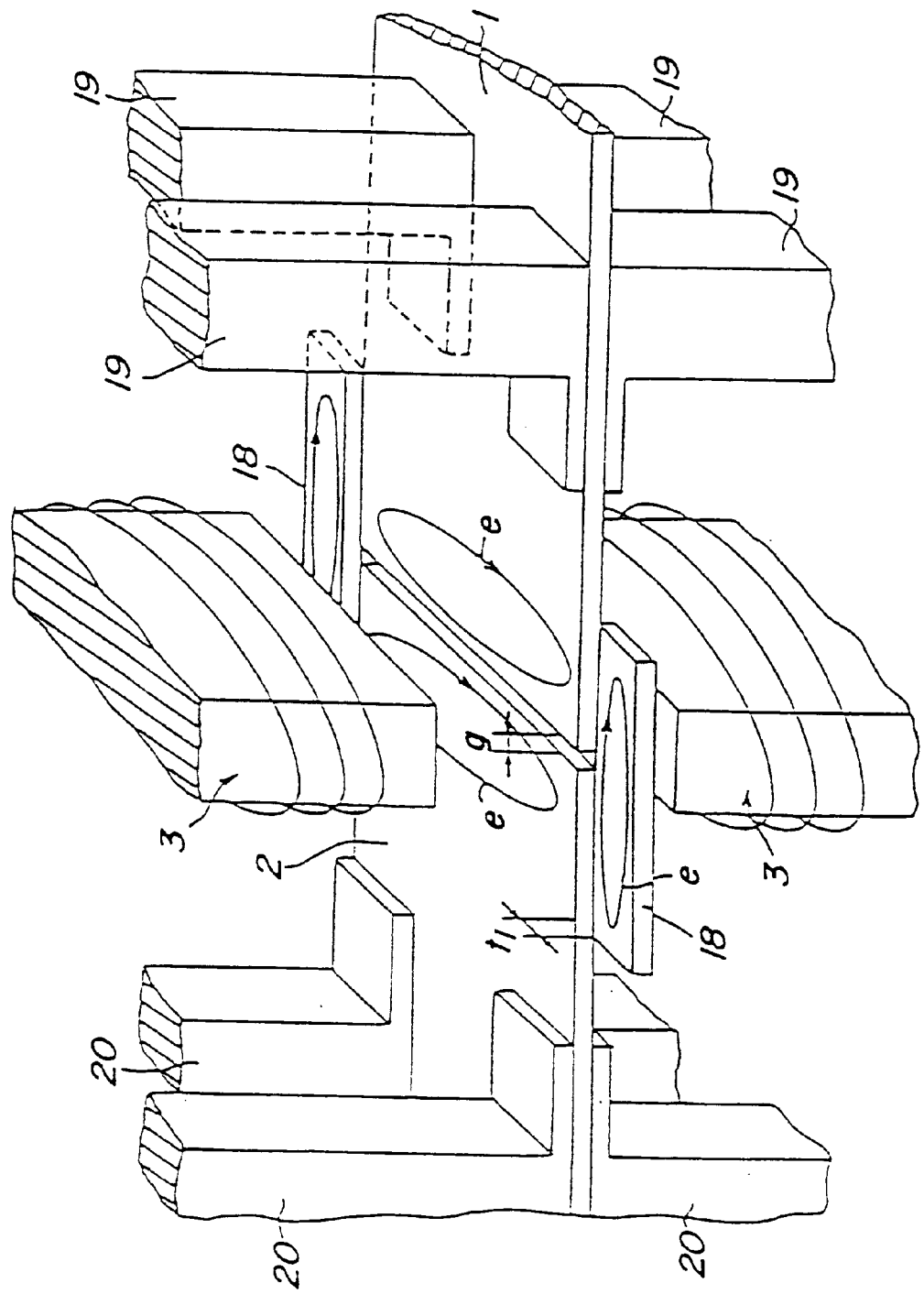
FIG. 21 is a view showing a structure of a primary part of a joining apparatus according to the present invention.

The description will now be given as to a case where an apparatus having such a structure as shown in FIG. 21 is used to improve the heating efficiency at the width ends of the metal pieces.

In FIG. 21, reference numeral 18 designates a conductive member which has been described as an example of the plate, and each member 18 is provided between magnetic poles of the inductor 3 and provided outside the ends of the metal pieces 1 and 2 in the width direction thereof with a gap $t_1$ between the members 18 and the metal pieces 1 and 2. In this case, the gap $t_1$ between may be an interval of space, or any electrical insulator may be provided herein.

The preceding metal piece 1 and the succeeding metal piece 2 are clamped by clamps 19 and 20 with a space g, namely, a small gap being provided between the ends of the opposed faces of the metal pieces 1 and 2, and are heated by generating the alternating magnetic field running through the metal pieces 1 and 2 the thickness direction thereof by the inductor 3 having a pair of magnetic poles vertically sandwiching the metal pieces 1 and 2. At this time, the induced current caused due to the alternating magnetic field also flows in each conductive member 18, and the temperature is increased at the same speed with that in the central region of the pieces 1 and 2 at the corners of the metal pieces where the temperature is not likely to be increased.

By providing each conductive member 18 in close proximity to one side of the metal pieces, the entire end region of the opposed faces to be joined can be heated at the same speed (a uniform heating over the full width). The reason thereof is as follows.

Figure 22:
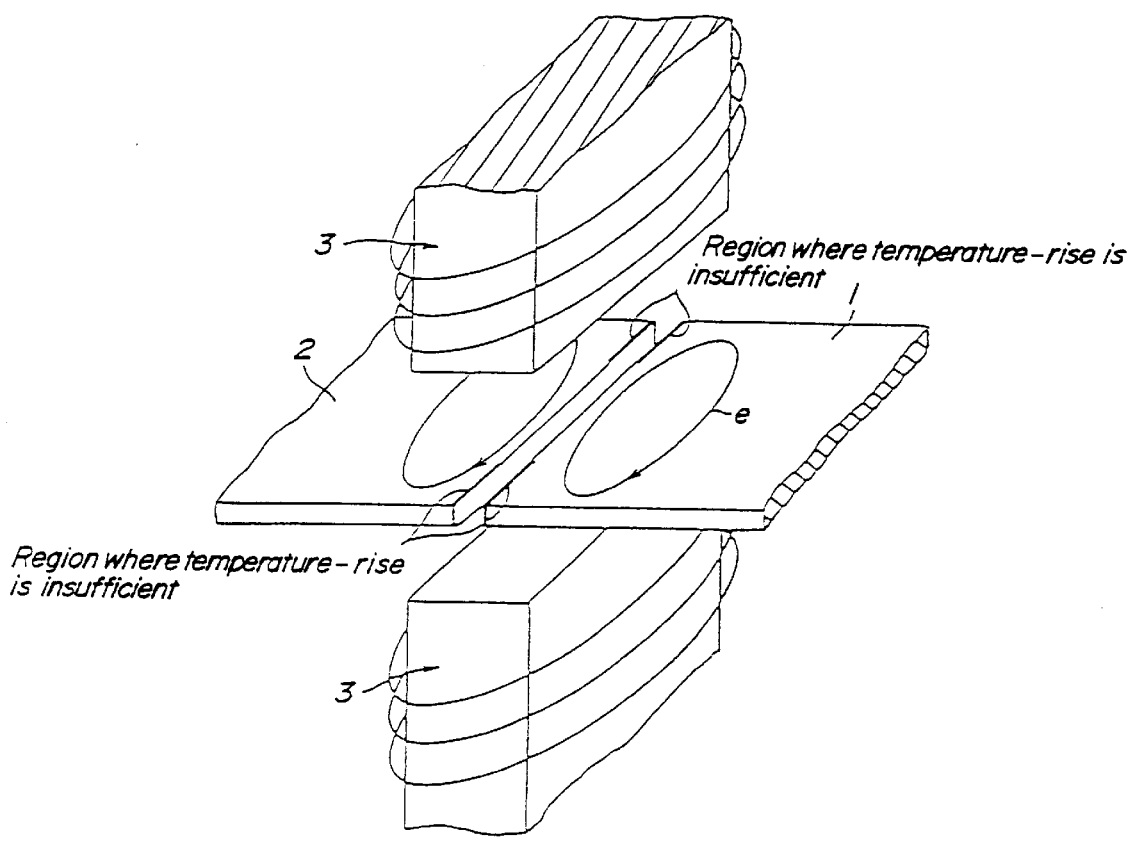
FIG. 22 is an explanatory view showing the state where metal pieces are heated.

In the first place, in the conventional heating and joining method in which the conductive members 18 are not provided, the quantity of magnetic fluxes is small at ends of the metal pieces, which will be joined, in the width direction thereof, so that the induced current e flows in the circular form as shown in FIG. 22. Even if the skin effect of the induced current flowing in each end of the metal pieces 1 and 2 can be expected, the induced current is difficult to flow through the end of each metal piece in the width direction thereof, whereby the temperature rise is insufficient. As a result, even though the rear end of the preceding metal piece and the front end of the succeeding metal piece are opposedly joined to each other, the joining strength is low at the ends of the joined portions in the width direction of the steel pieces. In the rolling operation to be subsequently performed, cracks produced at the ends propagate to the central portion in the width direction, resulting in the rupture.

In the case where the conductive members 18 are provided with a space $t_1$ between the both width ends of at least one of the preceding metal piece 1 and the succeeding metal piece 2 and the conductive members 18 in accordance with the invention as shown in FIG. 21, however, the alternating magnetic field produced between the magnetic poles of the inductor 3 also runs through the conductive members 18, thereby generating the induced current e in each member 18. Since this induced current and the induced current generated in the metal pieces 1 and 2 flow in opposed directions in the region where these currents are in close proximity to each other, they are attracted to each other. The induced current produced in the metal pieces consequently flows to be closer to the ends of the metal pieces in the width direction thereof. The temperature rising speed at the ends of the metal pieces in the width direction thereof becomes closer to the temperature rising speed in the central region of the same in the width direction thereof, and hence the temperature can be substantially uniformly increased to a value in the entire region of the portions to be joined in the width direction. Further, by securing the sufficient pressing force when pressing the metal pieces against each other, the complete joining can be carried out over the full width of the metal pieces including the ends of the metal pieces in the width direction thereof.

As for the conductive member suitable for the invention, the desired object can be attained only if any member can generate the induced current having a predetermined scale, the member is not thus restricted to a specific type.

However, a copper plate produces less heat due to the induced current and is inexpensive, and hence it is preferable. Further, since a material having a high melting point such as a tungsten plate or a graphite plate has a durability against heat, such a material can also be used. Furthermore, a steel plate or an Al plate can be used for a long time if a cooling means is additionally provided.

Although FIG. 21 shows an example in which each conductive member 18 is provided over the preceding metal piece 1 and the succeeding metal piece 2, the invention is not restricted to the example in this figure. The same effect can be obtained when separate conductive members 18a and 18b are provided to the rear end of the preceding metal piece and the front end of the succeeding metal piece, respectively. In this case, it is particularly advantageous when the metal pieces having different widths are joined.

In regard of the width dimension of the conductive member, when the dimension is too small, generation of the induced current is difficult even though the magnetic flux runs through the member from the inductor, thereby requiring such a width that the induced current can be produced. The width of the conductive member can be appropriately changed only if this condition is satisfied. The member is not restricted to have specific thickness and length.

The space $t_1$ between each conductive member and the metal piece must be provided so that the induced current produced in the metal piece and the induced current generated in the conductive member are attracted to each other and the conductive member and the metal piece are in close proximity to each other. Specifically, the space $t_1$ may be over 10 mm, though it may preferably be set to 3 through 5 mm.

Figure 24:
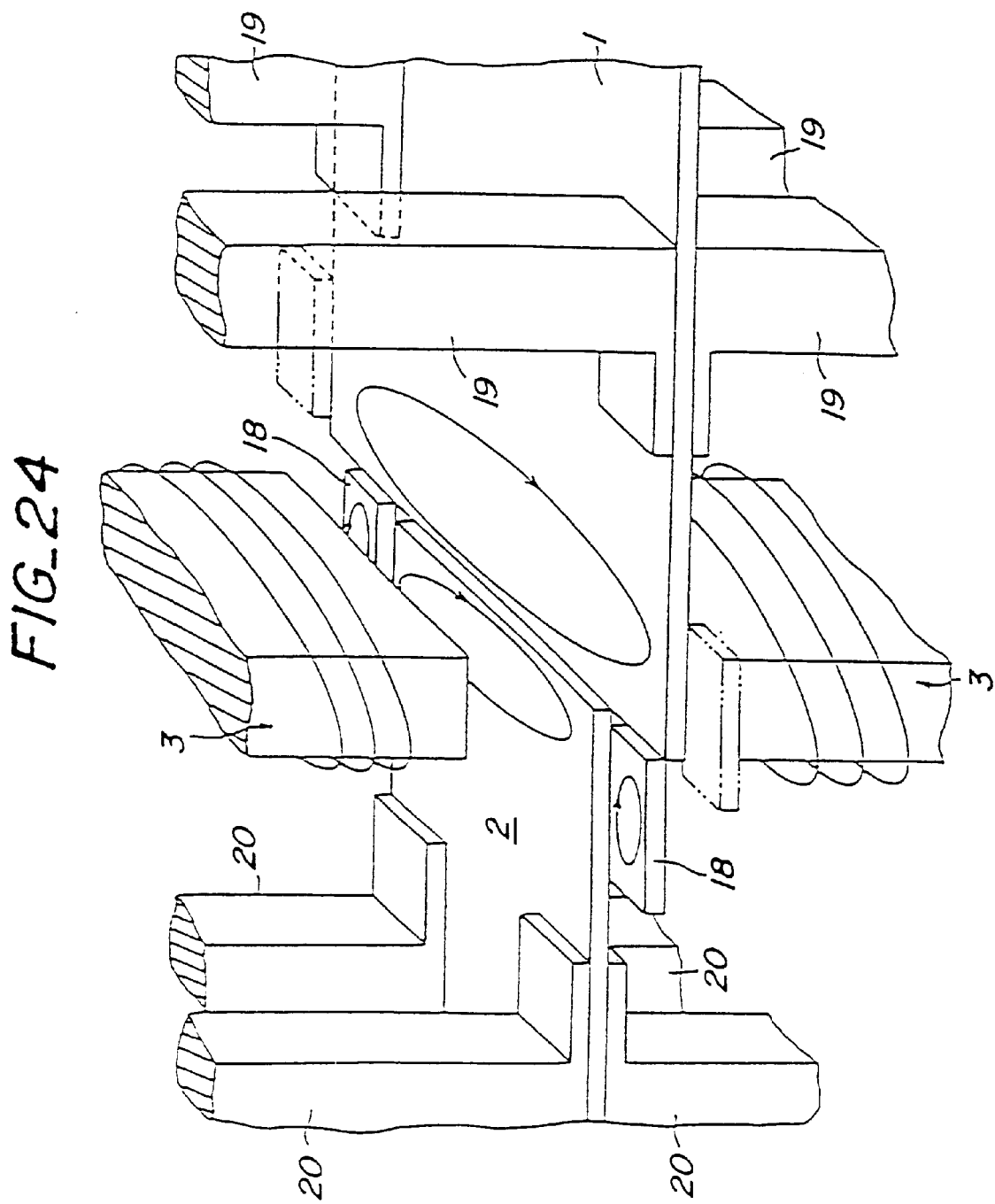
FIG. 24 is an explanatory view showing a case where metal pieces having different widths are joined.

FIG. 24 illustrates an example in which the metal pieces having different width dimensions are joined with the centers of the metal pieces in the width directions thereof being matched. When the alternating magnetic field generated by the inductor 3 runs through each conductive member 18, the induced current is produced in the member 18. The induced currents produced in the metal pieces 1 and 2, therefore, flow in the vicinity of the ends of the metal pieces in the width direction thereof by the interaction of the induced current in the member 18 and the induced currents generated in the metal pieces, enabling a uniform heating over the entire area in the plate width direction.

Although the desired object can be attained by providing the conductive members 18 only at the both width ends in the end portion of the narrow metal pieces as shown in FIG. 24, the effect can be further enhanced by additionally providing the conductive members at the both width ends of the wide metal piece as indicated by a two-dotted line in FIG. 24.

As apparent from the above-mentioned action and effect of the conductive member 18, in the invention, the magnetic field generated by the inductor having at least a pair of magnetic poles must run through the conductive member 18. That is, the conductive member 18 must be provided in such a region that the magnetic flux produced between the magnetic poles of the inductor 3 runs therethrough.

As viewed from the relationship between the width of each metal piece and the width of the inductor, in this invention, it is preferable to provide the inductor in such a manner that the inductor overlaps on the metal pieces and the magnetic flux generated by the inductor runs through the metal piece and at least a part of the conductive member. Specifically, it is preferable that the inductor (core) having a width dimension larger than that of the metal pieces to be joined is used so as to protrude from the metal pieces at the width ends thereof, and the opposed magnetic poles of the inductor face to the metal pieces and the conductive members provided to the width ends of the metal pieces. This means that the metal pieces are provided inside the ends in the width direction at which the quantity of magnetic fluxes is apt to be decreased, and this arrangement is extremely effective for uniformly heating the metal pieces in the width direction thereof.

In the case where the width direction of the metal pieces used for joining is larger than that of the inductor, a plurality of inductors are preferably aligned in the width direction of the metal pieces so as to protrude from the metal pieces at their width ends.

Figure 25A:
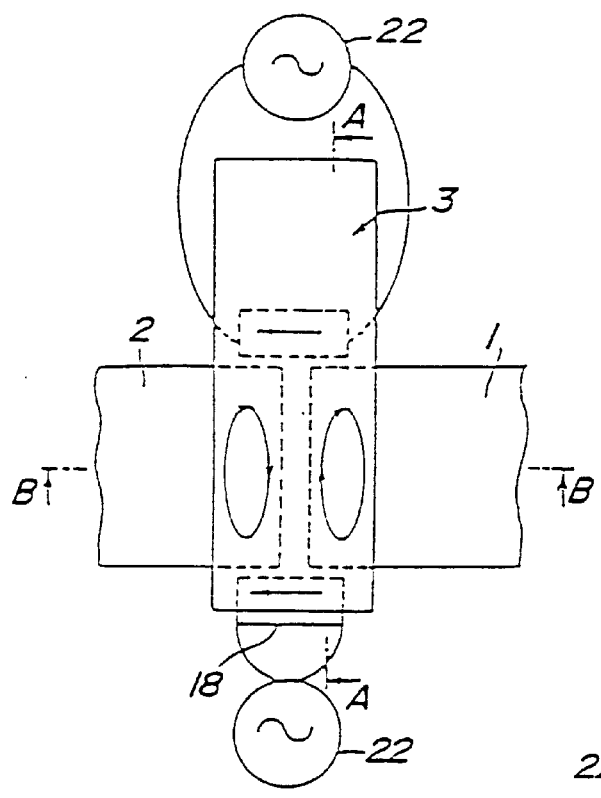
FIGS. 25(a), (b) and (c) are explanatory views showing cases where metal pieces are heated and joined in accordance with the present invention.

FIGS. 25(a), (b) and (c) show an example in which a current whose phase is substantially same with that of the induced current generated in the metal pieces positively flows in the conductive members from outside.

Figure 25B:
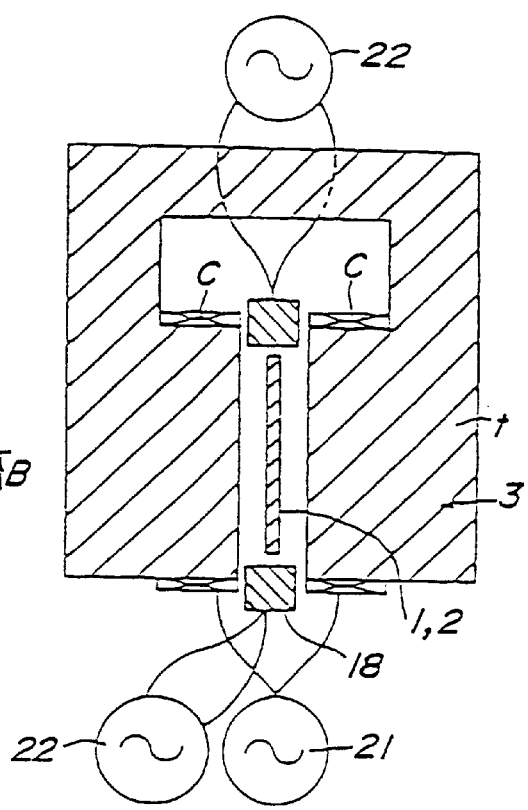
Figure 25C:
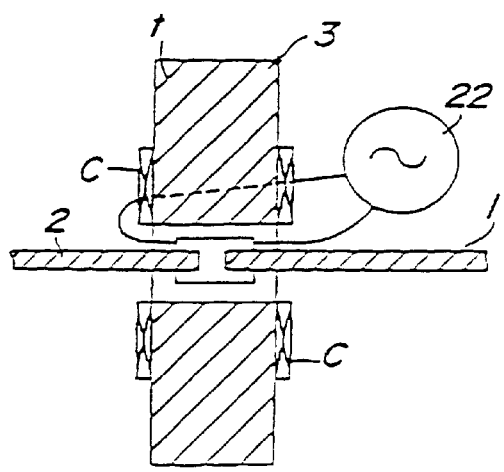

FIG. 25(a) is a top plan view showing a region in which the rear end of the preceding metal piece and the front end of the succeeding metal piece are opposed to each other; FIG. 25(b), a sectional view taken along the A—A line in FIG. 25(a); and FIG. 25(c), a sectional view taken along the B—B line in FIG. 25(a).

The inductor 3 shown in FIG. 25 is obtained by winding coils c around a core t constituting a pair of magnetic poles sandwiching the metal pieces and has a width larger than those of the preceding metal piece 1 and the succeeding metal piece 2. According to the inductor having such a structure, since the entire area of the metal pieces in the width direction are positioned between the magnetic poles, the magnetic field generated by the inductor 3 can effectively act on the metal pieces. Note that such an inductor is also disclosed in Japanese Patent Laid-open Publication No. 4-89109.

In FIG. 25, when the (alternating) current whose phase is the same with, but whose direction is reversed from, those of the induced current is supplied from an external power supply 22 to the conductive members 18, the induced current circulating in the metal pieces flows to the width ends thereof, enabling heating the entire region in the width direction.

As similar to FIG. 25, FIGS. 26(a), (b) and (c) show an example in which the current is supplied from outside to the conductive members 18 to uniformly heat the metal pieces in the full width direction.

FIGS. 26 shows the case where the metal pieces each having a width larger than that of the inductor 3 are heated. In the example illustrated herein, a pair of inductors 3 shown in FIGS. 25 are prepared and arranged along the width direction of the metal pieces to carry out heating.

FIG. 26(a) is a top plan view showing an apparatus; FIG. 26(b), a sectional view taken along the A—A line in FIG. 26(a); and FIG. 26(c), a sectional view taken along the B—B line in FIG. 26(a).

In the example shown in FIG. 26, as similar to FIG. 25, the inductors 3 each having a substantially C-shaped core t are provided at the ends of the metal pieces to be joined, and the conductive members 18 are provided at the both ends of the metal pieces at an interval of space. Also, the current whose phase is same with that of the induced current generated in the metal pieces is supplied from the external power supply 22 to the members 18.

In FIGS. 25 and 26, although the description has been given to the case where the inductor having a larger width dimension than those of the metal pieces to be joined is used or the case where at least a pair of inductors are used to heat the metal pieces, the present invention is not restricted to the illustrated examples.

Since the scale of the current supplied from the external power supply to the conductive members is not limited, it is possible to flow the current which is sufficiently large for uniformly heating the ends of the metal pieces in the full width direction, and there is no problem if an inductor whose width is smaller than those of the metal pieces is used.

In the present invention, the metal pieces are heated and joined in accordance with the above-mentioned points. As a combination of these points, there is adopted a method by which the rear end of the preceding metal piece and the front end of the succeeding metal piece are positioned in close proximity with a space (small gap) therebetween and, after heating is performed until the temperature reaches a target value, the power input to the inductor is stopped to carry out the pressing, or a method by which the input power is lowered to such a level that no spark is produced if the temperature at the portions to be joined reaches the target value, and pressing is started while continuing heating.

The description will now be given as to the case where the conductive members are brought into contact with the both width ends of either the rear end of the preceding metal piece or the front end of the succeeding metal piece and the heating efficiency at the width ends of the metal pieces is improved by the members.

Figure 27:
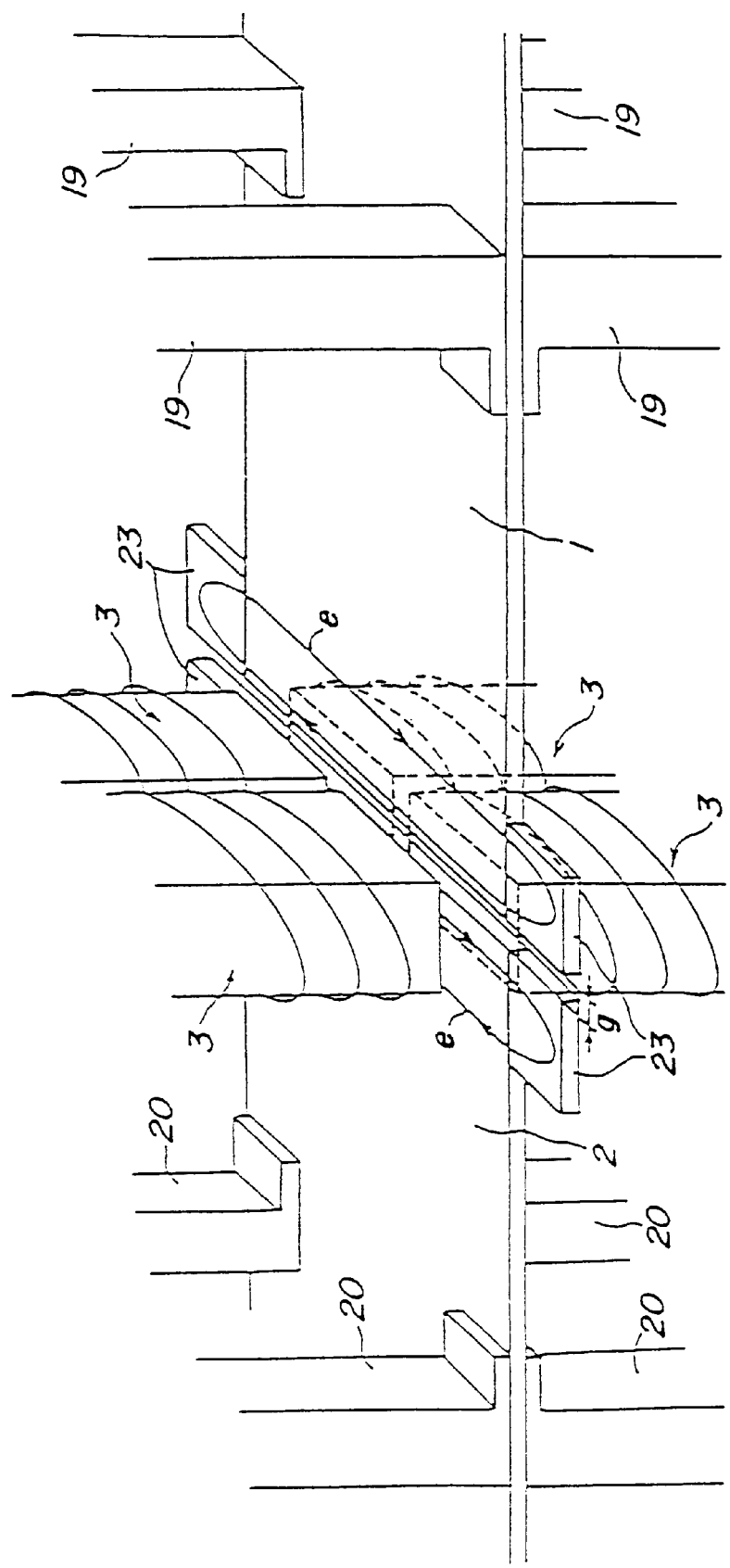
FIG. 27 is an explanatory view showing the point of joining metal pieces in accordance with the present invention.

Referring to FIG. 27, in case of heating the preceding steel piece 1 and the succeeding steel piece 2, when the conductive members 23 are previously pressed against the both width ends of at least one of the metal pieces in the vicinity of the end thereof, the induced current generated in the preceding metal piece 1 and the succeeding metal piece 2 also flow in the members 23. The temperature at the both width ends, i.e., the corners of the metal pieces increases at the same speed with that in any other regions by the Joule heat generated at this time, and the problems that the joining failure occurs or the strength in the joining portions is insufficient due to the resistance at the heat defective portion are eliminated.

Since each conductive member 23 shown in FIG. 27 is likely to be melted and fused during heating the metal pieces if its melting point is same with or lower than that of the metal pieces, it is preferable to use a material having a higher melting point than that of the metal pieces, for example, tungsten or carbon.

Further, in regard of a size of each conductive member, the thickness of the member is preferably equal to that of the metal pieces to be joined, and it is preferable to adapt such a width that the temperature rise at the ends of the metal pieces in the width direction thereof is not insufficient when heating is carried out without the conductive members. Further, the length of the member is preferably not less than a lapping length as viewed from the top plan of the core of the inductor and the metal pieces to be heated.

In case of heating the metal pieces, the spark is likely to be generated between the conductive members and the metal pieces, Thus, it is particularly preferable to increase the bearing to or above 2 kg/mm$^2$ and push the conductive members against the metal pieces in advance.

Figure 28:
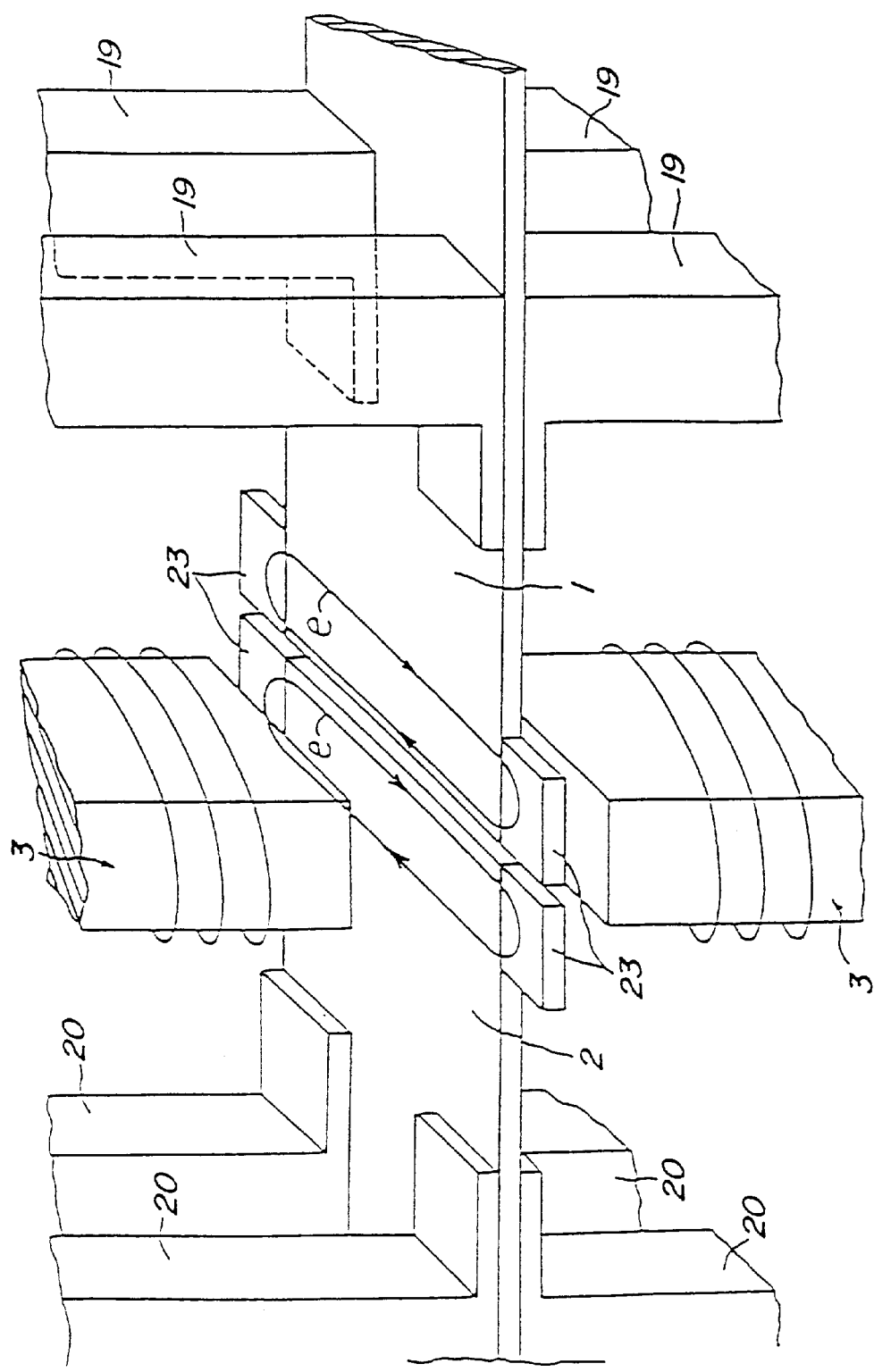
FIG. 28 is a view showing an example in which metal pieces are heated using a single inductor.

Although FIG. 27 shows the example in which the metal pieces are heated by using a pair of inductors, it is needless to say that the same effect can be obtained by using a single inductor such as that shown in FIG. 28 to perform heating.

Figure 29:
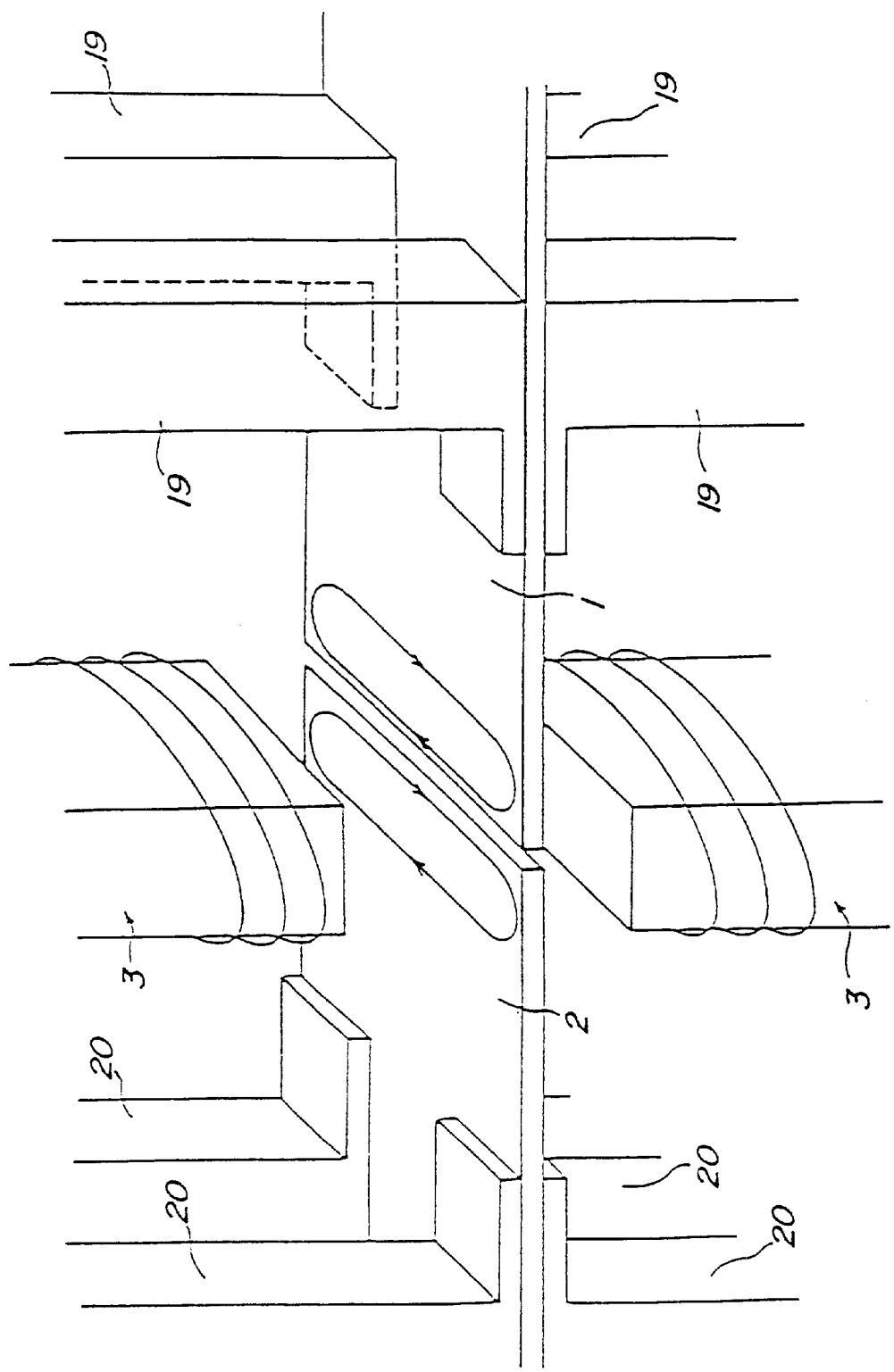
FIG. 29 is a view showing an example in which metal pieces are heated using a single inductor.
Figure 30:
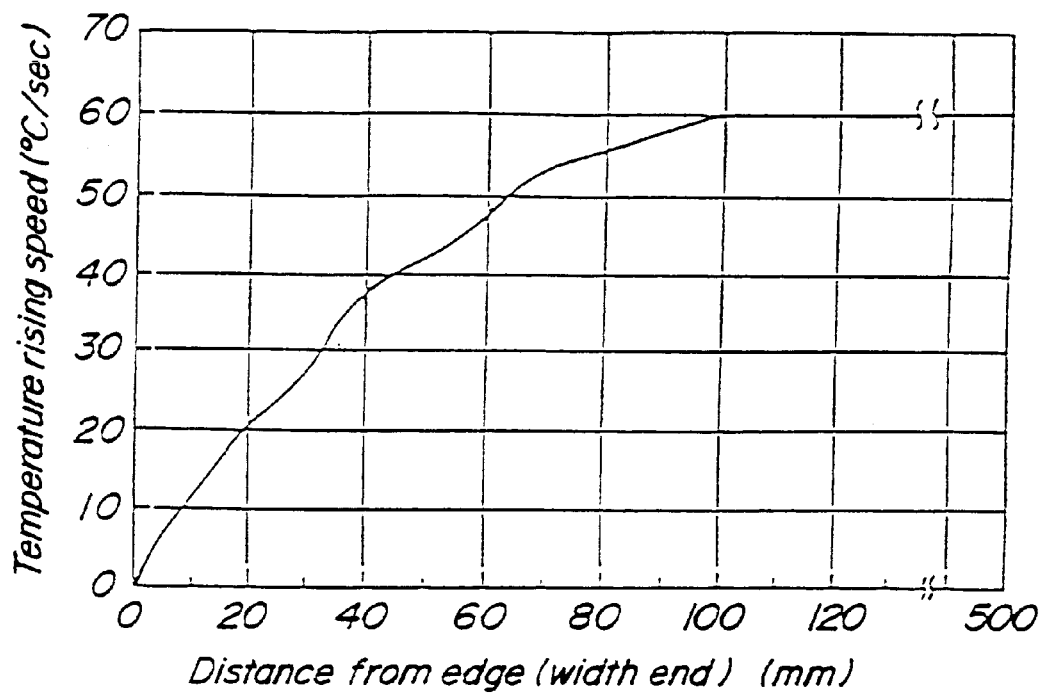
FIG. 30 is a view showing a distribution of a temperature rising speed in end portion of a metal piece in the width direction thereof.

FIG. 30 shows for reference a distribution of the temperature rising speed (which is measured at a point spaced apart from the end face by 1.5 mm and positioned in the center in the plate thickness direction on the metal piece) in the plate width direction in the case where two metal pieces each consisting of stainless steel of SUS304 and having a thickness of 30 mm are heated by using the inductor having a core whose size is 240×1000 mm as shown in FIG. 29 under such conditions that distances between the metal pieces and the core is 90 mm on the upper side and 90 mm on the lower side and the input power is 980 kW. The degree of the temperature rise is particularly small at the corners of the metal pieces as compared with any other regions.

Therefore, even when the metal pieces are subjected to continuous rolling after being joined by the inductor having such a heating characteristic, cracks are developed in the joined portion as the rolling proceeds, and it is obvious that the joined portion is inevitably ruptured over the full width.

Figure 31A:
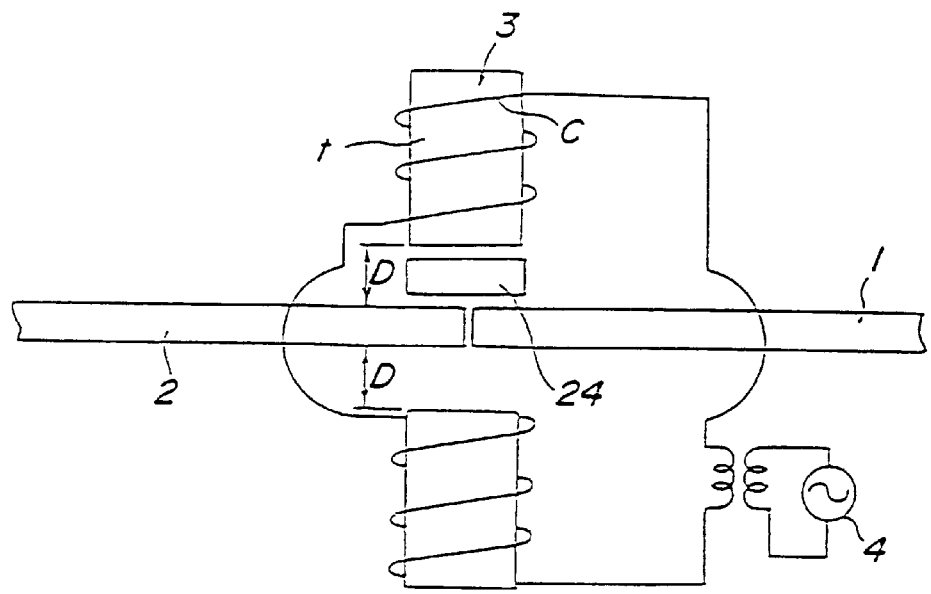
FIGS. 31(a) and (b) are views showing an example in which metal pieces are heated and joined by arranging members consisting of magnetic substance.
Figure 32:
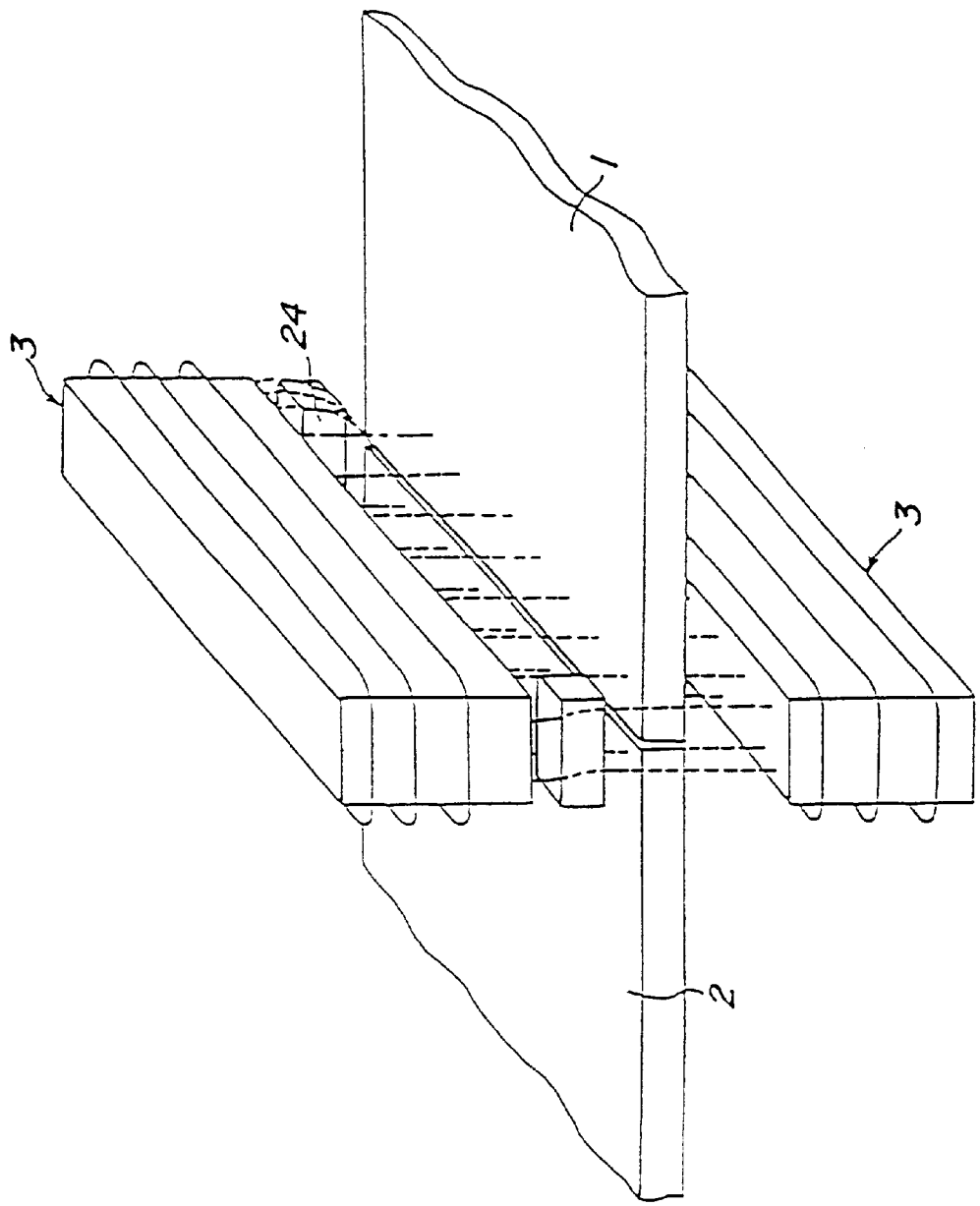
FIG. 32 is a view showing an example in which metal pieces are heated and joined by arranging members consisting of magnetic substance.

The description will now be given as a case where, when heating the metal pieces, the density of magnetic fluxes of the alternating magnetic field is increased and the heating efficiency at the width ends of the metal pieces is improved by members each consisting of magnetic substance provided between each metal piece and the inductor to uniformly heat the entire region in the width direction with reference to FIGS. 31(a) and (b) and FIG. 32.

In case of heating the metal pieces by the inductor 3, members 24 consisting of magnetic substance are provided at corners where the degree of temperature rise is small and the magnetic influx density at the corners is increased by the members 24. The induced current then flows closer to these portions, and the degree of heating is also increased. A satisfactory joining strength can thus be secured at the both width ends without a fear that the metal pieces are melted down in the central region thereof in the plate width direction.

In this invention, each of the members 24 consisting of magnetic substance must be provided at a position in a region which is extending from the width end of each metal piece and whose length is not more than ten times as long as the osmotic depth $d_0$ of the induced current. That is because the temperature rise is insufficient in the region and, if each member 24 consisting of magnetic substance is inwardly provided beyond this region, the degree of temperature rise of the metal piece becomes too large in such a region where the member 24 is provided, causing such a problem as melt down.

A width dimension W of the member 24 is set to be two to ten times as long as the osmotic depth $d_0$. That is because the effect obtained by placing the magnetic substance is reduced when the range in which the degree of heating and temperature rise can be increased is small, if the width dimension W is not more than two times as long as the osmotic depth $d_0$. On the other hand, if it is more than 10 times as long as the osmotic depth $d_0$, the temperature rising speed is extremely increased in the portion extending beyond the depth $d_0$, thereby causing melt down. In order to perform heating in such a manner that the temperature rising speed similar to that in the central region of the metal pieces in the width direction thereof can be obtained and the temperature distribution is substantially uniform in the entire area in the width direction, the width W of each member 24 consisting of magnetic substance is restricted to a width which is two to ten times as long as the osmotic depth $d_0$.

Figure 33:
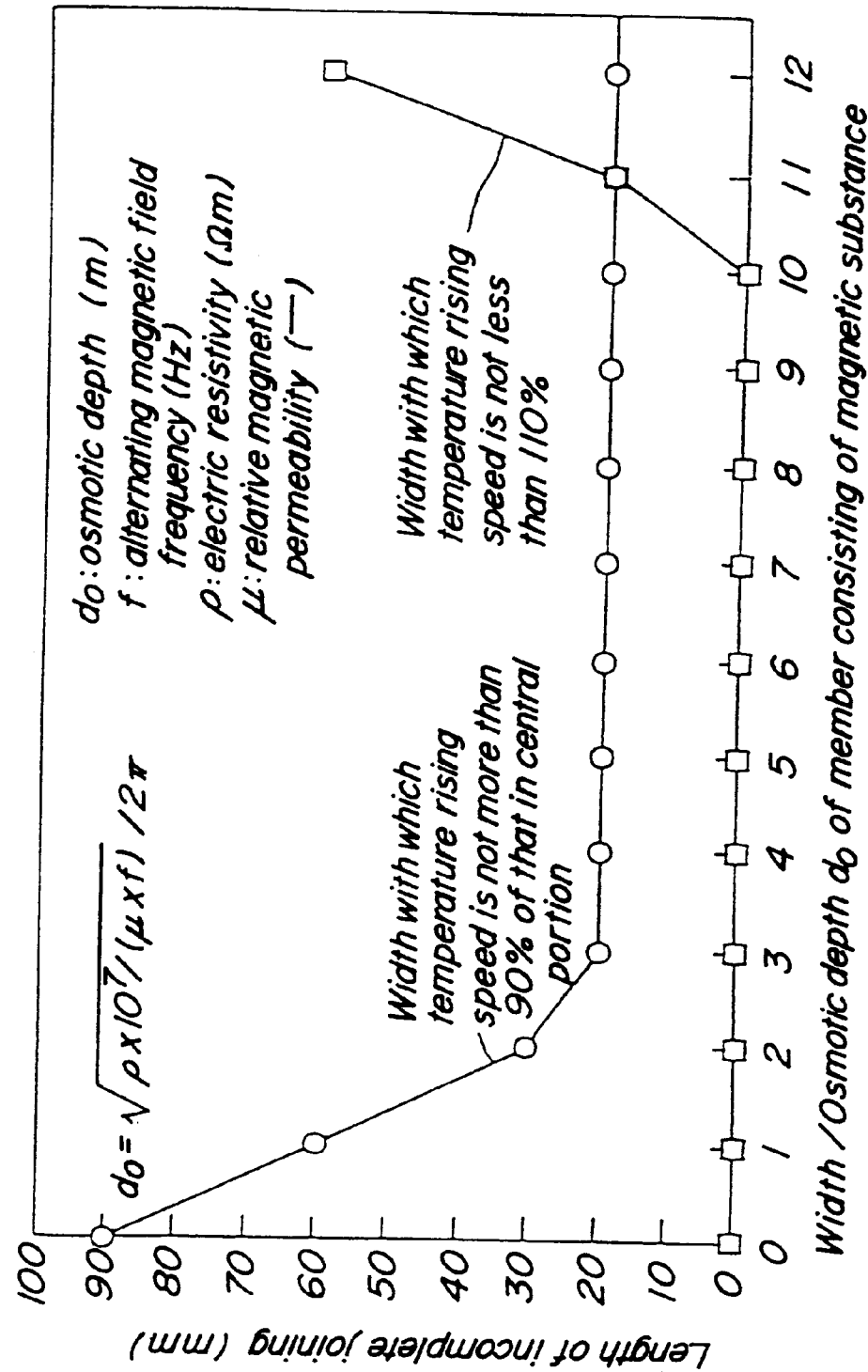
FIG. 33 is a view showing the relationship between the width dimension of a member consisting of magnetic substance/osmotic depth of an induced current, and the length of joining failure.

FIG. 33 shows the relationship between the width dimension of the member 24 consisting of magnetic substance/the osmotic depth $d_0$ and a length of defective joining.

Figure 31B:
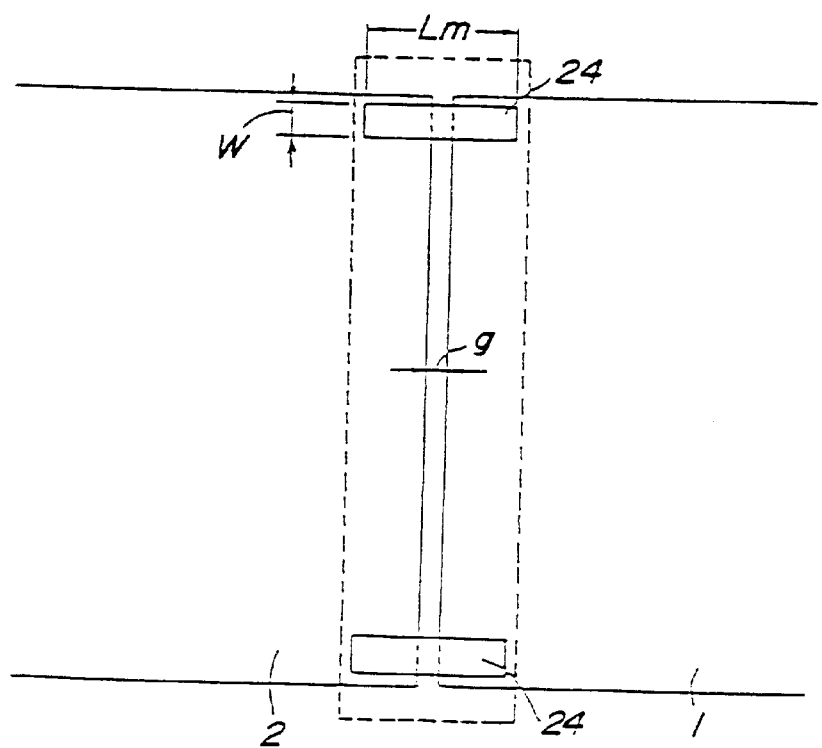

As an example of a continuous hot rolling equipment to which the joining apparatus having the structure shown in FIG. 31 is incorporated, it is possible to adopt one shown in FIG. 20 by which the metal pieces are joined while matching with a timing for rewinding a coil type metal piece provided between the pinch rolls and a timing for effecting the rolling process.

A dimension $L_m$ of the member 24 consisting of magnetic substance along the longitudinal direction of the metal pieces may preferably be $2d_0+g+\alpha$ ($\alpha$ is a clearance and set to be approximately 100 to 200 mm), in the case where a space between the metal pieces which is firstly formed when joining the metal pieces is represented as g.

Further, when heating the metal pieces 1 and 2, in order to prevent the temperature rise of the member 24 consisting of magnetic substance itself, the member 24 may be obtained by superimposing a plurality of insulated thin plates one above the other. As the member 24, simple substance such as iron, nickel, cobalt or others, alloys thereof or non-crystallized substance can be used in addition to silicon steel.

Figure 34:
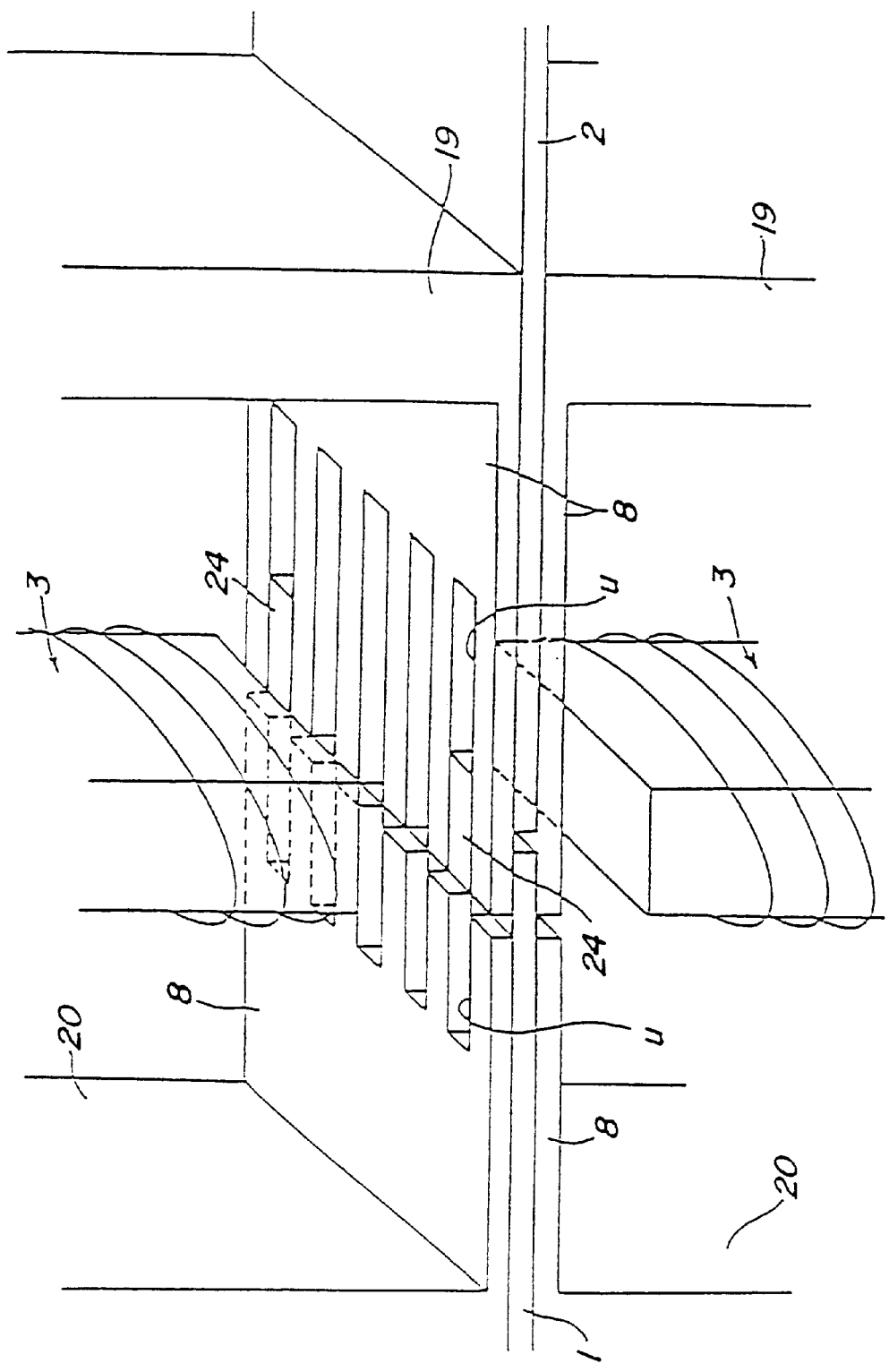
FIG. 34 is a view showing a structure of a primary part of a joining apparatus to which members consisting of magnetic substance are arranged.

FIG. 34 shows an example in which the members 24 consisting of magnetic substance are adapted in the notches u in the joining apparatus provided with the dislocation preventing plates 8 each having the notches u.

In the apparatus having such a structure, the metal pieces are uniformly heated over the entire region in the width direction. Also, it is extremely advantageous for completely preventing fluctuations in the vertical direction which are likely to be caused during pressing the metal pieces 1 and 2 against each other.

Figure 35:
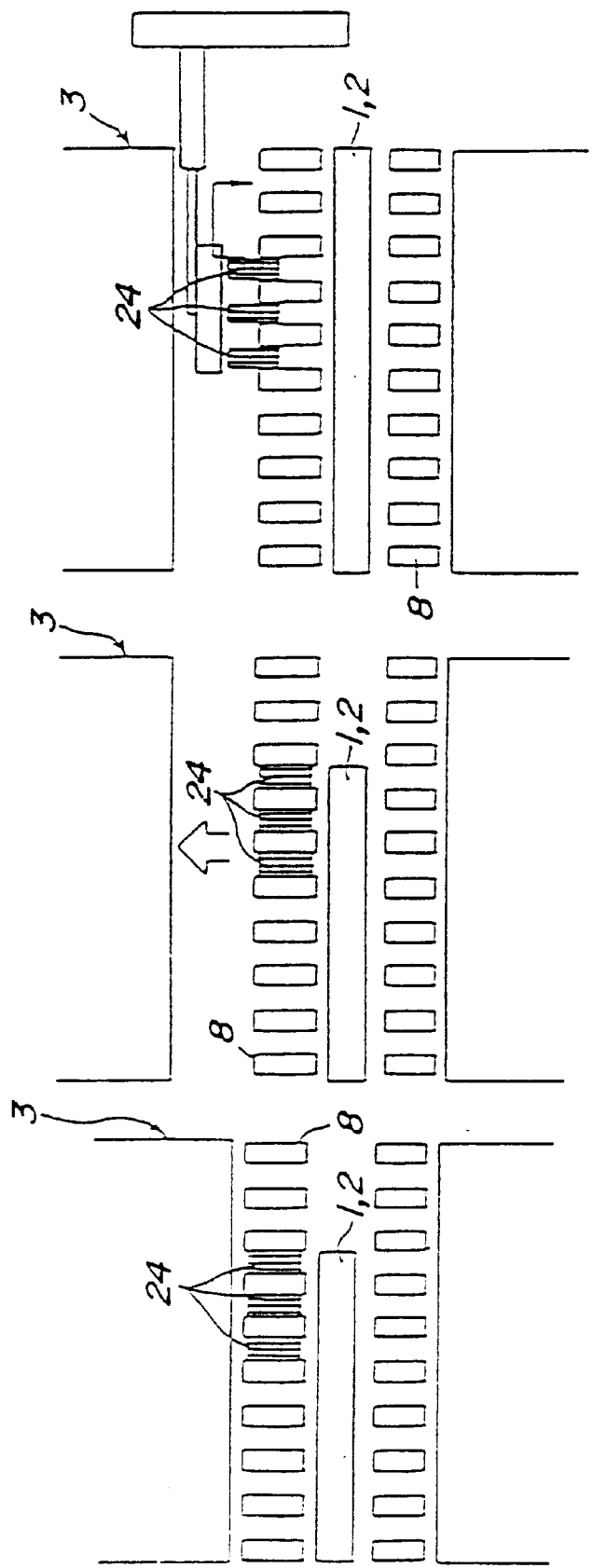
FIG. 35 is an explanatory view showing the point of movement of members consisting of magnetic substance.

In the case where there is provided such dislocation preventing plates 8 as shown in FIG. 34, if there is provided such a structure as shown in FIG. 35 that each member 24 consisting of magnetic substance can be temporarily removed from each notch u and shifted in parallel with the width direction of the metal pieces 1 and 2 to be again inserted in each notch u at a predetermined position, it is possible to easily cope with joining of metal pieces having different widths, thereby performing the effective continuous hot rolling.

The explanation will now be given as to a case where the overlap width of the preceding and succeeding metal pieces and the magnetic poles of the inductor in the longitudinal direction of the metal pieces are adjusted to improve the heating efficiency at the portions to be joined.

Figure 36A:
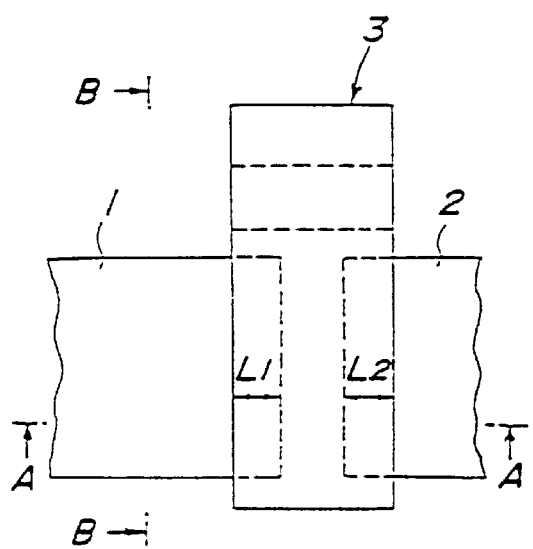
FIGS. 36(a), (b) and (c) are views showing a structural example of an inductor.
Figure 36C:
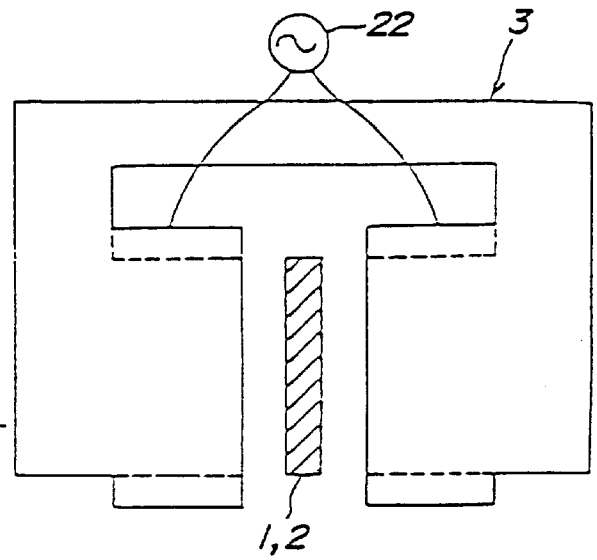
Figure 36B:
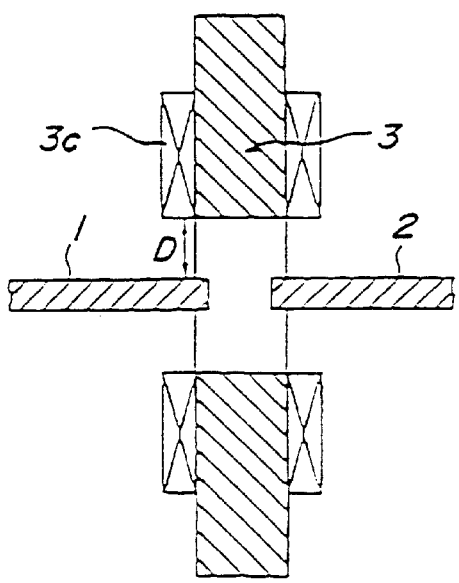
Figure 37A:
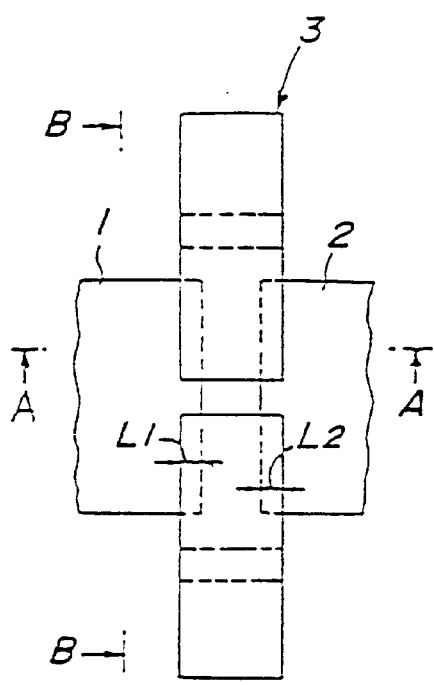
FIGS. 37(a), (b) and (c) are views showing a structural example of an inductor.
Figure 37B:
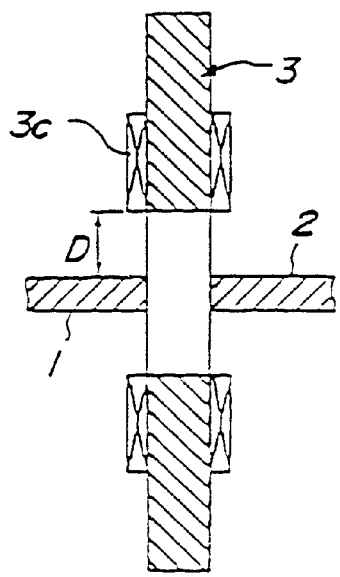
Figure 37C:
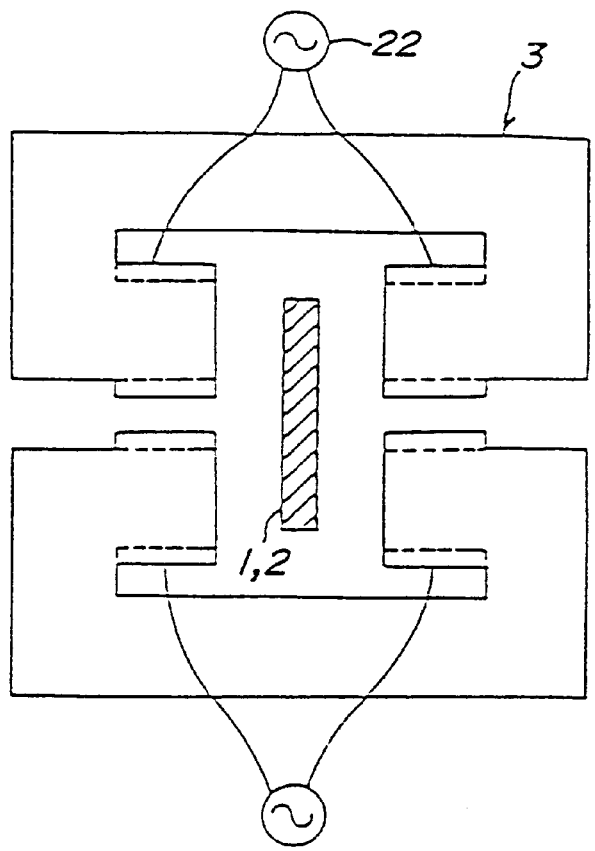

As an inductor used for joining the metal pieces, those having the structure shown in FIGS. 36 through 38 are typical examples. The state of magnetic flux distribution when the electric power is supplied to these inductors to generate magnetic fluxes is as shown in FIGS. 39 or 40.

As apparent from FIGS. 39 and 40, magnetic fluxes generated between the magnetic poles can be roughly classified into three types irrespective of difference between the structures of the inductors.

1) Magnetic fluxes running through the metal pieces in the vertical direction thereof (region (I)).
2) Magnetic fluxes passing a space between the preceding metal piece and the succeeding metal piece (region (II)).
3) Magnetic fluxes dispersing without running through the metal pieces and the space therebetween (region (III)).

Among these types of magnetic flux, one contributing to heat the metal pieces is the magnetic flux in (I) and also having a vertical component. In this type of heating method (induction heating method), it is therefore important to secure a large number of magnetic fluxes in (I).

The induced current generated by the magnetic flux vertically running through the metal pieces, namely, the magnetic flux running in the thickness direction intensively flows along the ends of the metal pieces, and this is known as the skin effect. The region in which the induced current flows is generally defined by a distance from the end of the metal piece toward the inside of the metal piece (depth), namely, a so-called osmotic depth $d_0$ (m) and can be represented by the following expression.

$$d_0 = \{\rho \times 10^7/(\mu \times f)\}^{1/2}/2\pi$$

f: frequency of the alternating magnetic field (Hz)
ρ: electric resistivity (Ω*m)
μ: relative magnetic permeability (−)

Here, in order to find the influence of the osmotic depth determined by a frequency of the alternating magnetic field and the overlap width L (smaller one of two dimensions L1 and L2 shown in FIGS. 36 through 38) of the respective metal pieces and the magnetic poles of the inductor in the longitudinal direction of the metal pieces upon heating, the experiment was carried out as follows. The inductor shown in FIG. 36 was used, and the metal pieces of SUS 304 each having a thickness of 30 mm were opposedly arranged with a space of 5 mm therebetween. Also, gaps D between the metal pieces and the magnetic poles were made uniform, and heating was carried out while varying the overlap width L of the magnetic poles and the metal pieces. Variations in the temperature rising speed at that time were observed.

The result is as shown in FIG. 41. Values in FIG. 41 were obtained as follows. A plurality of double bevel sheath thermometers were embedded in the metal pieces from the front and rear ends thereof in the longitudinal direction at a pitch of 3 mm, and the temperature rising speed was obtained when the current was supplied to the coils of the inductor for three seconds at various alternating magnetic field frequencies (100 Hz through 10 kHz). The temperature rising speed ratio (represented as a mean value of results obtained with frequencies of 100 Hz, 500 Hz, 1 kHz and 10 kHz) was arranged with $L/d_0=4.0$ as a reference. Note that the osmotic depth is approximately 49 mm at 100 Hz, 22 mm at 500 Hz, 15 mm at 1 kHz and 5 mm at 10 kHz.

As apparent from FIG. 41, the heating efficiency prominently lowers when the overlap width L is 2.0 time as long as the osmotic depth do of the induced current and thereafter becomes shorter.

That is because, if the overlap width L is not more that 2.0 times as long as the osmotic depth $d_0$, it can be considered that the direction of flow of the current induced to the metal is reversed with respect to that of the current flowing at an inner portion and these currents weaken their flows each other. Further, the fact that the ratio of magnetic fluxes (III) which do not relate to heating of the metal pieces becomes large and the quantity of effective magnetic fluxes (I) is relatively decreased can be regarded as another reason.

On the other hand, when the overlap width L is not less than 2.0 times as long as the osmotic depth $d_0$, the substantially same temperature rising speed can be obtained in any case. In the present invention, therefore, it is determined to satisfy $L \geq 2.0*d_0$, or more preferably, $L \geq 3.0*d_0$ in the relationship between the overlap width L and the osmotic depth $d_0$.

As described above, in case of heating and joining the metal pieces, if the overlap width L (m) of the rear and front ends of the respective metal pieces and the magnetic poles of the inductor in the longitudinal direction of the metal pieces satisfies $L \geq 2.0 \times d_0$ in the relationship with the osmotic depth $d_0$ of the induced current, an effective heating can be carried out.

Figure 42:
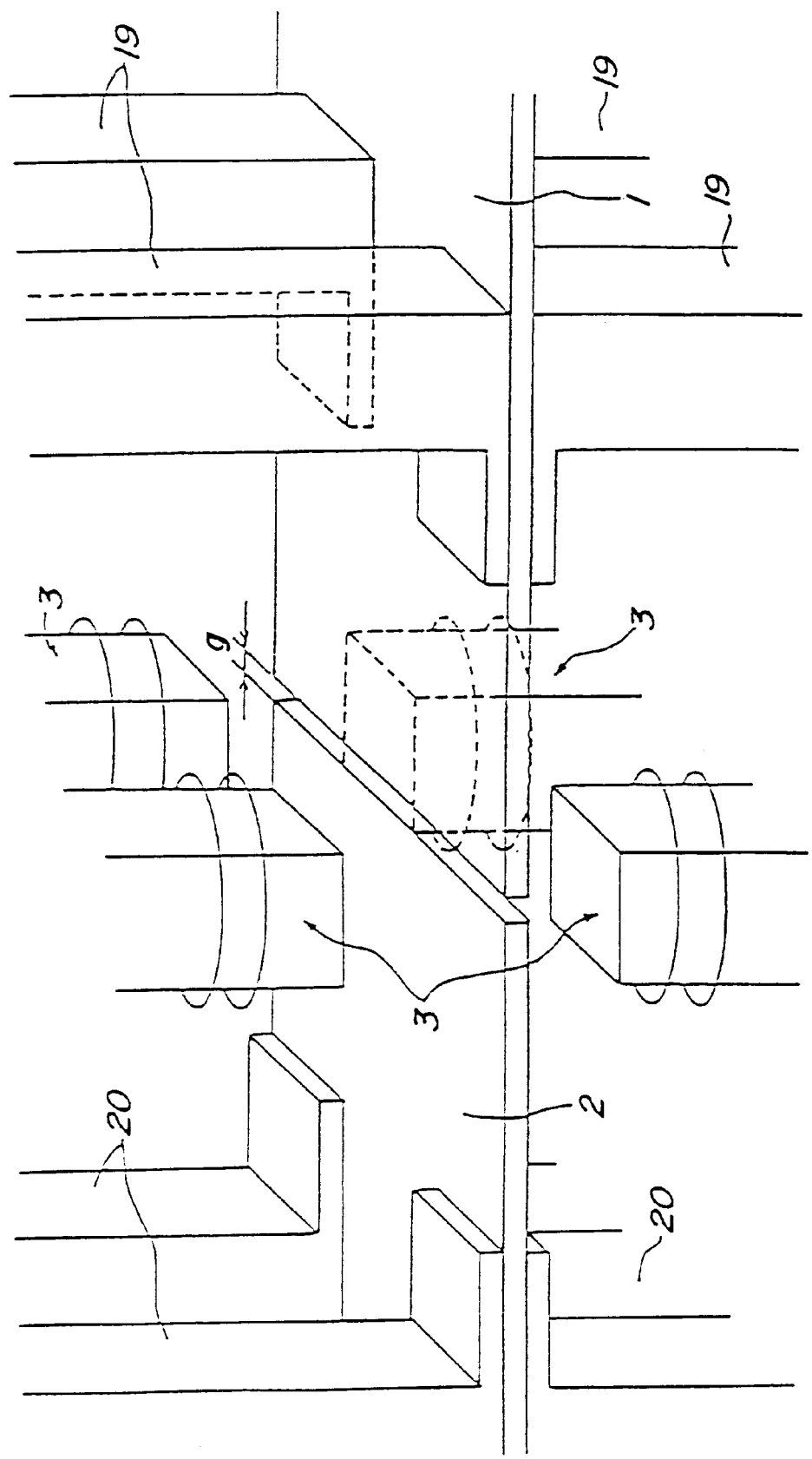
FIG. 42 is an explanatory view showing the state in which metal pieces are heated.

Referring to FIG. 42, the preceding metal piece 1 and the succeeding metal piece 2 are opposed to each other with a space g therebetween, and two inductors 3 each having a pair of magnetic poles vertically sandwiching the metal pieces are provided thereto to generate an alternating magnetic field running through the metal pieces in the thickness direction thereof. The induced current then flows at the ends of the respective metal pieces 1 and 2, and the end region of the opposed faces which will be joined is heated to increase the temperature therein by heat generated due to flow of the induced current. In the case where there is, for example, a temperature difference between the preceding metal piece 1 and the succeeding metal piece 2, however, since the both metal pieces are heated to increase their temperatures at a substantially equal speed, the temperature difference remains. The pressing operation may be started while the temperature in one of the metal pieces does not reach a target joining temperature range or, conversely, one of the metal pieces may be excessively heated to be fused or melted down. Thus, an excellent joining portion may not be obtained.

In the case where the thickness of the preceding metal piece 1 is different from that of the succeeding metal piece 2, the quantity of magnetic fluxes running through the metal pieces in the thickness direction thereof can be equal in the both metal pieces, but the temperature rising speed is faster in the metal piece having a large thickness and slow in the metal piece having a small thickness. In this case, the metal pieces are also brought to the above-described state, and an excellent joining state cannot be obtained.

Therefore, in this invention, in case of heating the ends of the preceding metal piece 1 and the succeeding metal piece 2 to increase the temperature thereof, the temperatures of the respective metal pieces are first measured to grasp the temperature difference therebetween.

Figure 43:
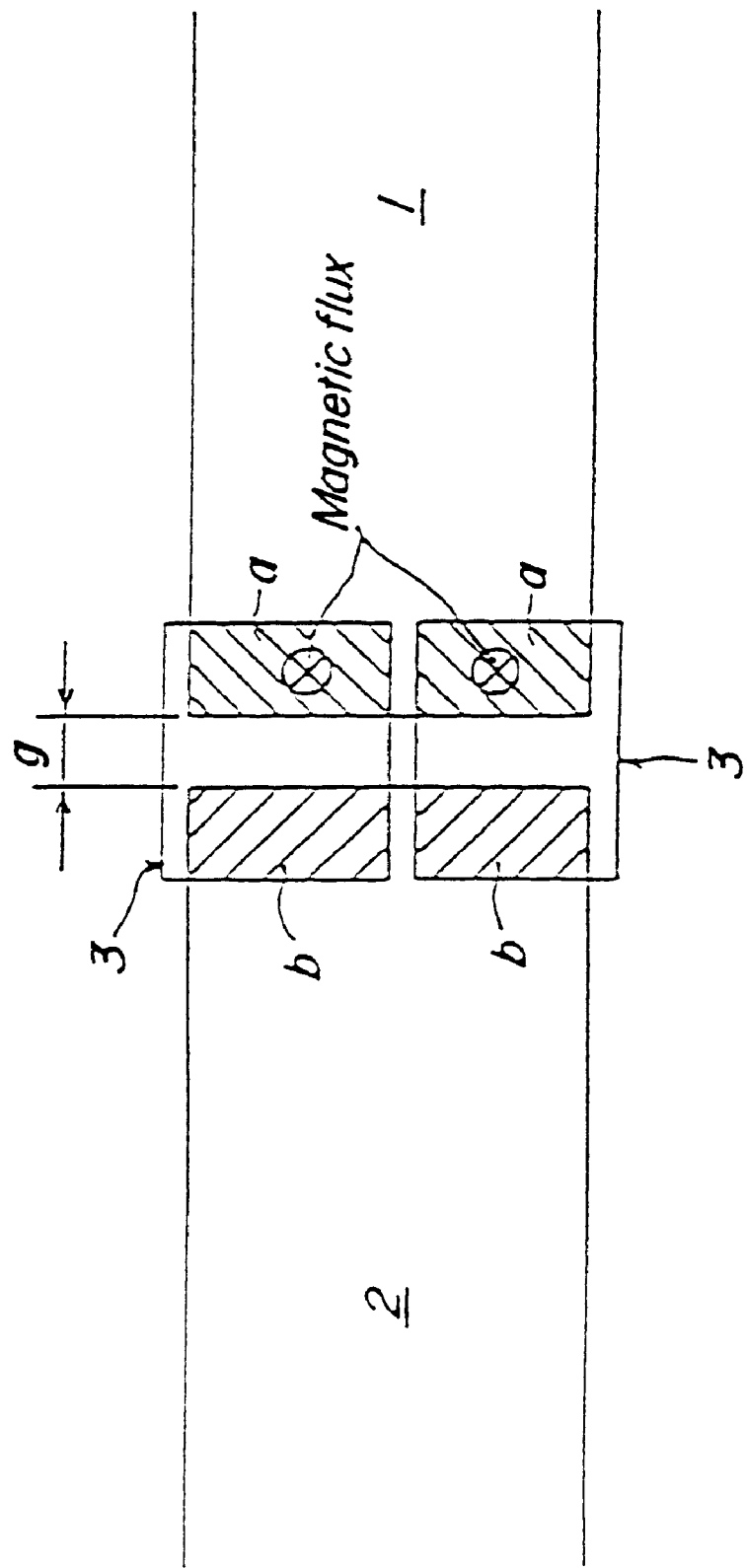
FIG. 43 is an explanatory view showing a case where a penetration quantity of magnetic fluxes is adjusted.

Then, as shown in FIG. 43, in order that the temperatures may reach the same temperature range in the same heating time, the positions of the metal pieces 1 and 2 or the position of the inductor 3 are adjusted (the adjustment of the space g or the positional adjustment of the metal pieces in the longitudinal direction) so that the penetration quantity of the alternating magnetic field is controlled. In this state, the alternating magnetic field running through the metal pieces in the thickness direction thereof is generated and the metal pieces are induction-heated and, at the same time with or after this heating, at least one of the clamps 9 moves toward the opposed metal piece to press the metal pieces 1 and 2 against each other for joining.

In the case where the rear end of the preceding metal piece and the front end of the succeeding metal piece move toward each other and the alternating magnetic field running through the metal pieces in the thickness direction thereof is generated to perform induction heating, the rate of temperature rise on heating can be individually controlled in each metal piece when the penetration quantity of magnetic flux is adjusted for each metal piece. Thus, even when the preceding metal piece is different from the succeeding metal piece in temperature, thickness or melting point, the both metal pieces are heated to increase their temperature to a range suitable for joining the metal pieces in substantially the same time, and the joining having the substantially sufficient strength is possible, eliminating such a problem that the plates are ruptured during rolling.

In the case where the inductor 3 such as that shown in FIG. 42 is used, since the density of the magnetic flux generated by the inductor is substantially constant, the penetration quantity of the magnetic fluxes running through each metal piece can be obtained form the product of the magnetic flux density and the area in which the core of the inductor laps over the metal pieces (which can be calculated from the positions of inductors 3a and 3b and the space g).

For example, in FIG. 43, when heating is carried out assuming that: the area of the core of the inductor is 76 mm×300 mm=0.0228 m$^2$; the magnetic flux density when generating the alternating magnetic field by this inductor is 0.5 T; the distance between the vertical magnetic poles of the inductor is 150 mm; the space g between the preceding metal piece 1 (extremely-low carbon steel having a thickness of 28 mm and C of 0.004 wt %) and a succeeding metal piece 2 (extremely-low carbon steel having a thickness of 28 mm and C of 0.004 wt %) is 5 mm; the lap area a of the magnetic poles in the preceding metal piece 1 is 0.01065 m$^2$; the lap area b of the magnetic poles in the succeeding metal piece 2 is 0.01065 m$^2$; and the power supply frequency of the alternating magnetic field is 1000 Hz, the temperature rising speed of the respective metal pieces is equally 70° C./sec.

In the state of FIG. 44 where the succeeding metal piece 2 is moved back during heating while the preceding metal piece 1 and the inductors 3 are fixed, when the gap g between the preceding metal piece 1 and the succeeding metal piece 2 is changed in a range of 0 through 30 mm (when the lap area of the inductors is changed), the temperature rising speed ratio of the metal pieces shows such a relationship as shown in FIG. 45. If such a relationship is previously grasped, an appropriate penetration quantity of magnetic flux can be determined in accordance with a difference between the temperatures of the metal pieces or types of steel. Further, it can be considered that the temperature rising rate of the metal piece is inversely proportional to the thickness of the same and, if the preceding metal piece 1 is different from the succeeding metal piece 2 in thickness, the heating and temperature rise may be carried out taking such a relationship into account.

In the present invention, although the penetration quantity of magnetic flux in each metal piece is adjusted by moving the metal piece or the inductor, inductors may be individually provided for the respective metal pieces to adjust the magnetic flux density of the alternating magnetic field itself. It is, however, realistic that the penetration quantity of magnetic flux is adjusted by relatively moving the metal piece and the inductor while maintaining the space g between the metal pieces to be constant.

FIGS. 46 through 48 show a specific example of an apparatus having a moving mechanism for adjusting the penetration quantity of magnetic flux by moving the inductor.

In FIGS. 46 to 48, reference number 25 denotes a frame movable along the longitudinal direction of the metal pieces 1 and 2; 26, a carrier roller supporting the metal pieces 1 and 2; 27 and 28, subframes movable along the width direction of the metal pieces within the frame 25; 29 and 30, clamps which are provided in the subframes 27 and 28 for clamping and supporting the metal pieces 1 and 2; 31, a rod which suspends and supports the inductor 5 provided with a C-shaped core so as to be capable of sliding along the axial direction thereof and which can move on a rail 1 provided along the width direction of the metal pieces together with the inductor 5; and 32, a moving mechanism for moving the inductor 5 in the longitudinal direction of the metal pieces separately from the frame 25. As shown in FIG. 47 illustrating the primary part of the moving mechanism 23, the moving mechanism 23 is constituted by fixed wedges 32a and 32b held by a suspending/supporting portion of the inductor 5, and movable wedges 32e and 32f having hydraulic cylinders 32c and 32d and provided between the fixed wedges 32a and 32b and between the rails 1 to face different directions.

There is exemplified the joining apparatus having the above-mentioned arrangement in which the clamps 29 and 30 and the inductor 5 can be easily removed from the carrier line of the metal pieces during maintenance or in an emergency. The adequate heating is enabled by appropriately moving the inductor 5 in the longitudinal direction of the metal pieces by the moving mechanism 32 and adjusting the penetration quantity of magnetic fluxes.

In FIGS. 47 and 48 showing the primary part of the inductor 5, the movable wedges 32e and 32f are first opposedly moved by the hydraulic cylinders 32c and 32d to shift the inductor 5. At this time, the suspending/supporting portions slide on the rails 1, whereby the position of the inductor 5 is adjusted in the longitudinal direction of the metal pieces.

In FIGS. 46 and 48, although there is shown the case where the movement is carried out by using the movable wedges 32e and 32f of the moving mechanism 32, one of the movable wedges may employ a spring or a balance cylinder having a function similar to that of the spring. On the other hand, the inductor 5 may be directly moved by using the hydraulic cylinders instead of the wedges, or the rails 1 themselves may be moved in the longitudinal direction of the metal pieces to shift the inductor 5.

In this invention, the description has been given as to the case where a pair of inductors, each of which has a pair of magnetic poles vertically sandwiching the metal pieces and which can cover the metal pieces over the full width thereof, are provided to perform heating and increase the temperature. However, in the case where a target is metal pieces each having a larger width than that of the inductor, two pairs of, i.e., four inductors may be provided in the plate width direction of each metal piece to perform heating and increase the temperature. In such a case, the heating means is not restricted to a specific form. Further, although the clamps are employed as means used when pressing the metal pieces, pinch rolls may also be adopted.

The explanation will now be give as to a case where a plurality of inductors are used to heat and join the metal pieces.

In the joining operation which is as shown in FIGS. 49(a) and (b) and by which the preceding metal piece 1 and the succeeding metal piece 2 are opposedly provided with a space therebetween to perform heating and increase the temperature, after the rear end of the preceding metal piece 1 and the front end of the succeeding metal piece 2 are heated by the current e induced to the metal pieces by the alternating magnetic field of the inductors 3, the metal pieces are joined by adding the pressing force thereto along the longitudinal direction of the metal pieces. However, the area in which the induced current flows is decreased as the width of the respective metal pieces increases, resulting in the reduction in the temperature rising efficiency at end portions.

As a countermeasure, turning on the electricity for a long time or increase in the quantity of heat input can be considered. When the time for turning on the electricity is prolonged, however, the portion directly below the inductor is heated for a long time, whereby a burn-through is caused due to an excessive heating. On the other hand, when the quantity of heat input is tried to be increased, a maximum value of the input power for one inductor is 2000 through 3000 kW which is the limit at a stage of manufacturing the inverter, and there is hence a limitation.

Accordingly, in order to solve the above-mentioned problems, as shown in FIG. 50, it is required to provide a plurality of inductors along the portions which will be joined in the metal pieces and, for example, two inductors must be provided on a working side (WS) and a driving side (DS).

As a power supply of the inductor, since an inverter whose oscillation frequency depends on a load impedance as viewed from the inverter side, namely, a self-controlled inverter is frequently adopted, when the load impedance on the WS is different from the load impedance on the DS as viewed from the inverter, the oscillation frequency varies.

In the actual joining operation, the joining state on the WS is often different from that on the DS. In the case where the load impedance is changed depending on the joining state (the frequency actually varies at the time of occurrence of an arc), the oscillation frequency of the inverter on the WS is thus different from that on the DS.

If the oscillation frequency of the inverter on the WS is different from that on the DS, phases of the WS and DS are inverted (for example, in case of 500 Hz and 510 Hz, the phases are inverted after approximately 0.98 second), and the induced currents induced to the metal pieces cancel out. As a result, the temperature rising efficiency is decreased, and a desired heating performance cannot be obtained.

In the invention, as shown in FIGS. 51(a) and (b), inverters are exclusively connected to inductors L10 and L20 for use, respectively, and phases are synchronously controlled so that the currents having the same phase flow in the inductors L10 and L20. Eddy currents L11, L21, L12 and L22 induced to the metal pieces have the same phase to realize the effective heating by the induced currents.

FIG. 52 is a block diagram showing a control system in the case where a pair of inductors 3 for generating the magnetic field are provided in the width direction of the metal pieces.

In the drawing, reference numeral 33 denotes an electric power command apparatus; 34 and 35, inverters; and 36, a phase control circuit.

As shown in FIG. 52, the inverter 34 is of a self-controlled type, and its oscillation frequency is determined by a circuit constant (this frequency varies depending of the joining state such as a joining length of the metal pieces). In addition, the phase control circuit 36 has a function for detecting an oscillation frequency and a phase of the inverter 34 and generating ignition pulses which are given to the inverter 35. Note that the inverter 35 is of an externally-controlled type and its oscillation frequency is determined by the ignition pulses supplied from the phase control circuit 36.

Figure 51B:
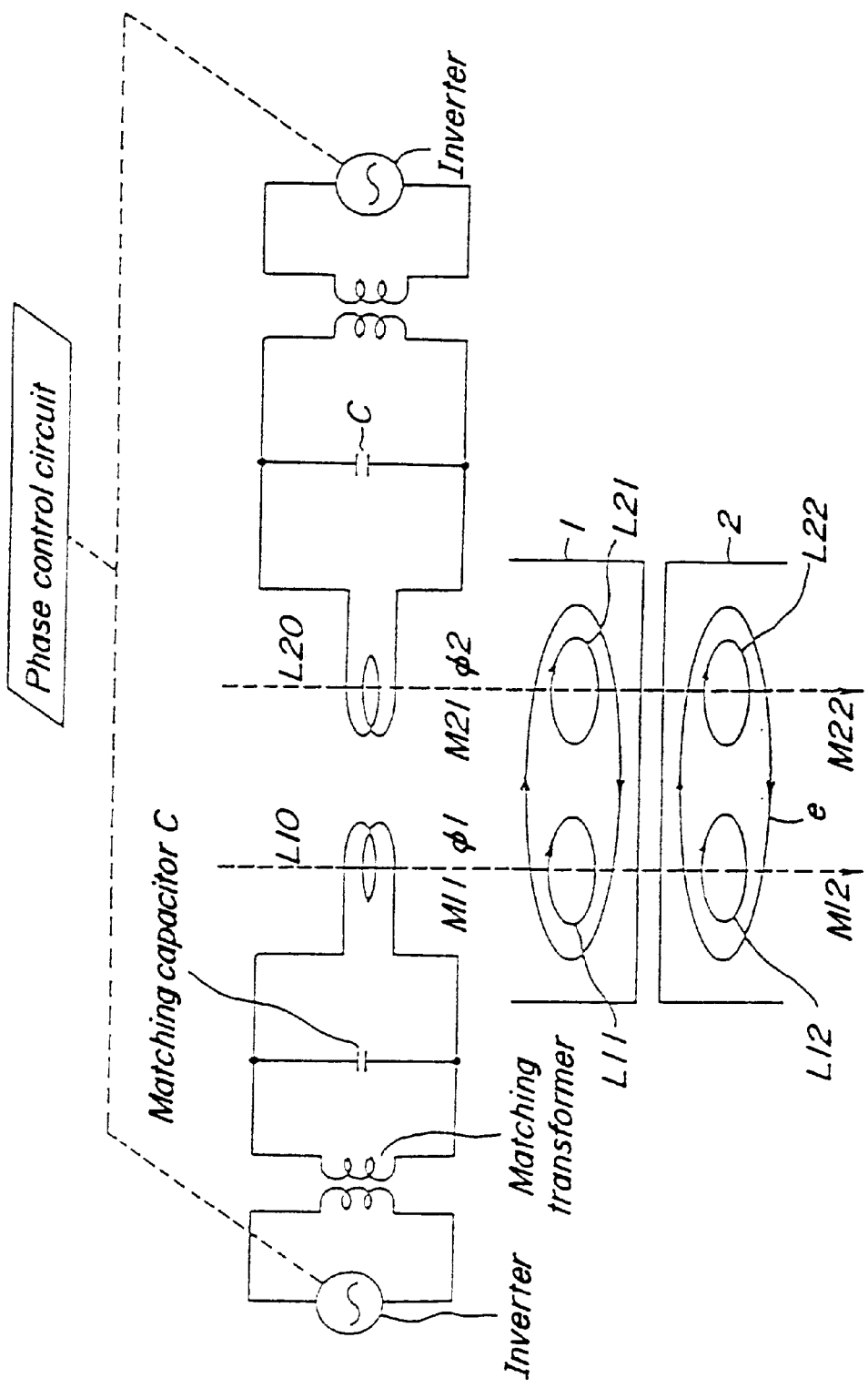
FIGS. 51(a) and (b) are views showing structures in a case where a plurality of inductors are used.

In FIG. 51(b), assuming that the inductance is Li when the loads are viewed from capacitors C, each inverter oscillates by a resonance frequency fi represented by the succeeding expression:

$$fi=1/\{2\pi(LiC)^{1/2}\}$$

Li is determined by the shape of the metal pieces, the distance between the inductors and the metal pieces and the space between the metal pieces, and thus determined by $Li=Li0+(Mi1^2/Li1)+(Mi2^2/Li2)$ from Li0 of the inductors, Li1 of the preceding metal piece, Li2 of the succeeding metal piece, and inductances Mi1 and Mi2 between the inductors and the preceding and succeeding metal pieces.

In this case, when the electricity is turned on for five seconds, a difference between the oscillation frequencies such that there may be no problem is 0.1 Hz.

Figure 53:
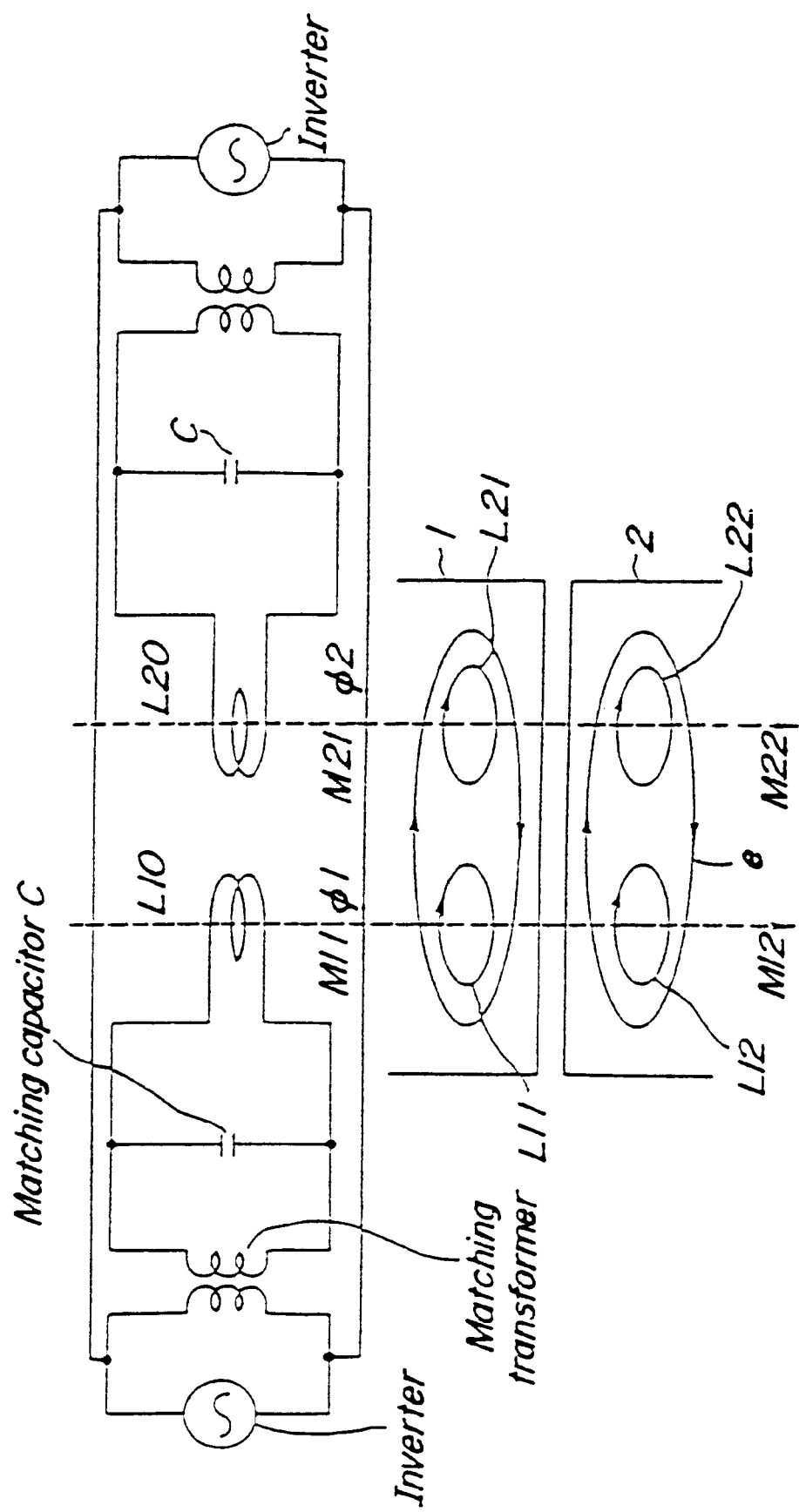
FIG. 53 is a view showing a structure in a case where a plurality of inductors are used.

In order to synchronize the oscillation frequencies and the phases of the inverters on the WS and DS, such a structure as that shown in FIG. 53 may be adopted. That is, the self-controlled inverters are used as power supplies on both the WS and the DS, and the inverters are connected on the secondary sides. The impedances viewed from the inverters thus become common, thereby synchronizing the oscillation frequencies and the phases of the inverters on the WS and DS.

In connection with the above-described case where a plurality inductors are used, a point in arranging each inductor will now be mentioned.

In order to simply and rapidly heat and join the preceding metal piece and the succeeding metal piece without consuming unnecessary energy, it is particularly preferable to adopt a so-called transverse induction heating method by which the preceding and succeeding metal pieces are opposed with a gap of a few or tens mm at their ends (the front end and the rear end), and the inductor 3 having such a structure as that shown in FIG. 54 is disposed herein to perform heating. According to this method, as shown in FIG. 55 which is a top plan view of a joining region of the metal pieces, the induced current e flows at the end of each metal piece, and the temperature in the portions which will be joined in the metal pieces is precedently increased by heating due to this current e, thereby enabling easy joining of the metal pieces by the pressing operation which is subsequently performed. In such a joining method, however, there is no problem in particular when the width of the magnetic poles of the inductor is larger enough than that of the metal pieces, though in the case where the metal pieces having a width larger than that of the magnetic poles of the inductor are joined, the penetration quantity of magnetic fluxes are decreased at the width ends of the metal pieces, and hence the induced current cannot flow in the entire end region of the opposed face of the metal pieces. As a result, the temperature distribution in the width direction becomes uneven, thereby making it difficult to realize the secure joining. On the other hand, in the case where the width of the magnetic poles is made large in correspondence with the width of the metal pieces, it is necessary to increase the current supplied to the inductors in order to obtain a satisfactory quantity of magnetic fluxes running through the metal pieces per unit area. Further, the current supplied to the inductors must be restricted to be within such a range that coils or cores constituting the inductors or the metal pieces and in particular the central region thereof cannot be melted down by Joule heat, and the electric power which can be input to the inductors therefore has a limitation. After all, even though the width of the magnetic poles is enlarged, the quantity of magnetic fluxes per unit area becomes uneven, and the entire area at the ends of the metal pieces cannot be heated at the same speed.

In order to eliminate such a problem, it is extremely effective to use a plurality of inductors as shown in FIG. 50.

However, if a plurality of inductors are only provided along the width direction of the metal pieces at their portions which will be joined, when the space provided between the magnetic poles of the inductors adjacent to each other is large, the temperature rising speed in the metal piece at its portion corresponding to this space is slow as compared with that in any other region. Therefore, there is a disadvantage that even when the heating temperature reaches a target value, the temperature at this portion is lower than this value.

When heating is continued until the temperature in the region which corresponds to the space between the magnetic poles and where the temperature rising speed is lowered reaches a temperature at which joining is possible, any other potion is melted down, disadvantageously affecting on the joining operation for the metal pieces.

In order to eliminate the above-mentioned problems when heating the metal pieces by using a plurality of inductors, the space is preferably set to be not more than 5 times as long as the osmotic depth $d_0$ (m) of the induced current which can be represented by $d_0=\{\rho \times 10^7/(\mu \times f)\}^{1/2}/2\pi$ (it is preferable to provide no space between the magnetic poles of the inductors, namely, the space should be 0, but a protective cover and others are actually disposed to each inductor and the space cannot be set to 0). Here, f represents the frequency of the alternating magnetic field (Hz); ρ, the electric resistivity of the metal pieces (Ω*m), and μ, the relative magnetic permeability.

FIG. 56 shows an example in which a pair of inductors 3a and 3b are arranged at the ends of the metal pieces 1 and 2 along the width direction thereof. When the inductors 3a and 3b are provided as shown in the drawing and a space $w_1$ between the adjacent magnetic poles is set within the above-described range, the induced currents generated by the respective inductors 3a and 3b are united to have a large value. The uniform heating is consequently realized in the full width direction.

Figure 57:
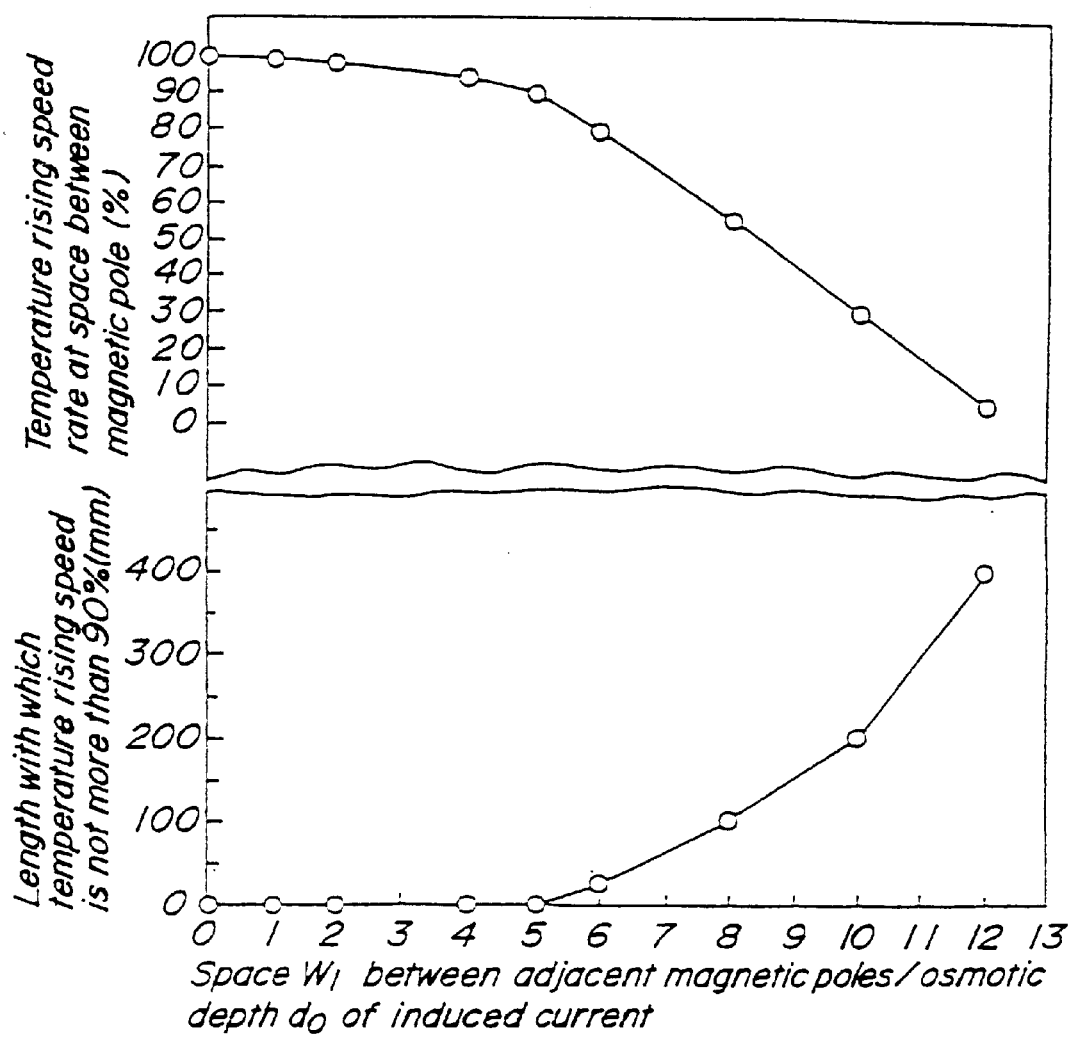

A pair of inductors are provided in the width direction of the metal pieces and only the space between the magnetic poles of the inductors adjacent to each other is varied, and FIG. 57 shows the result of research of influences by a ratio of the space to the osmotic depth $d_0$, the research having been carried out in accordance with the succeeding points:

1) Assuming that the portions which will be joined and correspond with the magnetic poles are 100% a ratio of the temperature rising speed in the portion corresponding to the space between the magnetic poles; and 2) In the width direction of the portions to be joined, a length of a region where the temperature rising speed is not more than 90% with respect to that in the portion corresponding with the magnetic poles.

In this case, the joining conditions are such that: the width of the metal pieces is 1500 mm; the width of the magnetic poles, 1000 mm×2; the applied power, 1000 KW; and the alternating magnetic field frequency, 1 KHz.

As apparent from the drawing, if the space between the magnetic poles is not less than five times as long as the osmotic depth $d_0$, the temperature rising speed in a portion corresponding with the space lowers below 90% of the temperature rising speed of the portion corresponding with the magnetic poles, and a problem may be caused in the actual operation. On the other hand, the region in which the temperature rising speed is not more than 90% gradually increases from 0. Therefore, in the case where a plurality of inductors are used to heat the metal pieces and increase the temperature for joining, it is preferable to set the space between the magnetic poles adjacent to each other to be not more than five times as large as the osmotic depth $d_0$ in connection with the frequency of the alternating magnetic field.

Figure 58:
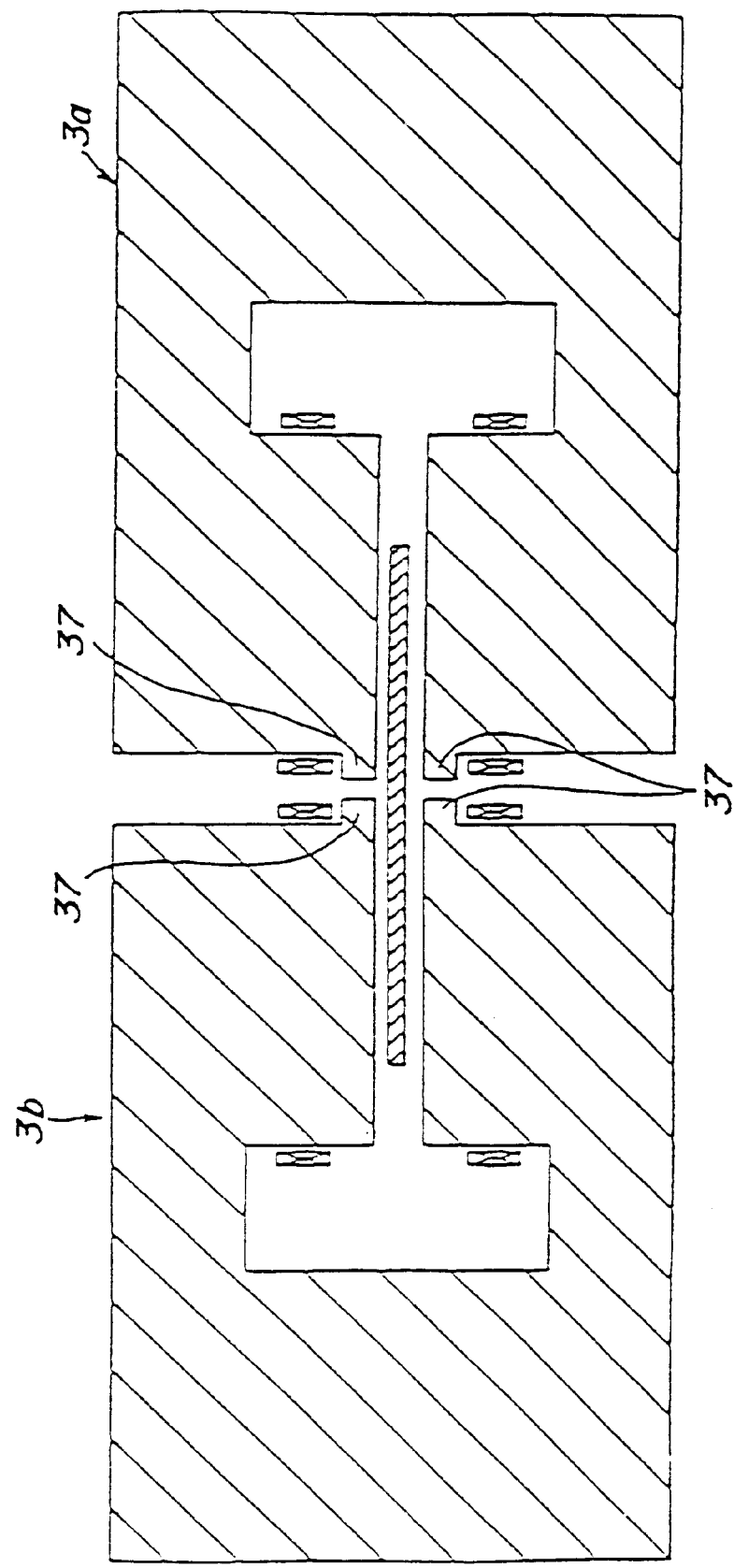

FIG. 58 shows a structure of an apparatus for carrying out such a heating operation.

FIG. 58 shows an example in which two inductors are arranged along the width direction of the metal pieces 1 and 2, and projections 37 are provided to the respective inductors 3a and 3b on the adjacent faces of the magnetic poles adjacent to each other so that the respective inductors 3a and 3b can be brought into contact with each other or a space provided therebetween can be narrowed.

The description has been given as to how to uniformly heat the entire area of the metal pieces in the width direction thereof. As to the above-mentioned various conditions, even if they are satisfied, when the metal pieces joined at a heating temperature of approximately 1350 through 1400° C. are rolled by a finishing rolling mill composed of a plurality of stands with a draft percentage increased by ten times or more, it may not be said that rolling with respect to all kinds of steel can be performed without causing a rupture at the joined portion until the completion of rolling.

For example, in regard of extremely-low carbon steel of SS400 or that having a carbon content of not more than 100 ppm, there sometimes occurs a problem that the plate is ruptured during rolling.

Irrespective of types of steel, it is necessary to provide a heating condition that such a problem as rupture of plate during finishing rolling which is thereafter performed is not caused, and such a heating condition will be described hereinbelow.

In order to realize an excellent joining of the metal pieces, when carrying out joining, the temperature of the portions to be joined must be increased to a value such that the oxidized scale on the surface can be melted and removed, or the base metal can be melted at least on the opposed end faces of the portions which will be joined. Either of them must be satisfied.

The present inventors, therefore, researched about the joining conditions that the metal pieces can withstand rolling with the draft percentage increased by not less than five times after joining, and particularly about a preferable range of heating temperature, for various kinds of carbon steel having a carbon content of 1.3 wt % or 5 ppm.

The quality of joining was judged in accordance with existence/absence of rupture in the plate during finishing rolling after joining and the joined state obtained after rolling. In the judgment of quality, there was actually no problem when finishing rolling was carried out without any problem or even when a crack at a joined portion was partially generated after rolling, and the joining can be hence said to be excellent.

Figure 59:
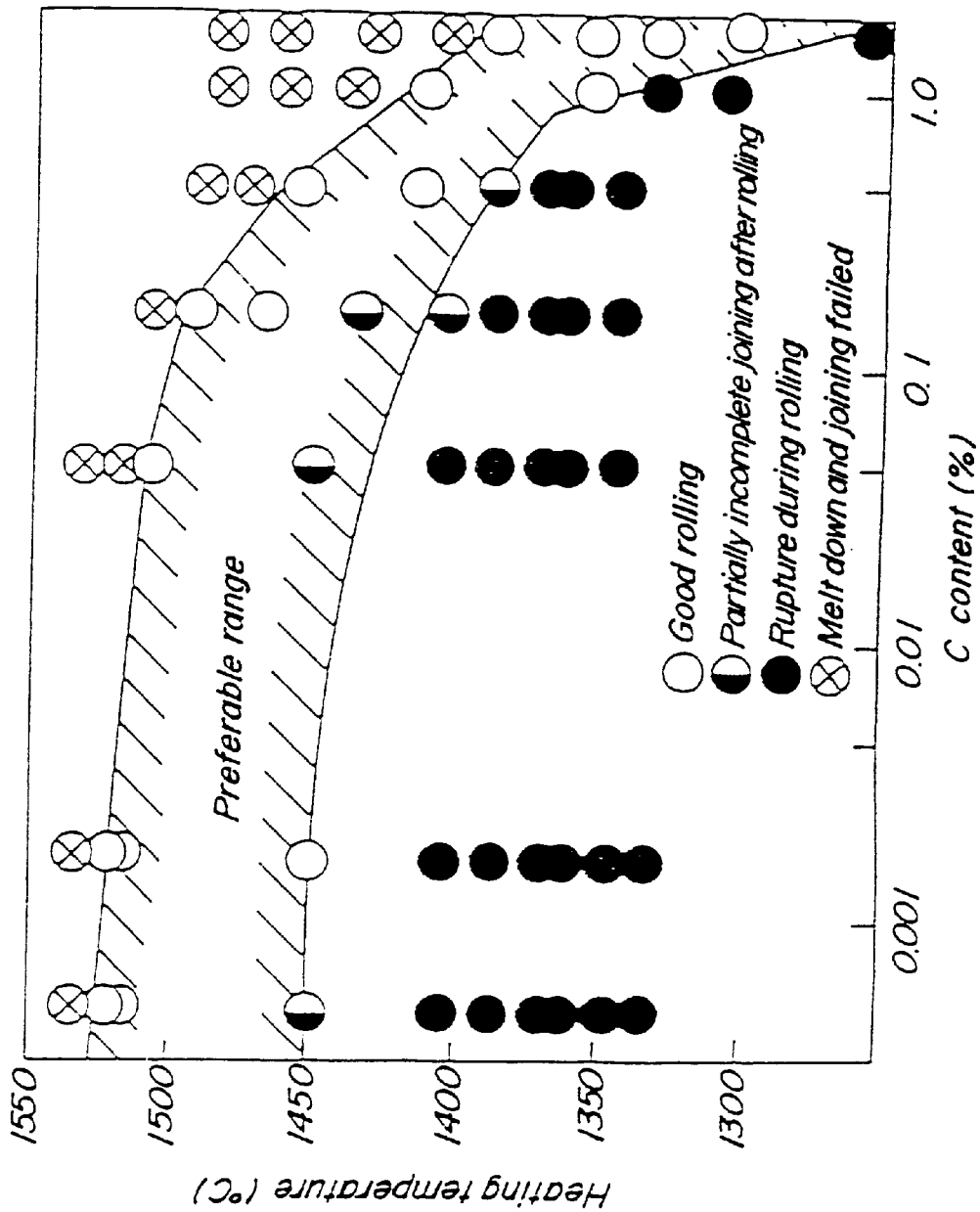

The obtained result is illustrated in FIG. 59.

As shown in the drawing, it was found that the preferable range of heating temperature largely varied in accordance with the carbon content and was extending with values of temperature higher than 1350 through 1400° C., values of which were conventionally good, when the carbon content was small and, on the other hand, the preferable range of heating temperature was extending with lower values when the carbon content was large.

In this case, it was discovered that the preferable range of heating temperature would be excellently appeared when a melting temperature of the scale of iron oxide, a solidus line temperature of the metal pieces and a liquidus line temperature of the metal pieces were used as parameters.

Figure 60:
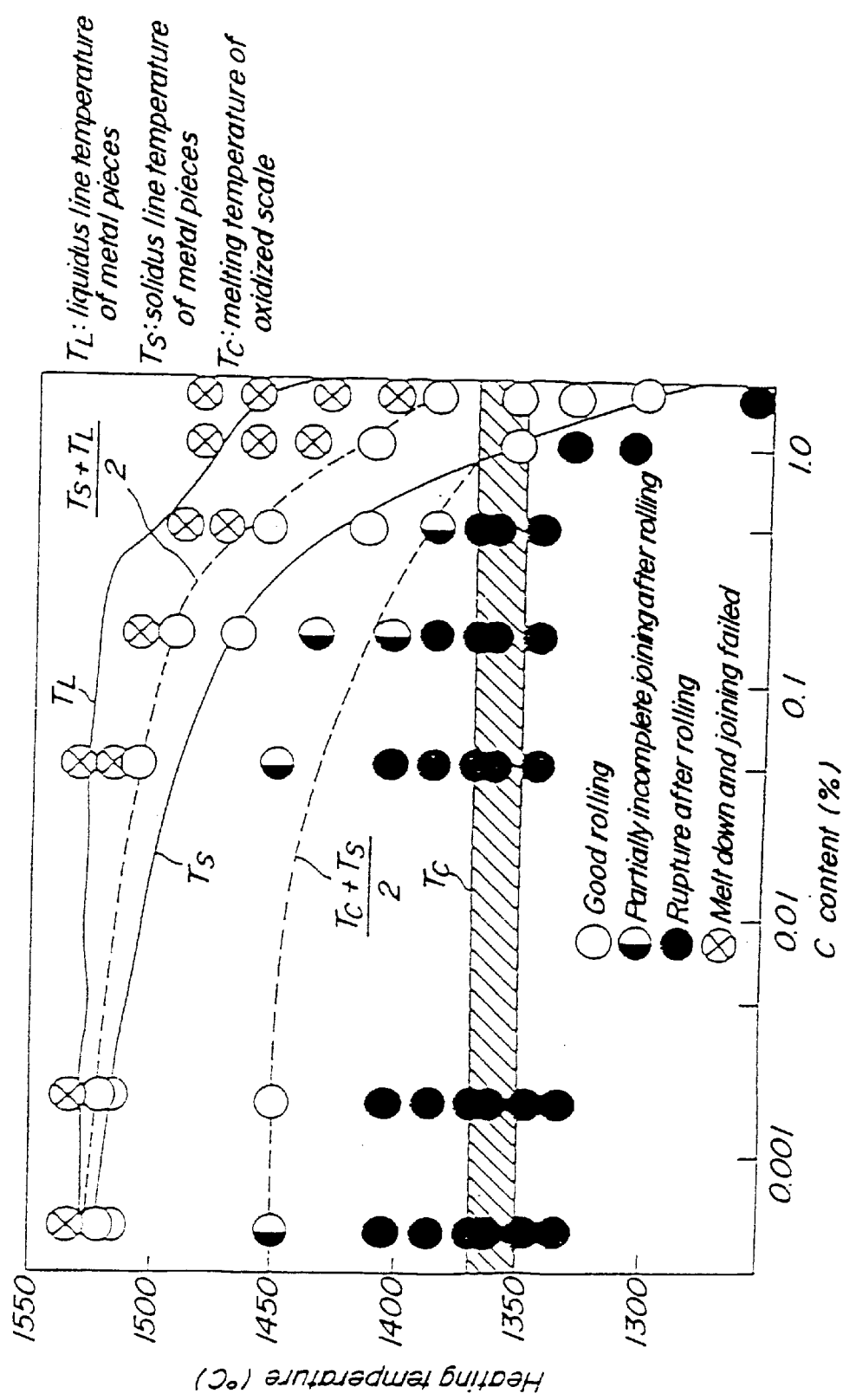

FIG. 60 shows the relationship between the carbon content of the metal pieces and the liquidus and solidus line temperatures of the metal pieces (this figure is drawn by using computational expressions described in "Handbook of Iron and Steel", 3rd edition, Basic I, P. 205 (Maruzen Co., Ltd.)). Further, the drawing also shows the melting temperature of the oxidized scale and the rolling state obtained in FIG. 59.

As apparent from a comparison between FIGS. 59 and 60, an optimum range of heating temperature was able to be excellently appeared by using the solidus line temperature of the metal pieces ($T_S$) and the liquidus line temperature of the metal pieces ($T_L$), and finishing rolling was carried out without any problem if the temperature (T) at the portions which will be joined satisfied a range represented by the succeeding expression:

$$T_S \leq T \leq (T_S + T_L)/2$$

where $T_S$ indicates a solidus line temperature of the metal pieces (° C.), and $T_L$ represents a liquidus line temperature of the metal pieces (° C.).

Although the above range of temperature is the optimum range of heating temperature having no problem, the preferable range of heating temperature actually having no problem can be represented as follows.

That is, the range can be precisely expressed by using the solidus line temperature of the metal pieces ($T_S$), the liquidus line temperature of the metal pieces ($T_L$) and the melting temperature of the scale of iron oxide ($T_C$) as parameters, and the following preferable ranges of heating temperature were found out. Namely, if the solidus line temperature of the metal pieces ($T_S$) is equal to or above the melting temperature of the scale of iron oxide ($T_C$), the temperature in the portions to be joined (T) is in such a range that is higher than an intermediate temperature of the melting temperature of the scale of iron oxide ($T_C$) and the solidus line temperature of the metal pieces ($T_S$) and lower than an intermediate temperature of the solidus line temperature ($T_S$) and the liquidus line temperature ($T_L$) of the metal pieces, namely, a range represented by the succeeding expression:

$$(T_C+T_S)/2 \leq T \leq (T_S+T_L)/2$$

On the other hand, if the solidus line temperature of the metal pieces ($T_S$) is lower than the melting temperature of the scale of iron oxide ($T_C$), the temperature in the portions to be joined (T) is in such a range that is higher than the solidus line temperature of the metal pieces ($T_S$) and lower than an intermediate temperature of the solidus line temperature ($T_S$) and the liquidus line temperature ($T_L$) of the metal pieces, namely, a range represented by the succeeding expression:

$$T_S \leq T \leq (T_S+T_L)/2$$

It was confirmed that $T_S$ and $T_L$ were changed to some extent depending on a main component, but the excellent joining was realized irrespective of types of steel if the above temperature conditions were satisfied.

Accordingly, in the present invention, in the case where the both metal pieces are joined by heating and pressing the rear end of the preceding metal piece and the front end of the succeeding metal piece in a hot rolling line, the pressing operation is effected under such a temperature condition that at least the temperature T (° C.) at the portions to be joined satisfies the succeeding expression:

$$T_S \leq T \leq (T_S+T_L)/2$$

or under such a temperature condition that the same satisfies the succeeding expressions:

(1) if $T_C \leq T_S$, $$(T_C+T_S)/2 \leq T \leq (T_S+T_L)/2,$$

and (2) if $T_C > T_S$ $$T_S \leq T \leq (T_S+T_L)/2$$

Figure 61:
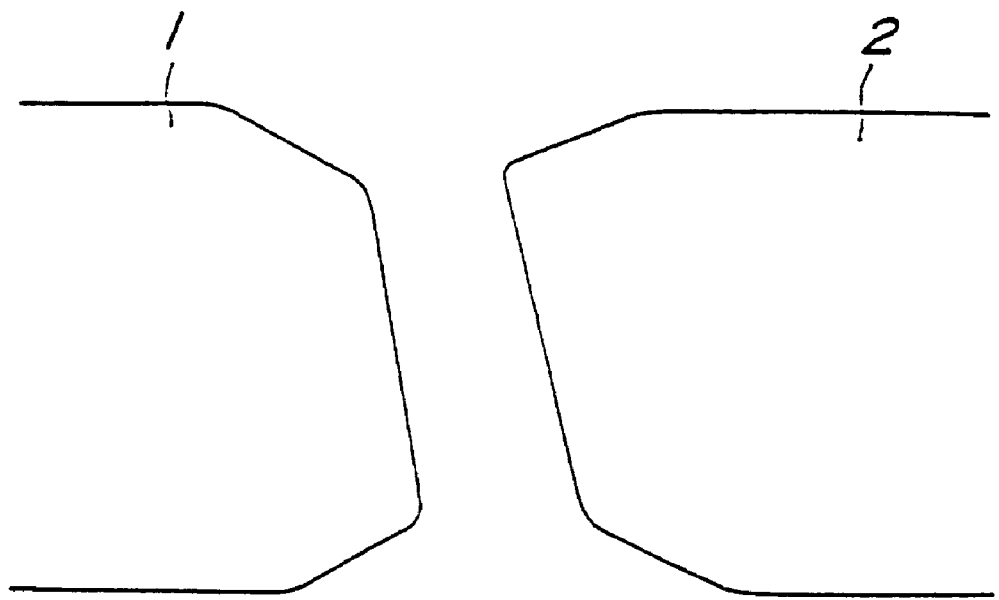

Pressing operation for joining the preceding metal piece and the succeeding metal piece needs to be performed to such an extent that the sufficient strength can be obtained. In the case where cutting is carried out using a crop shear, the vertical cross section of the metal pieces in the longitudinal direction thereof is as shown in FIG. 61, and it is preferable to secure a pressing quantity of approximately 8 through 10 mm in order that the preceding metal pieces and the succeeding metal pieces having such a cross section may be induction-heated to be firm.

BEST MODE FOR CARRYING OUT THE INVENTION

EMBODIMENT 1

Embodiment (1)

Sheet bars (low carbon steel) each having a width of 1000 mm, a thickness of 30 mm and a temperature of 1000° C. were joined by using an equipment (provided with dislocation preventing plates of SUS304 each having a thickness of 40 mm and 20 notches each having a width of 30 mm and a length of 900 mm (a width at a portion for suppressing deformation of the plate is 20 mm), and a finishing roller mill group having seven stands) such as shown in FIG. 20 under the succeeding conditions, and hot finishing rolling for obtaining a finished plate width of 3 mm was carried out. Further, the temperature distribution of the sheet bars in the width direction thereof at the time of completion of joining and the state of rupture of the plates during rolling were examined.

Figure 62:
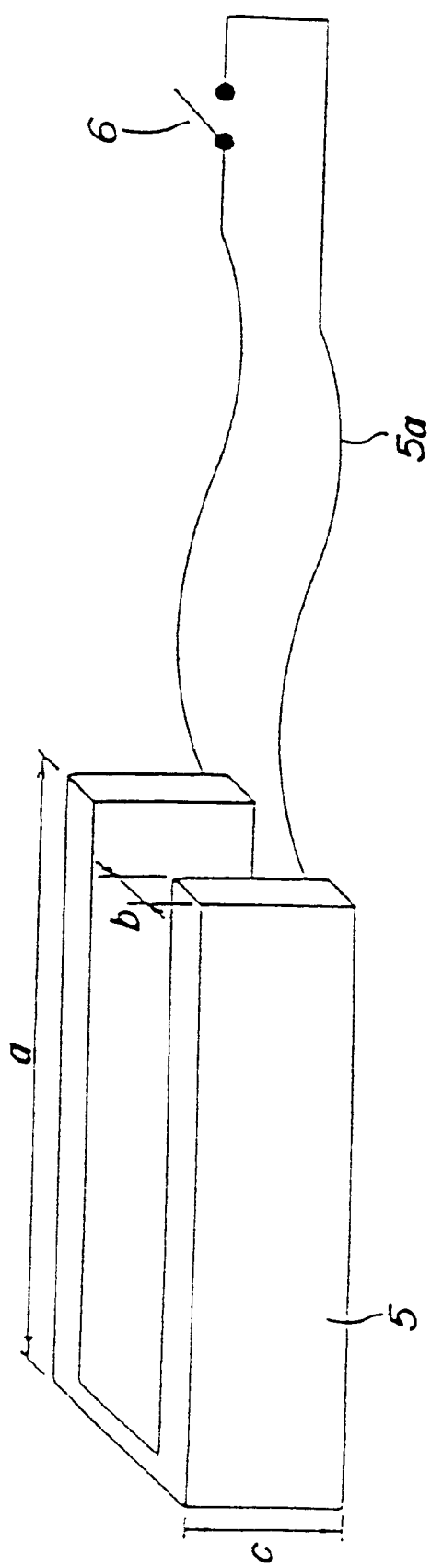

Conditions:

a. The distance between a preceding sheet bar and a succeeding sheet bar: 5 mm.

b. The size of a core of an inductor: width=1000 mm, dimension along the longitudinal direction of the sheet bars=240 mm.

c. The power supplied to the inductor: 1000 kw, and a frequency: 650 Hz.

d. Ten constitutive members having a size of a=200 mm, b=20 mm and c=20 mm (see FIG. 62) are disposed to a space between the inductor and the sheet bars at an interval of 50 mm along the plate width direction, and each reverse magnetic field generation circuit positioned at a central portion in the plate width direction (the circuit inwardly positioned from the width end by 250 mm) is closed to perform heating for 12 seconds and increase the temperature.

e. The pressing force: 2 kg/mm² (pressed after heating and increasing the temperature).

Figure 63:
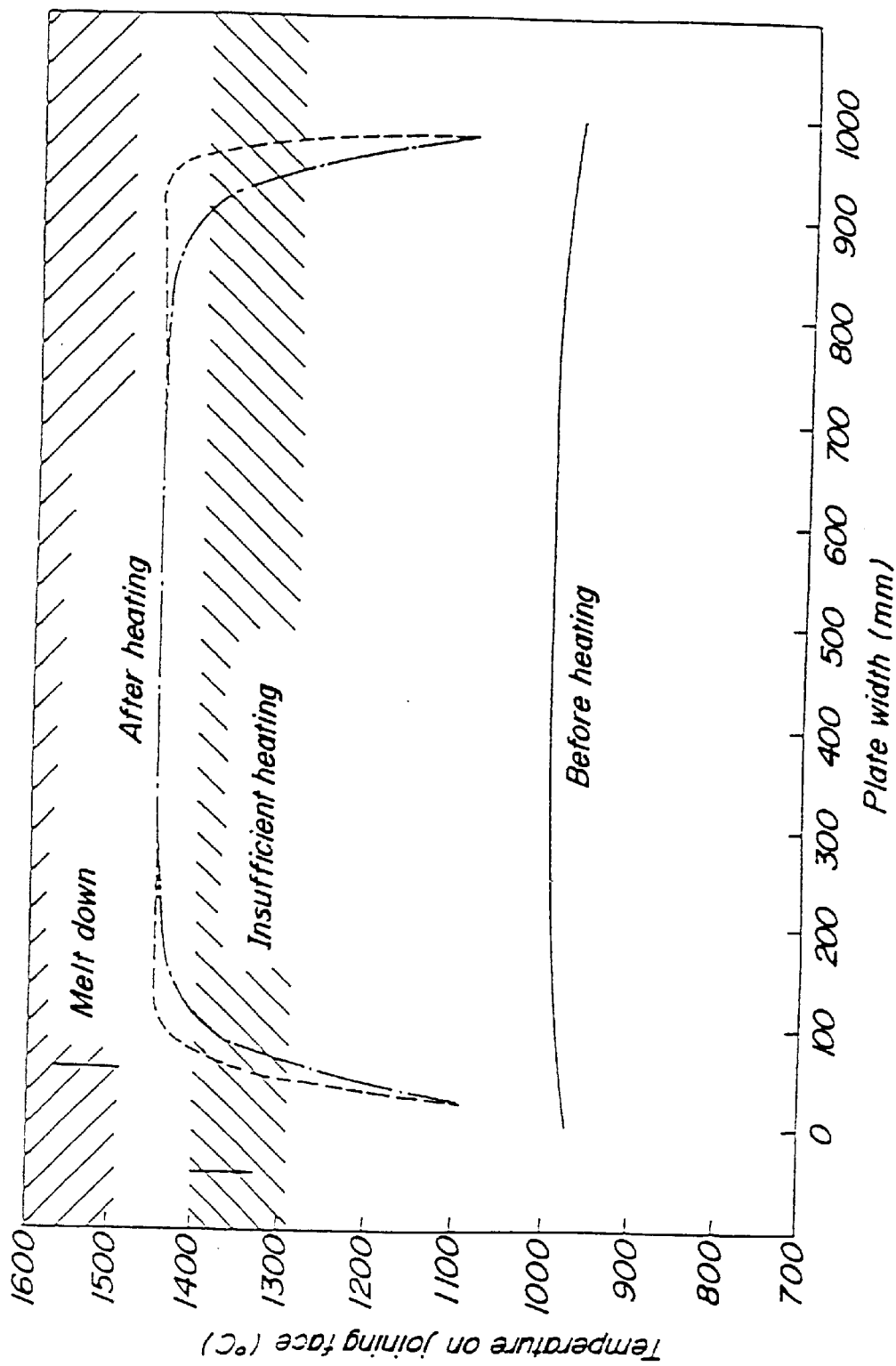

As a result, it was confirmed that the temperature distribution in the plate width direction was improved as shown in FIG. 63 and the stable hot rolling was enabled without causing rupture of the plates during rolling.

Embodiment (2)

Sheet bars (low carbon steel) each having a width of 1000 mm, a thickness of 30 mm and a temperature of 1000° C. were joined by using an equipment (provided with dislocation preventing plates of SUS304 each having a thickness of 40 mm and 20 notches each having a width of 30 mm and a length of 900 mm (a width at a portion for suppressing deformation of the plate is 20 mm), and a finishing roller mill group having seven stands) such as shown in FIG. 20 under the succeeding conditions, and hot finishing rolling for obtaining a finished plate width of 1.2 mm was carried out. Further, the temperature up speed ratio in the width direction of the sheet bars at the time of heating and the state of rupture of the plates during rolling were examined.

Conditions:

a. The distance between a preceding sheet bar and a succeeding sheet bar: 5 mm.

b. The size of a core of an inductor: width=1000 mm, dimension along the longitudinal direction of the sheet bars=240 mm.

c. The power supplied to the inductor: 1000 kw, a current: 6120 A, a frequency: 650 Hz, and a magnetic flux density: 0.21T.

d. Constitutive members each including magnetic substance (formed by superimposing 70 thin plates of silicon steel having an insulating film one on another) and having a size of a=200 mm, b=1 mm and c=20 mm (see FIG. 62) are provided to notches of the dislocation preventing plate (see FIG. 11) at a space between the inductor and the sheet bars, and all the reverse magnetic field generation circuits are opened for eight seconds from the start of heating, and a circuit positioned at a central portion in the plate width direction (the circuit inwardly placed at a position distanced from the width end by 250 mm) is closed to perform heating for 2 seconds.

e. The pressing force: 50 tons (pressed after heating and increasing the temperature).

Figure 64:
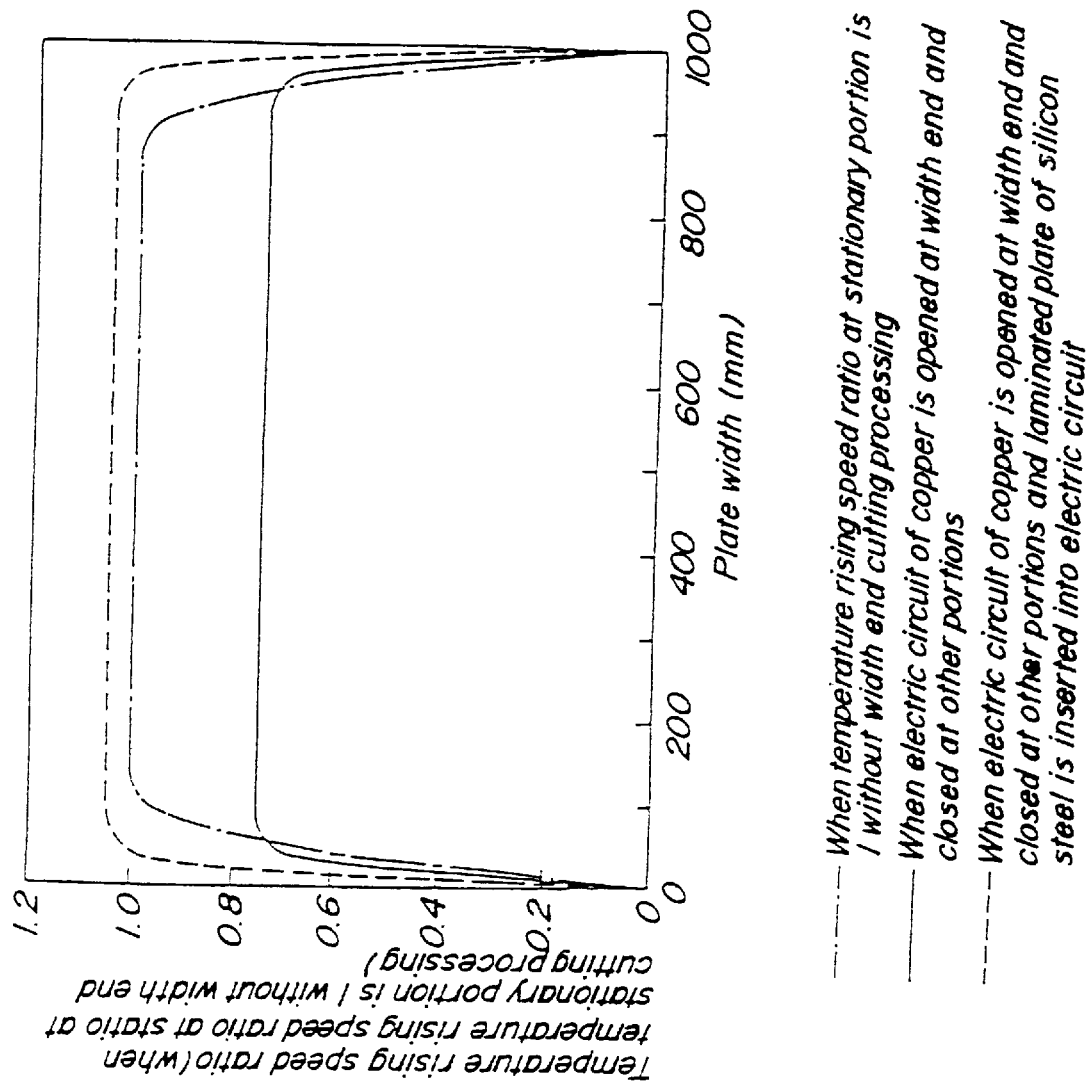

FIG. 64 is a graph in which the temperature rising speed ratios are compared, and it was confirmed that the effective heating was enabled and no rupture of the plates occurs during rolling in the case where the members consisting of magnetic substance were provided as the constitutive members.

EMBODIMENT 2

Embodiment (1)

An apparatus such as shown in FIG. 21 was used on the entry side of the rolling equipment for hot rolling, and joining of metal pieces having the same width dimension was tried. Both the preceding metal piece and the succeeding metal piece are extremely-low carbon steel and have a thickness of 30 mm, a width of 800 mm and a length of 6000 mm.

These preceding and succeeding metal pieces were opposed with a space of 5 mm being formed therebetween, and copper plates as conductive members were provided at the both width ends of the metal pieces in close proximity with each minute gap of 4 mm therebetween. Further, the alternating current was supplied to such an inductor as shown in the drawing, and the alternating magnetic field running through the magnetic pieces in the width direction thereof was generated to perform heating.

A temperature of the metal pieces before heated is 1000° C.; a thickness, a width and a length of each copper plate extending over the preceding metal piece and the succeeding metal piece are 30 mm, 200 mm and 600 mm, respectively; and a length and a width of each core of the inductor in cross section parallel with the metal pieces are 240 mm and 1000 mm, respectively.

A distance between each magnetic pole and the metal pieces is 90 mm on the upper side and 90 mm on the lower side; a frequency of the alternating magnetic field is 1000 Hz; and an input power is 980 kW.

After the induction heating was carried out for ten seconds under these conditions, the preceding and succeeding metal pieces were opposed to and pressed against each other using the clamps with the pressing force of 40 t applied to complete the joining. As a comparative example, the metal pieces were joined under the same conditions with those of the embodiment except that the copper plates were not provided to the sides of the both metal pieces.

Figure 65:
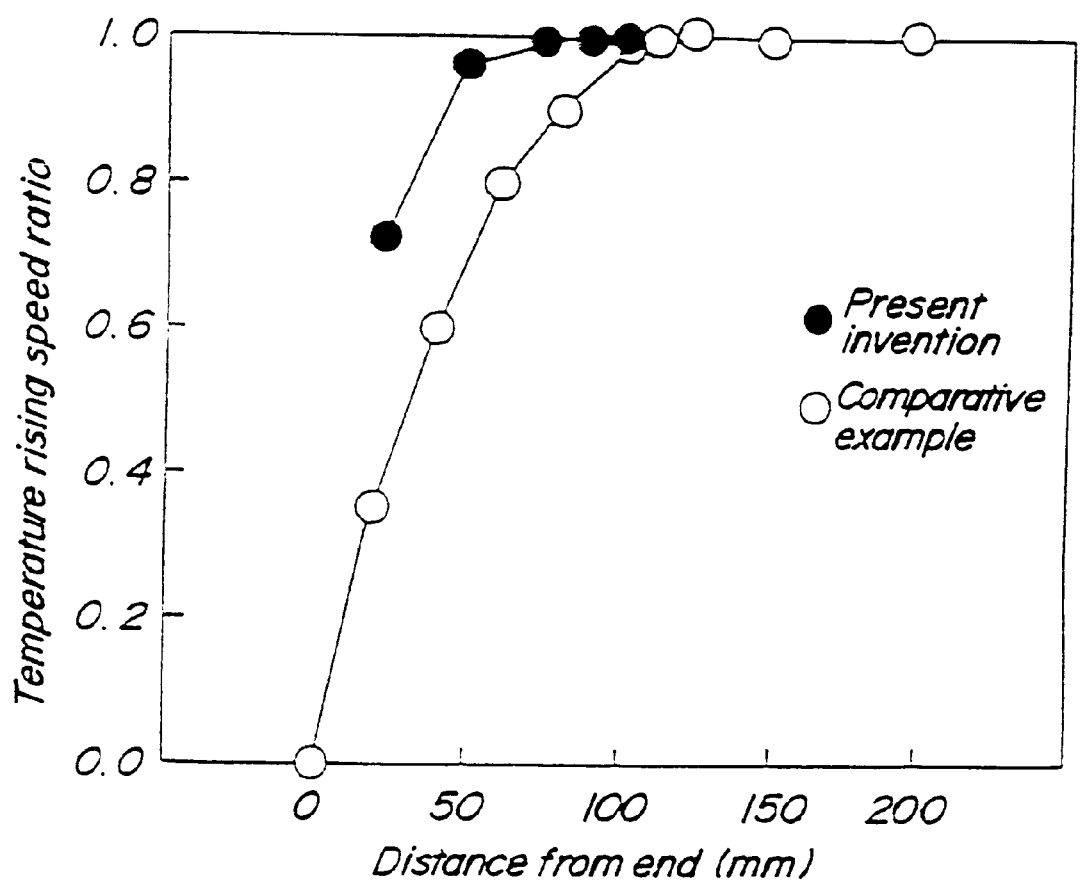
FIG. 65 is a graph showing the relationship between the distance from an end of a plate and the temperature rising speed ratio.

FIG. 65 shows a result of measuring the temperature rising speeds at the portions to be joined in the embodiment and the comparative example (the temperature was measured by embedding double bevel thermometer at a position inwardly distanced from the end of each metal piece by 1.5 mm in the longitudinal direction thereof).

FIG. 65 illustrates the temperature rising speed ratio in the vicinity of the end of each metal piece in the width direction thereof assuming that a central portion of the metal piece in the width direction is 1.

As obvious from the drawing, when the conductive member was provided to the side of each metal piece in close proximity according to the present invention, the temperature up speed at the end in the width direction approximated the temperature rising speed at the central portion. That is because the induced current generated directly below a core of the inductor flows to the end of the metal pieces in the width direction. Thus, the end of each metal piece in the width direction was heated and softened at a temperature such that the joined portion having a sufficient strength was able to be obtained without causing the melt down in the central region in the width direction. Thereafter, when the rolling was carried out, it was confirmed that no cracks were developed at the joined portion to bring about the rupture and the excellent rolling was enabled.

Embodiment (2)

Figure 23:
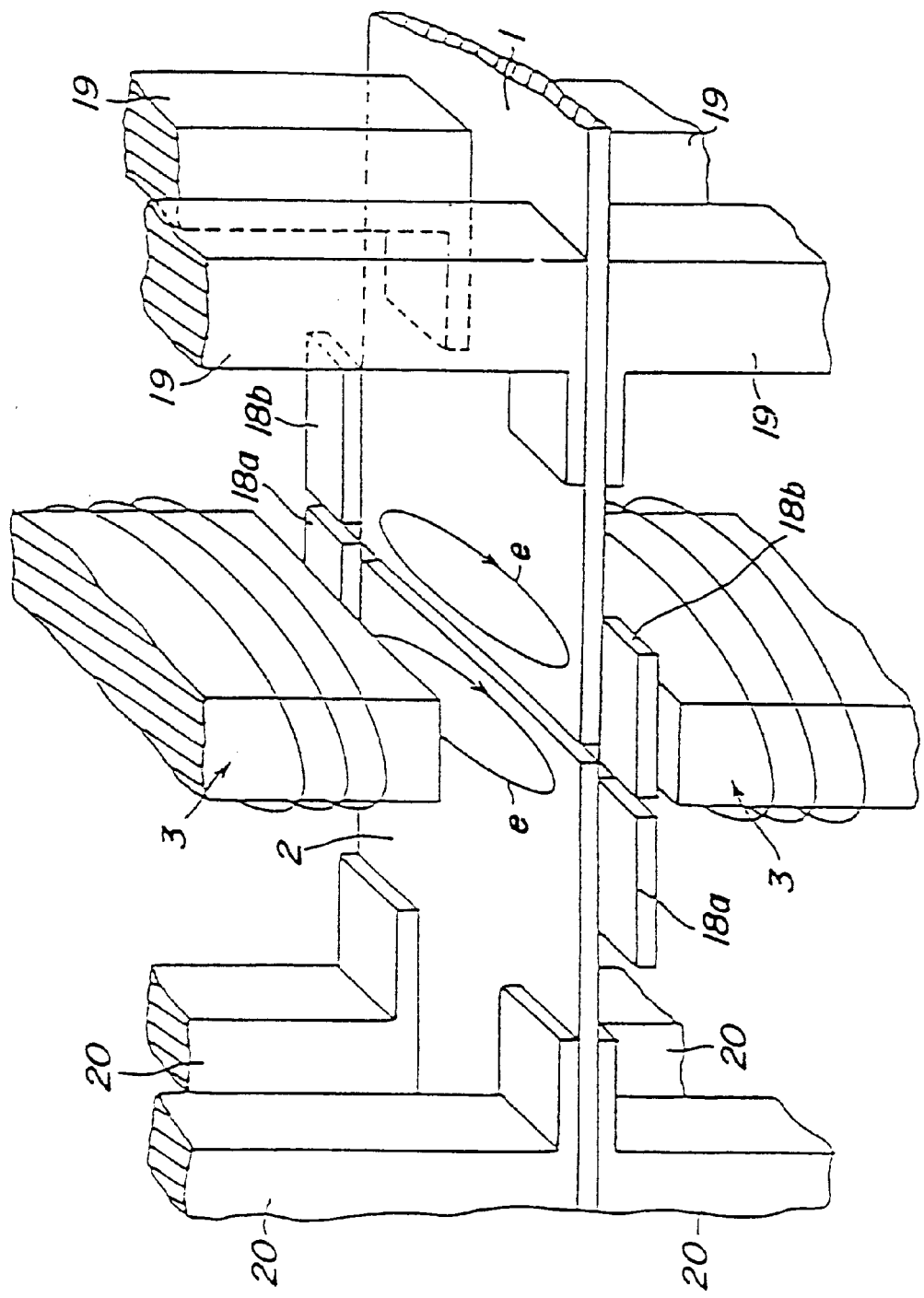
FIG. 23 is a view showing a structure of a primary part of a joining apparatus according to the present invention.

As shown in FIG. 23, individual copper plates were provided to the both width ends of the preceding metal piece and the both width ends of the succeeding metal piece in close proximity. A thickness, a width and a length of each copper plate were 30 mm, 200 mm and 300 mm, respectively, and a gap between the respective metal pieces and the respective copper plates was all 4 mm. In regard of other conditions, the type and size of steel used as the preceding and succeeding metal pieces, the size of an inductor, an input power, a frequency and other were all the same with those in Embodiment (1).

When the temperature rising speed in the vicinity of the portions of the metal pieces which will be joined was measured during heating and the temperature rising speed ratio of the both width ends with respect to that of the central portion in the width direction was calculated, the result equal to that of Embodiment (1) was obtained. No cracks was generated and developed by the rolling thereafter performed, and the plates were excellently joined.

Embodiment (3)

In this embodiment, an examination was carried out about a case where the current whose phase is the same with that of the induced current was supplied to the conductive members.

By using such an inductor as shown in FIG. 25, the preceding and succeeding metal pieces both having a width of 800 mm were joined. At the time of heating, the inductor having a substantially-C-shaped core (a sectional dimension parallel with the metal pieces: a length=1000 mm, a width= 240 mm) was used so that the copper plates which are the conductive members overlap on the magnetic poles of the inductor.

The preceding metal piece and the succeeding metal piece were of SUS 304 steel type and had a temperature of 900° C. before heating, and the copper plates were provided to the both width ends of the metal pieces in close proximity so as to connect the rear end of the preceding metal piece to the front end of the succeeding metal piece.

Each of the copper plates had a thickness of 30 mm, a width of 200 mm and a length of 600 mm. Further, a frequency of the alternating magnetic field in a range of 500 Hz to 10 kHz was set to 500 Hz, 1 kHz and 10 kHz, and an input power was 780 kW. Under these conditions, the induction heating was performed for ten seconds and the preceding metal piece and the succeeding metal piece were then pressed against each other with a pressing force of 40 t by using clamps to complete the joining.

The temperature rising speed in the vicinity of the joining portion of the succeeding metal piece was measured during heating in each frequency, and the temperature rising speed ratio of the end portion in the width direction with respect to that of the central portion in the width direction was obtained as a mean value.

As a result, the temperature rising speed at the end portion in the width direction further approximated to the temperature rising speed in the central portion as compared to Embodiment (1).

Thus, the preceding metal piece and the succeeding metal piece was able to be joined in the entire region in the width direction thereof, and no cracks were developed from the joined portion to lead to rupture in the rolling thereafter performed.

EMBODIMENT 3

Embodiment (1)

In order to join the preceding metal piece and the succeeding metal piece both having a plate thickness of 30 mm and a plate width of 800 mm and being of low carbon steel type, heating (conditions for heating and increasing the temperature: a longitudinal dimension of a core=240 mm, a width dimension of the core=1000 mm, a gap between upper and lower magnetic poles=210 mm, an input power=200 Kw and alternating magnetic field frequency=2000 Hz, a conductive member: material=graphite, a thickness=30 mm, a width=200 mm and a length=250 mm, and four conductive members were pressed against the preceding and succeeding metal pieces at four width end portions) and pressing (pressing condition: pressing force of 60 ton) were carried out in the state shown in FIG. 28 to join the both metal pieces. The obtained metal piece was supplied to a hot rolling equipment to be subjected to finishing rolling, and rupture of the plate which might be caused by rolling was checked.

As a result, it was confirmed that there was no rupture of the plate caused due to cracks at a joined portion.

EMBODIMENT 4

Embodiment (1)

After the sheet bars (low carbon steel) each having a plate width of 1000 mm and a thickness of 30 mm were joined by using an equipment provided with an apparatus having such a structure as shown in FIG. 34 under the succeeding conditions, hot finishing rolling for obtaining a plate having a finished plate thickness of 3 mm was carried out, and examinations were made into an existence/absence of rupture of the plate during rolling and a temperature distribution in the plate width direction immediately after joining of the sheet bars.

Conditions for Joining the Sheet Bars:

a. A temperature of the sheet bars before finishing rolling is approximately 900 through 1000° C., and an electric resistivity in this temperature range is approximately 120× $10^{-8}$ Ωm. Therefore, when the alternating magnetic field was applied with a frequency of 500 Hz, the osmotic depth $d_0$ is approximately 25 mm. Each member consisting of magnetic substance (dimension: a width of 100 mm×a length of 150 mm×a height of 30 mm) was thus disposed at a position distanced from the width end of the plate by 10 to 110 mm.

b. A space between a preceding sheet bar and a succeeding sheet bar: 10 mm.

c. Size of an inductor (core): an inductor having a dimension along the width direction of the sheet bars of 1000 mm and a dimension along the longitudinal direction of the same of 240 mm was used.

d. A power input to the inductor: 1500 kW, a frequency: 500 Hz.

e. A heating time: 10 seconds.

f. A pressing force: 3 kg/mm$^2$.

Figure 66:
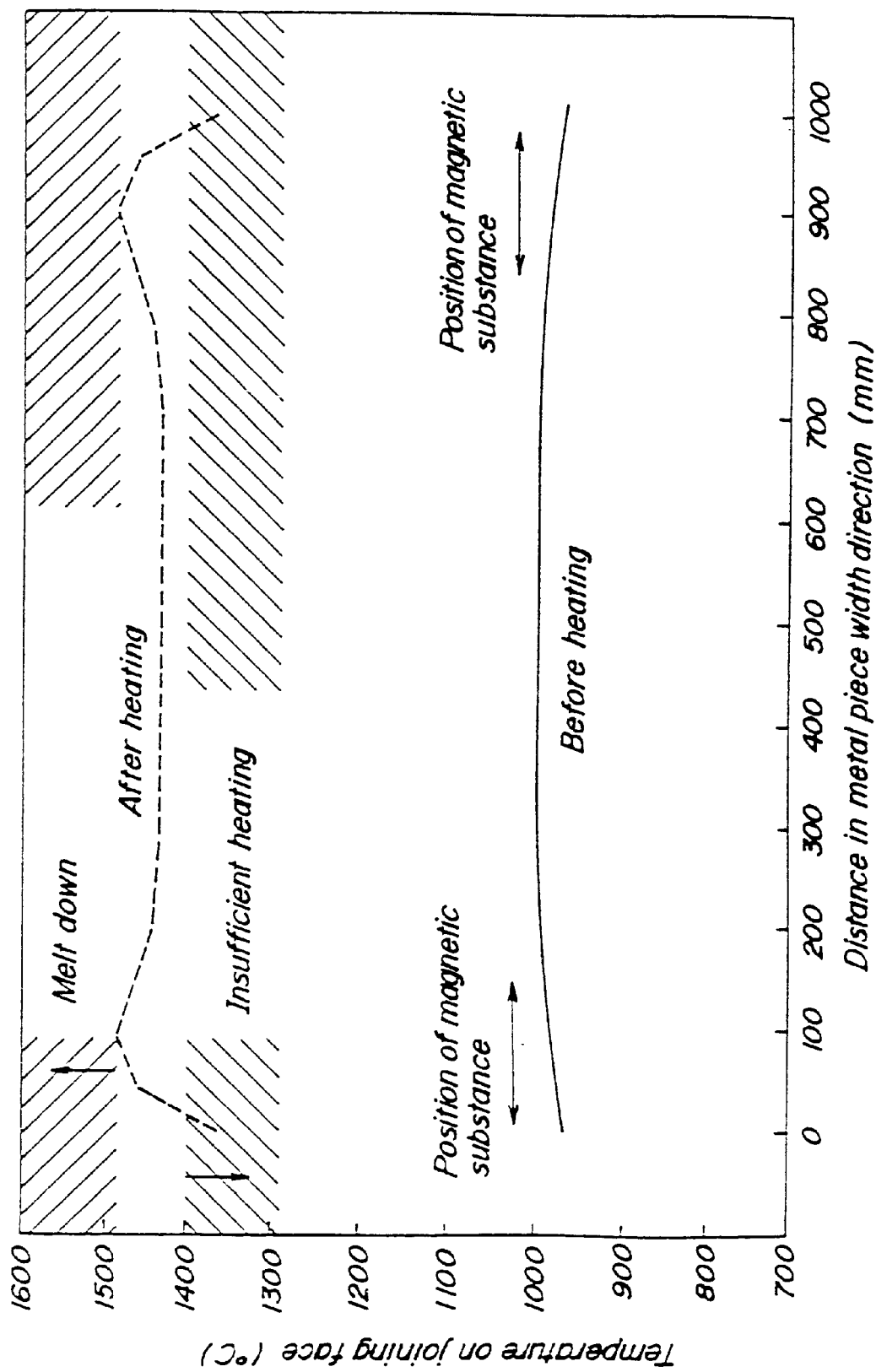
FIG. 66 is a graph showing the relationship between the distance in a width direction of a metal piece and the temperature at a joining face.
Figure 67:
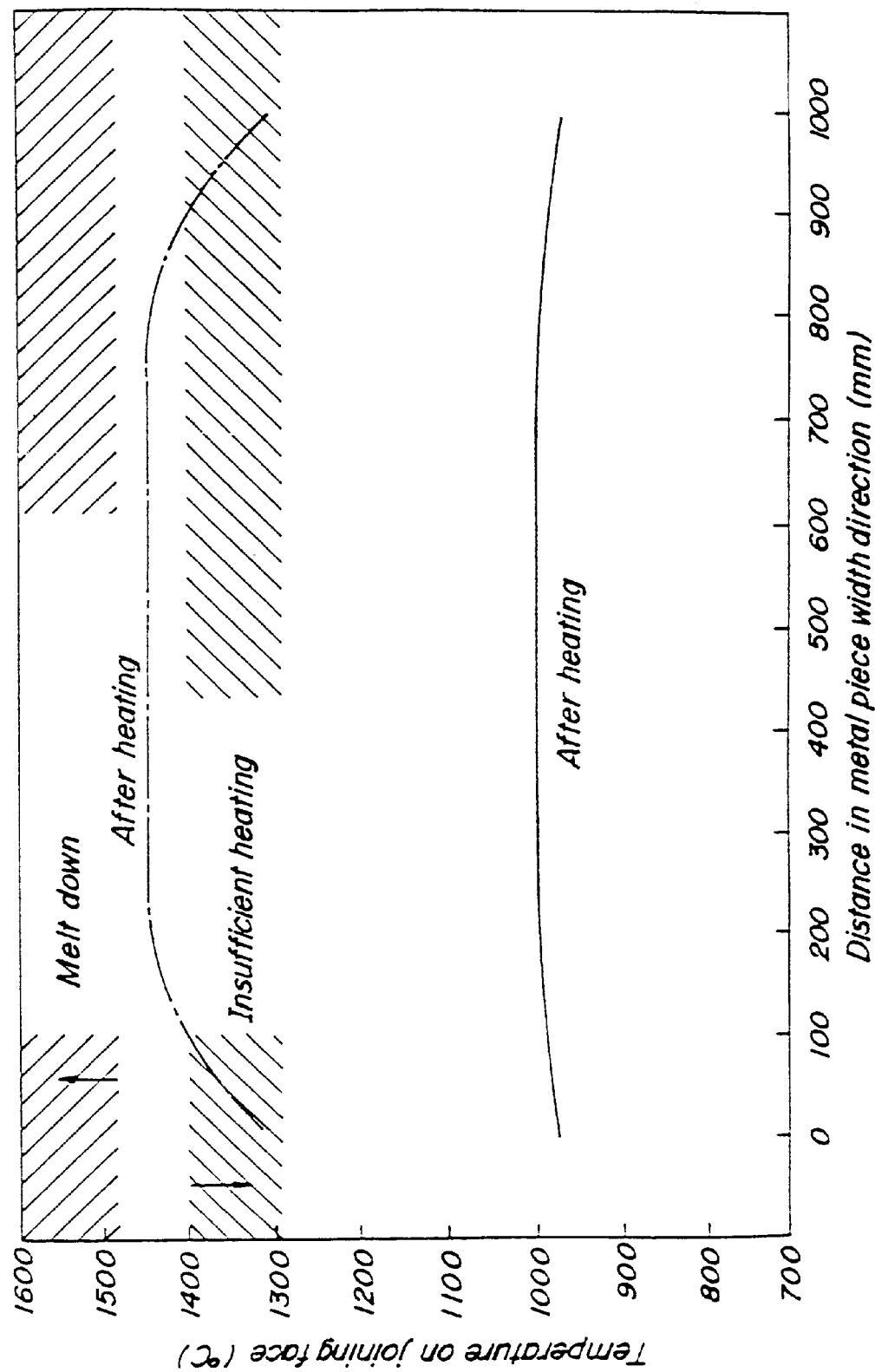
FIG. 67 is a graph showing the relationship between the distance in a direction of a metal piece width and the temperature of a joining face.

FIG. 66 shows the result of comparison between the temperature distributions in the width direction of the sheet bar before and after heating when the both sheet bars were joined in accordance with the present invention, and FIG. 67 shows the temperature distributions when the usual heating was performed (a comparative example: when members consisting of magnetic substance were not disposed).

As apparent from FIGS. 66 and 67, it was confirmed that the application of heat to the metal pieces extremely reduced portions in which the application of heat was insufficient which would lead to an existence of non-joined portions.

Figure 68:
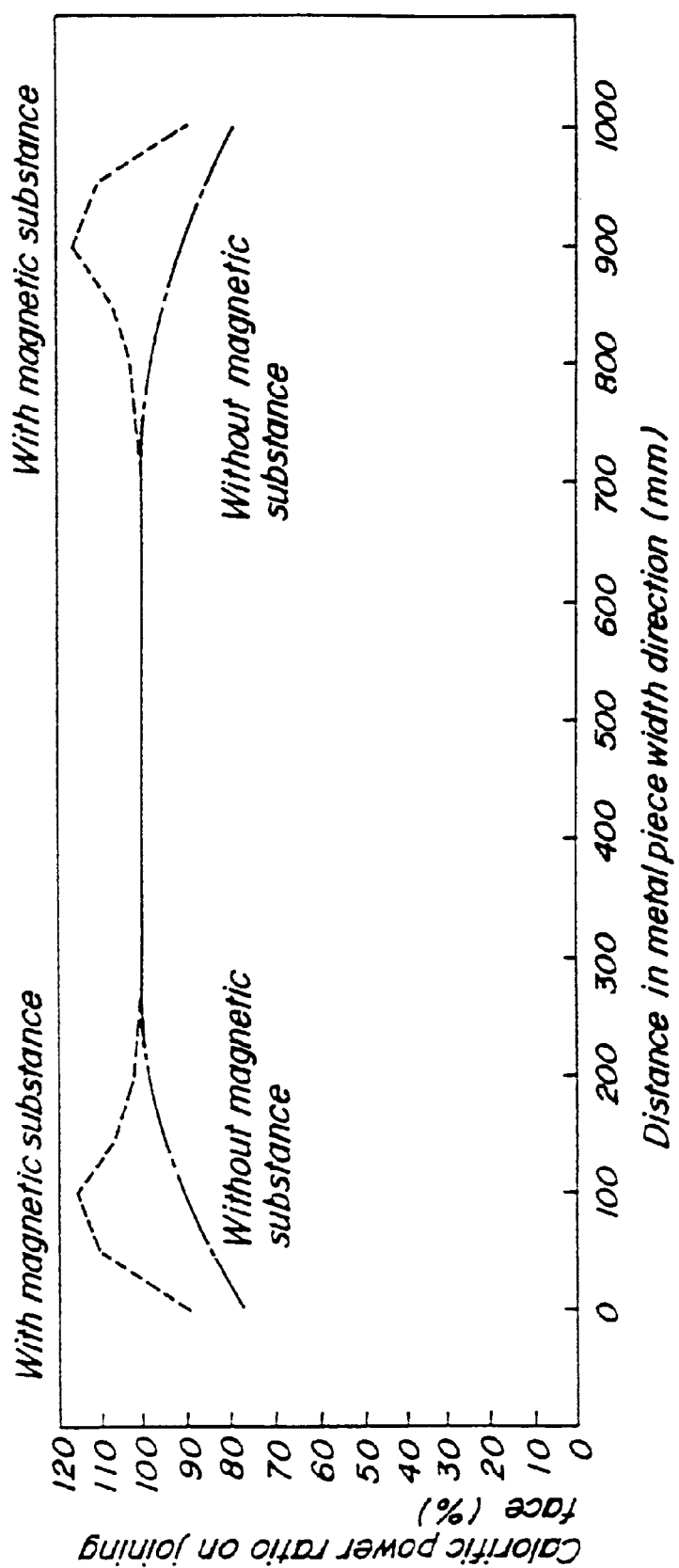
FIG. 68 is graph showing the relationship between the distance in a direction of a metal piece width and the calorific power ratio at a joining face.

FIG. 68 shows a comparison of calorific power ratios on the joined face of the sheet bar.

EMBODIMENT 5

Embodiment (1)

Hot-roughed sheet bars (900° C.) of extremely-low carbon (C=20 ppm) steel each having a width of 1000 mm and a thickness of 40 mm were opposed to each other with a space of 5 mm therebetween; inductors (a width and a length of each magnetic pole opposed to the sheet bars was 240 mm and 1000 mm, respectively) shown in FIG. 37 were arranged at the rear and front ends of the opposed sheet bars with a distance D to the sheet bars being 120 mm and an overlap width L of the sheet bars and each magnetic pole being 70 mm; and the alternating magnetic field was generated by the inductors with an input power of 1350 kW and a frequency of 650 Hz to perform heating. In this case, the osmotic depth was 22 mm; the temperature rising speed was 70° C./s; and a times required to reach a target heating temperature was approximately 10 seconds.

Embodiment (2)

Hot-roughed sheet bars (950° C.) of high carbon (C=0.75%) steel each having a width of 1000 mm and a thickness of 30 mm were opposed to each other with a space of 10 mm therebetween; inductors (a width and a length of each magnetic pole opposed to the sheet bars was 100 mm and 1200 mm, respectively) shown in FIG. 38 were arranged at the rear and front ends of the opposed sheet bars with a distance D to the sheet bars being 60 mm and an overlap width L of the sheet bars and a coil being 45 mm; and the alternating magnetic field was generated by the inductors with an input power of 1000 kW and a frequency of 650 Hz to perform heating. In this case, the osmotic depth was 22 mm; the temperature rising speed was 70° C./s; and a times required to reach a target heating temperature was approximately 7.5 seconds.

EMBODIMENT 6

Embodiment (1)

In order to join the preceding metal piece having a width of 600 mm, a thickness of 28 mm and a melting point of 1532° C. (a type of steel: extremely-low carbon steel having a carbon content of 0.002 wt %) and the succeeding metal piece having a width of 600 mm, a thickness of 28 mm and a melting point of 1485° C. (a type of steel: carbon steel having a carbon content of 0.7 wt %) to each other, after heating and increasing the temperature under such conditions that: an area A of a core of an inductor was 76 mm×300 mm=0.0228 m², a magnetic flux density of the alternating magnetic field was 0.5 T; a distance between upper and lower magnetic poles of the inductor was 150 mm; a temperature of the preceding metal piece before starting heating was 1000° C.; a temperature of the succeeding metal piece before starting heating was 1000° C.; a space g between the preceding and succeeding metal pieces was 5 mm; a lap area a of each magnetic pole in the preceding metal piece was 0.01050 m²; a lap area b of each magnetic pole in the succeeding metal piece was 0.01080 m²; a frequency of the alternating magnetic field was 1000 Hz; two inductors were prepared and disposed at the both width ends of the metal pieces; a heating time was 6.5 seconds; and a pressing force was 2 kgf/mm² (bearing), the both metal pieces were pressed against and joined to each other, and an examination was made into a tensile strength at the joined portion after completely cooled.

In regard of heating of the metal pieces under the above-mentioned conditions, it was confirmed that the temperatures of the preceding metal piece and the succeeding metal piece after heating reached 1475° C. and 1430° C. which were lower than the respective melting points by 55° C., respectively. Further, as to the tensile strength of the joined portion, there was obtained an excellent result, i.e., 28 kgf/mm² corresponding to approximately 90% of a tensile strength (31 kgf/mm²) of the preceding metal piece.

EMBODIMENT 7

Embodiment (1)

An apparatus shown in FIG. 51 in which two inductors (the size of a core of each inductor: a length of 240 mm×a width of 1000 mm) for generating the magnetic field were provided in the width direction of the metal pieces was used; the electric power of 1000 kW was input to each inductor while synchronously controlling phases; and metal pieces (900° C.) of regular steel each having a width of 1000 mm and a thickness of 30 mm were heated and joined to each other.

As a result, in the conventional joining, since the induction currents induced to the metal pieces canceled out depending on the width dimension of the metal pieces, the temperature rising efficiency was lowered, whereby a desired heating efficiency might not be obtained. In the case where two inductors were synchronously operated in accordance with the invention, however, it was confirmed that even when the width of the metal pieces was large, the temperature rising efficiency was not decreased, thereby enabling the stable joining.

EMBODIMENT 8

Embodiment (1)

In the hot rolling line shown in FIG. 20, after the sheet bars (low carbon steel) each having a width of 1800 mm and a thickness of 30 mm were opposed to each other as the preceding metal piece and the succeeding metal piece with a space of 10 mm therebetween, heating was carried out for 10 seconds and the temperature was increased to 1500° C. by a joining apparatus having inductors whose structure is as shown in FIG. 58 (a width of each magnetic pole was 800 mm; a length of each magnetic pole was 250 mm; and a distance between adjacent magnetic poles was 75 mm) under such conditions that an input power was 1500 kW and a frequency was 500 Hz, and the metal pieces were pressed against each other by a force of 3 kgf/mm², thereby completing the joining of the both metal pieces. The obtained metal piece was then rolled by a hot finishing mill having seven stands until the plate thickness of 3 mm was realized. At this time, an existence/absence of rupture in the joined region was checked, but the plate had no rupture and the excellent continuous rolling was hence performed.

On the other hand, in the case where an apparatus such as shown in FIG. 70 in which two inductions each having a C-shaped core are arranged in the width direction of the metal pieces was used, the succeeding facts were found out.

That is, since the temperature of the metal pieces is usually in a range of 900 through 1000° C. during joining and the electric resistivity ρ of the metal pieces is approximately 120×10⁻⁸ Ω*m in this range of temperature irrespective of types of steel, when the induction heating was effected with a frequency of the alternating magnetic field of 500 Hz, the calculated osmotic depth $d_0$ becomes approximately 25 mm. In heating using the apparatus shown in FIG. 70, a limit of a space between the magnetic poles is 150 mm ($d_0 \times 6$) from a viewpoint of an insulating limit of two inductors adjacent to each other and, as shown in FIG. 71 illustrating the heating quantity distribution in the width direction of the metal piece, the heating quantity at a space between the magnetic poles did not exceed 90% of the that in the joining region corresponding with the magnetic poles, resulting in the insufficient joining at this region.

FIG. 72 shows a distribution of heating quantity in the case where an apparatus having inductors shown in FIG. 58 was used, it is obvious that the a rate of decrease in the heating quantity at a portion between the inductors is extremely low as compared to data shown in FIG. 70.

Although this embodiment has been described as a case where a space (a dimension between two projections) between magnetic poles adjacent to each other is 75 mm (usually, a value of 150 mm is a lower limit even though the space is narrowed as possible), any apparatus, for example, one shown in FIG. 73 in which the space is 0 mm can be applied if only a desired heating capacity can be secured.

EMBODIMENT 9

Embodiment (1)

A joining apparatus utilizing heating by the induced current was provided between a delivery side of a roughing mill and an entry side of a finishing mill in a hot rolling line; the rear end of the preceding metal piece and the front end of the succeeding metal piece were cut to obtain desired end shapes by a crop shear at an earlier stage of operation in the joining apparatus; heating was carried out at various temperatures by the induced current; the metal pieces were pressed against and joined to each other; and the thus-obtained metal piece was then supplied to a finishing mill.

The temperature rising speed was previously set to be 100° C./s, and the temperature of each roughed sheet bar immediately before heating was also adjusted in accordance with a heating furnace extract temperature and a roughing speed to be 1000° C.±20° C.

In regard of a steel type, carbon steel having a carbon content of 20 ppm or 1.3 wt % was used.

Rolling conditions were such that: a sheet bar width after roughing was 700 to 1900 mm; a sheet bar thickness was 25 to 50 mm, and a steel plate thickness on a delivery side of a finishing mill on a seventh stage was 0.8 to 3.5 mm.

The inductor for generating the alternating magnetic field was disposed in such a manner that a pair of magnetic poles would vertically sandwich the front and rear ends of the metal pieces and the magnetic field could act upon the entire region of the portions to be joined. The electric power was supplied from the same alternating power supply to the vertically extending inductor, and a maximum input power capacity was 3000 kW.

In this case, the heating processing was carried out under such a condition that a solidus line temperature ($T_S$) and a liquidus line temperature ($T_L$) were obtained from components of the metal pieces and an ultimate temperature of heating T satisfied $T_S \leq T \leq (T_S+T_L)/2$. Note that a melting temperature $T_C$ of the scale in the embodiment was 1350° C.

The obtained result is shown in Table 1.

As apparent from the table, when the heating/joining processing was effected under the conditions satisfying an optimum heating temperature range, good finishing rolling was able to be performed in any case.

As apparent from the table, when the heating/joining processing was effected under the conditions satisfying an optimum heating temperature range, good finishing rolling was able to be performed in any case.

Embodiment (2)

A type of steel and rolling conditions are the same with those in Embodiment (1).

Heating was carried out under such a condition that a melting temperature of scales of iron oxide ($T_C$), a solidus line temperature ($T_S$) and a liquidus line temperature ($T_L$) were obtained from components of the metal pieces and an ultimate temperature of heating T satisfied $(T_C+T_S)/2 \leq T \leq (T_S+T_L)/2$. However, in case of $T_C > T_S$, the condition was such that $T_S \leq T \leq (T_S+T_L)/2$ was satisfied.

The obtained result is shown in Table 2.

TABLE 1

| No. | Content of C (wt %) | Plate width (mm) | Plate thickness (mm) | Solidus ratio (%) | T (° C.) | $T_S$ (° C.) | $T_L$ (° C.) | $T_S + T_L$ /2 | Draft (%) | Result of rolling |
|---|---|---|---|---|---|---|---|---|---|---|
| 1 | 1.3 | 700 | 30 | 94 | 1310 | 1300 | 1460 | 1380 | 15.0 | good |
| 2 | 0.8 | 1000 | 30 | 43 | 1430 | 1375 | 1472 | 1423 | 10.0 | good |
| 3 | 0.2 | 1600 | 30 | 85 | 1470 | 1460 | 1525 | 1492 | 15.0 | good |
| 4 | 0.05 | 700 | 30 | solid | 1515 | 1510 | 1532 | 1521 | 10.0 | good |
| 5 | 0.05 | 1500 | 25 | 100 | 1510 | 1510 | 1532 | 1521 | 31.3 | good |
| 6 | 0.05 | 1500 | 40 | 77 | 1515 | 1510 | 1532 | 1521 | 15.0 | good |
| 7 | 0.002 | 1900 | 25 | 87 | 1522 | 1520 | 1535 | 1527 | 31.3 | good |
| 8 | 0.002 | 700 | 50 | 53 | 1527 | 1520 | 1535 | 1527 | 20.0 | good |

TABLE 2

| No. | Content of C (wt %) | Plate width (mm) | Plate thickness (mm) | T (° C.) | $T_C$ (° C.) | $T_S$ (° C.) | $T_L$ (° C.) | Draft (%) | Result of rolling |
|---|---|---|---|---|---|---|---|---|---|
| 9 | 1.3 | 700 | 30 | 1375 | 1365 | 1300 | 1460 | 10.0 | good |
| 10 | 0.7 | 900 | 30 | 1372 | 1365 | 1377 | 1485 | 20.0 | partially incomplete joining after rolling |
| 11 | 0.2 | 1300 | 30 | 1470 | 1360 | 1460 | 1525 | 10.0 | good |
| 12 | 0.06 | 700 | 30 | 1440 | 1360 | 1510 | 1532 | 15.0 | partially incomplete joining after rolling |
| 13 | 0.05 | 1500 | 25 | 1450 | 1360 | 1510 | 1532 | 31.3 | partially incomplete joining after rolling |
| 14 | 0.05 | 1900 | 50 | 1512 | 1360 | 1510 | 1532 | 25.0 | good |
| 15 | 0.002 | 700 | 25 | 1450 | 1355 | 1520 | 1535 | 31.5 | partially incomplete joining after rolling |
| 16 | 0.002 | 1900 | 30 | 1524 | 1355 | 1520 | 1535 | 15.0 | good |
| 17 | 0.002 | 1300 | 30 | 1526 | 1355 | 1520 | 1535 | 10.0 | good |

As apparent from the table, when the heating processing was carried out under the conditions satisfying the preferable range of heating temperature, although a partially incomplete joining occurred, excellent continuous rolling actually having no problem was able to be performed.

Comparative Example (1)

A type of steel and rolling conditions are the same with those in Embodiment (1).

Heating was carried out under such a condition that a melting temperature of scales of iron oxide ($T_C$), a solidus line temperature ($T_S$) and a liquidus line temperature ($T_L$) were obtained from components of the metal pieces and an ultimate temperature of heating T satisfied ($T_C+T_S$)/2>T.

The obtained result is shown in Table 3.

TABLE 3

| No. | Content of C (wt %) | Plate width (mm) | Plate thickness (mm) | T (° C.) | $T_C$ (° C.) | $T_S$ (° C.) | $T_L$ (° C.) | Draft (%) | Result of rolling |
|---|---|---|---|---|---|---|---|---|---|
| 18 | 0.5 | 1200 | 30 | 1415 | 1365 | 1475 | 1500 | 10.0 | partially incomplete joining after rolling |
| 19 | 0.002 | 1000 | 25 | 1420 | 1355 | 1520 | 1535 | 31.3 | rupture during rolling |
| 20 | 0.002 | 1900 | 30 | 1430 | 1355 | 1520 | 1535 | 15.0 | rupture during rolling |

As apparent from the table, when heating/joining processing was not performed under the heating conditions shown in the table, the excellent finishing rolling was not possible in any case.

Although the embodiments has been described as the cases where mainly the carbon steel is a target material for joining, it is considered that the same effect can be obtained when silicon steel or high alloy steel is applied.

In addition, even if the sequence of joining is changed so that pressing is carried out after heating or heating is performed while pressing, the same effect can be obtained, and the excellent result can be similarly obtained by using any other well-known means other than induction heating.

In this invention, there has been explained about the steel having a C content of not less than 20 ppm, but it is obvious that the temperatures $T_S$ and $T_L$ rarely show variations with value close to 20 ppm, and it is thus understood that steel having a C content less than 20 ppm can be also applied.

INDUSTRIAL APPLICABILITY

1) For heating and joining metal pieces, since an alternating magnetic field whose direction is opposed to that of an alternating magnetic field generated in the metal pieces is produced, corner portions of the metal pieces are sufficiently heated without a fear of melting down in a central region of the metal pieces in the plate width direction, and uniform heating over the entire region in the width direction of the metal pieces consequently enables a length of the incompletely-joined portion of the metal pieces which may lead to rupture of the plate during rolling to be extremely short, thereby performing stable continuous hot rolling. Specifically, each reverse magnetic field generation circuit for generating a reverse magnetic field operates by only opening and/or closing a switch provided thereto in the joining apparatus, thus prominently simplifying structure and control of the apparatus.

2) By lapping the inductor over each conductive member provided to each width end of the metal pieces, the magnetic flux directly runs through the inductive member to flow the induced current thereto, and a heating efficiency at the width ends of the metal pieces can be hence greatly improved.

3) Since the induced current can flow in the vicinity of corners of the metal pieces more than ever by positively flowing the current having the same phase with that of the induced current generated in the metal pieces from an external power supply to the conductive members, a heating efficiency can be improved at the width ends of the metal pieces.

4) Since an overlap width of the inductor (magnetic poles) and the metal pieces can have an appropriate value, the temperature can be increased to a value required for joining in a short time of, e.g., 10 seconds. Further, the same effects can be obtained by adequately securing a distance between the metal pieces and coils for induction heating. These effects can prevent the scale of the apparatus from being enlarged and clarify a preferred positional relationship between end portions of the metal pieces to be joined and the inductor, and the uneven distribution of temperature during heating can be extremely minimized.

5) For performing continuous hot rolling of the metal pieces, since temperature rising quantities at portions of the preceding metal piece and the succeeding metal piece where joining is desired can be individually adjusted to perform heating and raise the temperature, even when the both metal pieces are different from each other in temperature or they are of a steel type having different plate thicknesses or melting points, they can be assuredly joined to each other, thus eliminating a problem such that the plate is ruptured from a joined portion during rolling to stop the production line.

6) Since phases of a plurality of magnetic field generation inductors arranged in the plate width direction are controlled, even in the case where widths of the metal pieces are changed, the metal pieces can be stably joined to each other.

7) In a method for joining metal pieces by which induction heating is performed by magnetic fluxes running through the metal pieces in the thickness direction thereof, since a plurality of induction heating coils are provided in the width direction of the metal pieces and each space provided between induction heating coils are set to be in a predetermined range, even if the metal pieces having a large width are a target of heating and joining the excellent heating is possible over the entire area of the metal pieces in the width direction. As a result, a good joined portion can be obtained and stable continuous hot finishing rolling is enabled.

8) Since the metal pieces are heated at portions to be joined under predetermined conditions, joining is assuredly enabled irrespective of types of steel, and stable continuous hot rolling can be effected while largely decreasing problems such as rupture during finishing rolling which is carried out after joining.

What is claimed is:

1. A method for joining metal pieces wherein a rear end of a preceding metal piece and a front end of a succeeding metal piece are heated and the metal pieces are pressed against each other for joining before hot finishing rolling, characterized in that:

the rear end of the preceding metal piece and the front end of the succeeding metal piece are opposed to each other with a space therebetween, and an alternating magnetic field running through the metal pieces in the thickness direction thereof is generated in an end region on the opposed faces of the respective metal pieces by a plurality of inductors arranged in the width direction of the metal pieces to heat the respective metal pieces, wherein a synchronous control of phase is performed in such a manner that the current having the same phase flows in a coil of each inductor.

2. An apparatus for joining metal pieces comprising a plurality of inductors, each having a pair of magnetic poles, said inductors arranged in the width direction of the metal pieces, for generating an alternating magnetic field running through the metal pieces in the thickness direction thereof in an end region on the opposed face of the respective metal pieces which are opposed to each other with a space therebetween, characterized by a power input inverter provided to each of the inductors and each power input inverter is connected to a phase control circuit, the space between magnetic poles of adjacent inductors is less than five times an osmotic depth $d_0$ of the induced current represented by the following expression:

$$d_0 = \{\rho \times 10^7/(\mu \times f)\}^{1/2}/2\pi,$$

where $d_0$: osmotic depth of the induced current (m)

f: frequency of the alternating magnetic field (Hz)

$\rho$: electric resistivity ($\Omega$*m)

$\mu$: relative magnetic permeability.

* * * * *